US009774698B2

(12) United States Patent
Farrell

(10) Patent No.: US 9,774,698 B2
(45) Date of Patent: Sep. 26, 2017

(54) TECHNIQUES TO TRANSFER LARGE COLLECTION CONTAINERS

(71) Applicant: NETAPP, INC., Sunnyvale, CA (US)

(72) Inventor: Tim Farrell, Huntersville, NC (US)

(73) Assignee: NETAPP, INC., Sunnyvale, CA (US)

( * ) Notice: Subject to any disclaimer, the term of this patent is extended or adjusted under 35 U.S.C. 154(b) by 325 days.

(21) Appl. No.: 14/744,136

(22) Filed: Jun. 19, 2015

(65) Prior Publication Data

US 2016/0191660 A1    Jun. 30, 2016

Related U.S. Application Data

(60) Provisional application No. 62/098,868, filed on Dec. 31, 2014, provisional application No. 62/098,886, filed on Dec. 31, 2014.

(51) Int. Cl.
*H04L 29/08*    (2006.01)
*H04L 29/06*    (2006.01)

(52) U.S. Cl.
CPC ............ *H04L 67/32* (2013.01); *H04L 63/123* (2013.01); *H04L 67/1097* (2013.01); *H04L 69/04* (2013.01)

(58) Field of Classification Search
None
See application file for complete search history.

(56) References Cited

U.S. PATENT DOCUMENTS

| 7,584,338 B1 * | 9/2009 | Bricker | G06F 17/30212 |
| | | | 707/999.202 |
| 8,086,909 B1 | 12/2011 | Liu et al. | |
| 2005/0086646 A1 | 4/2005 | Zahavi et al. | |
| 2008/0198974 A1 | 8/2008 | Lewis et al. | |
| 2008/0301254 A1 * | 12/2008 | Bestler | H04L 49/90 |
| | | | 709/212 |
| 2010/0218040 A1 | 8/2010 | Bodmer et al. | |
| 2012/0233293 A1 | 9/2012 | Barton et al. | |
| 2013/0073793 A1 * | 3/2013 | Yamagishi | G06F 13/16 |
| | | | 711/103 |
| 2014/0156719 A1 * | 6/2014 | Leggette | H04L 67/1097 |
| | | | 709/201 |
| 2014/0195846 A1 * | 7/2014 | Resch | G06F 11/1092 |
| | | | 714/6.22 |

OTHER PUBLICATIONS

Non-Final Office Action on co-pending U.S. Appl. No. 14/744,116 dated Jun. 30, 2017.

* cited by examiner

*Primary Examiner* — Natisha Cox
(74) *Attorney, Agent, or Firm* — Klein, O'Neill & Singh, LLP

(57) ABSTRACT

Techniques to transfer large collection containers in a large payload support system comprising one or more components configured to receive a collection container delivery request to deliver a first collection container, determine whether the first collection container is a large container based at least partially on the collection container delivery request, segment, logically, the first collection container into at least one container segment, each container segment of the at least one container segment having an associated container segment offset information, and deliver the at least one container segment to a payload server device, wherein each container segment of the at least one container segments is associated with a transfer segment header information. Other embodiments are described and claimed.

17 Claims, 16 Drawing Sheets

System 100

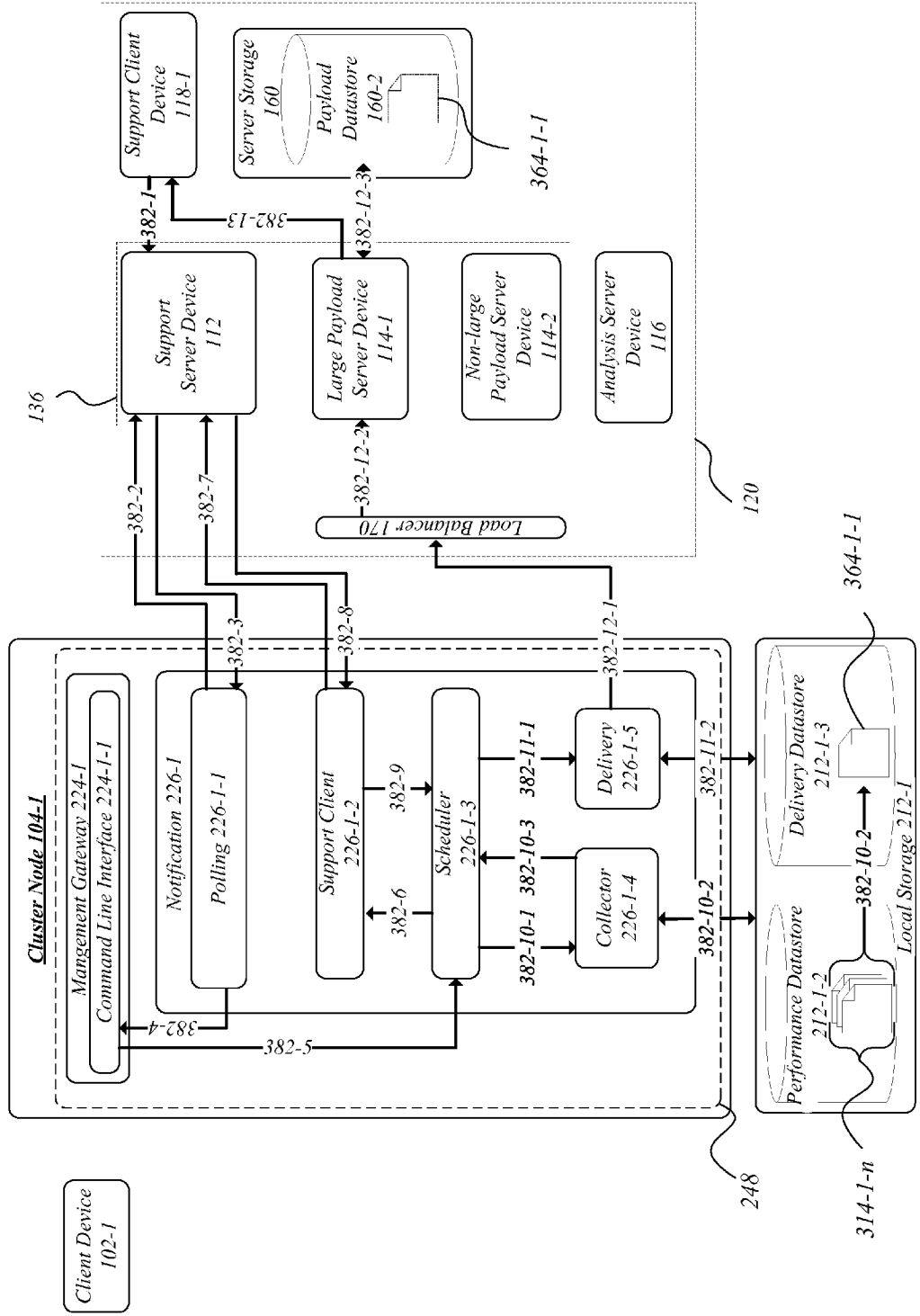

TECHNIQUES TO TRANSFER LARGE COLLECTION CONTAINERS

CLAIM OF PRIORITY

This application claims the benefit of U.S. Provisional Application No. 62/098,868, filed Dec. 31, 2014 and U.S. Provisional Application No. 62/098,886, also filed Dec. 31, 2014. Each patent application identified above is incorporated here by reference in its entirety to provide continuity of disclosure.

BACKGROUND

As more and more business critical applications are being deployed on virtualized, shared infrastructure, there has been a trend towards using clustered network storage systems to improve reliability. In a clustered storage system, two or more cluster nodes are connected in a distributed architecture such that the cluster nodes operate in a coordinated manner to respond to host requests. Each cluster node may be a storage controller, although may be implemented using a distributed architecture. Two or more cluster nodes are typically connected to form a cluster, where each of the cluster nodes in the cluster can communicate with the other cluster nodes in the cluster.

A clustered architecture allows convenient scaling through the addition of more cluster nodes, all capable of communicating with each other. Further, a storage cluster may present a single system image of stored data to hosts and administrators, such that the actual location of data can be made transparent to hosts and administrators. Additionally, to improve efficiency and/or operations of the cluster nodes, one or more cluster nodes may also generate performance and diagnostic related information to further assist in optimizing the cluster nodes and/or debugging any issues of the one or more cluster nodes. However, as the amount of performance and diagnostic related information increase, reliably transferring the generated information becomes a challenge, especially when the amount of generated information may be substantial in size and may require substantial amount of time to transfer. It is with respect to these and other considerations that the present improvements have been needed.

BRIEF DESCRIPTION OF THE DRAWINGS

FIG. 3E illustrates an operating environment the large payload support system for initiating the transfer of performance information by a support client device.

DETAILED DESCRIPTION

Figure 1:
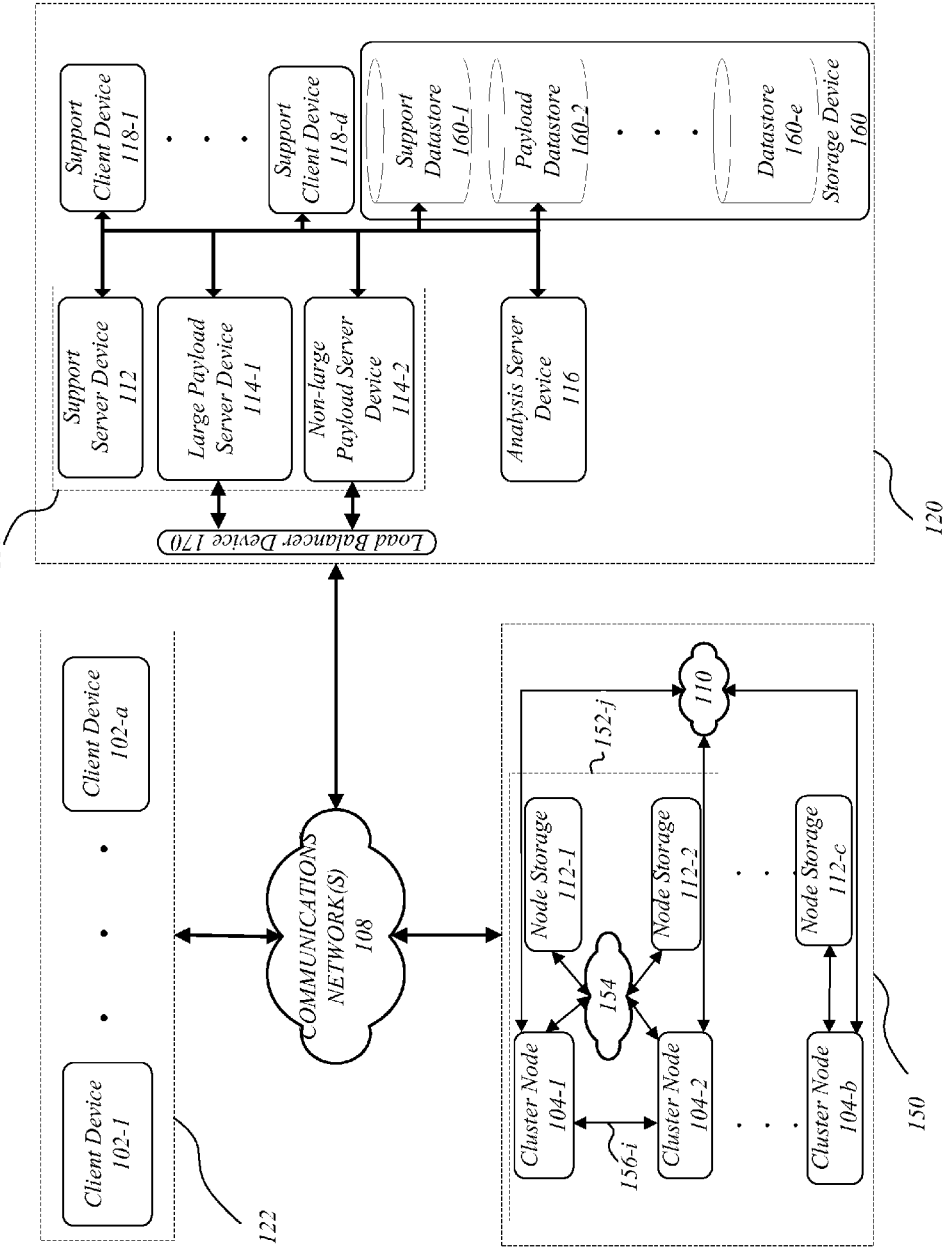
FIG. 1 illustrates an embodiment of a large payload support system.

Various embodiments are directed to a large payload support system including cluster storage system arranged to provide storage for one or more client devices (e.g., hosts, etc.) and a storage support system arranged to provide support services for the cluster storage system. In the large payload support system, the one or more cluster nodes may continuously and/or periodically generate diagnostic information (e.g., kernel core dumps, user space core dumps, FFDC dumps, etc.) and/or performance information (e.g., performance counters for one or more objects in the cluster storage system, etc.), where the diagnostic and/or performance information may be utilized by a storage support system and/or technical support personnel to troubleshoot and/or diagnose one or more issues associated with the cluster storage systems. In order to fully analyze and resolve an issue for a cluster storage system that is deployed at a client's location, it is often necessary for the diagnostic information and/or performance information generated by the one or more cluster nodes to be uploaded to the storage support system for a more thorough analysis by one or more devices of the storage support system and/or technical support personnel.

However, existing methods are limited by the amount of information that may be manually collected, the amount of information that may be transmitted to the storage support system, the rate and/or efficiency with which the information is delivered to the storage support system, the inability for the storage support system and/or technical support personnel to initiate the transfer of diagnostic and/or performance information, and/or the storage support systems limitations in processing or ingesting large amounts of diagnostic information and/or performance information. Accordingly, a unified and improved mechanism is needed to reliability and transfer large amounts of diagnostic and/or performance information to the storage support system with minimal manual, operations, intervention and/or direction by a client or administrator using and/or managing the cluster storage system.

To reduce the amount of manual, operations, intervention and/or direction by a client and/or administrator using and/or managing the cluster storage system to provide diagnostic and or performance information to a storage support system, the one or more components of a cluster node may poll, on a periodic basis, a support server device in the storage support system for one or more support initiated local datastore requests (e.g., directory listing of one or more directories and/or subdirectories, etc.). Moreover, the one or more support initiated local datastore requests may be generated by a support client device to request the local datastore information for one or more cluster nodes comprising a list of container information (e.g., directory listing including one or more files, etc.). In response to the support initiated local datastore requests, the one or more components of a cluster node, may provide local data store information to the storage support system.

To enable the storage support system and/or technical support personnel to retrieve diagnostic information and/or performance information stored in local datastores associated with one or more cluster nodes of a cluster storage system, the one or more components of the one or more cluster nodes may also poll, on a periodic basis, a support server device in the storage support system for one or more support initiated diagnostic information requests and/or support initiated performance information requests.

The one or more support initiated diagnostic information requests may be generated by the support client device used by technical support personnel to request diagnostic information in a diagnostic container (e.g., a core dump file, a user core dump file, etc.) which may be identified by the support initiated diagnostic information request in a diagnostic container name parameter (e.g., the name of the diagnostic container to be delivered, etc.). In response to the one or more support initiated diagnostic information requests, the one or more components of a cluster node may generate a diagnostic collection container comprising, among other containers, the diagnostic container identified by the diagnostic container name parameter and provide the diagnostic collection container to the storage support system.

The one or more support initiated performance information requests may be generated by the support client device used by technical support personnel to request performance information in one or more performance containers (e.g., performance related files including information associated with one or more performance counters of one or more objects of the cluster storage system, etc.) which may be identified by the support initiated performance information request in a start time parameter and end time parameter. In response to the one or more support initiated performance information requests, the one or more components of a cluster node may generate a performance collection container comprising, among other containers, the one or more performance containers having an associated creation time within a time period specified by the start time parameter and end time parameter. The one or more components of a cluster node may provide the performance collection container to the storage support system.

To enable the client and/or administrator to request, with minimal manual, operations, intervention and/or direction, the transfer of diagnostic information and/or performance information in local datastores associated with one or more cluster nodes of a cluster storage system, the one or more components of the one or more cluster nodes may receive one or more requests as one or more commands. The one or more commands may include, without limitation, diagnostic transfer command and/or performance transfer command.

The diagnostic transfer command may be provided by a client device used a client and/or administrator using or managing the cluster storage system to request the delivery of diagnostic information in a diagnostic container which may be identified by a diagnostic container name parameter (e.g., the name of the diagnostic container to be delivered, etc.). In response to the one or more support initiated diagnostic information requests, the one or more components of a cluster node may request and receive the delivery location information from a support server device and generate a diagnostic collection container comprising, among other containers, the diagnostic container identified by the diagnostic container name parameter. The one or more components of a cluster node may further provide the diagnostic collection container to a location identified by the delivery location information which may include, without limitation, the storage support system.

The performance transfer command may be provided by a client device used a client and/or administrator using or managing the cluster storage system to request the delivery of performance information in one or more performance containers (e.g., performance related files including information associated with one or more performance counters of one or more objects of the cluster storage system, etc.) which may be identified by the support initiated performance information request in a start time parameter and end time parameter. In response to the one or more support initiated performance information requests, the one or more components of a cluster node may request and receive the delivery location information from a support server device and generate a performance collection container comprising, among other containers, the one or more performance containers having an associated creation time within a time period specified by the start time parameter and end time parameter. The one or more components of a cluster node may provide the performance collection container to a location identify by the delivery location information which may include, without limitation, the storage support system.

To improve efficiency and increase reliability of delivering information to the storage support system, the delivery component of a cluster node may segment the one or more collection containers (e.g., performance collection containers, diagnostic collection containers, etc.) into one or more container segments, and transfer the one or more container segments substantially in parallel to the storage support system. Each container segment may have maximum segment size as defined by a maximum segment size parameter, and each container segment may be delivered, in parallel, by two or more delivery processors at a combined upload rate limited by a maximum transmit rate parameter. Additionally, because the diagnostic collection containers and/or performance collection containers may be substantial in size and may require substantial amount of time to deliver to the storage support system, the client and/or administrator may further request the cancellation of the pending delivery of the collection containers utilizing a transfer cancellation command. The client and/or administrator may resume the delivery of a cancelled delivery or interrupted delivery (e.g., connection failure, etc.) at a later time utilizing transfer resume command. Furthermore, to provide the client and/or administrator with information regarding the delivery of collection containers, the client and/or administrator may also request for transfer statistics information via a transfer history command.

It may be appreciated that some or all communications between the storage support system and one or more cluster nodes of a cluster storage system may utilize, for example, one or more cluster node initiated Hyper Text Transfer Protocol (HTTP) requests over a secure communications connection/channel utilizing, for example, Transport Layer Security (TLS)/Secure Socket Layer (SSL) protocol (i.e., HTTPS). By implementing cluster node initiated communications (e.g., polling a support server device by a cluster node, requesting the support server device by a cluster node, initiating the transfer to a payload server device by a cluster node, etc.), the burden on clients and/or administrators of cluster storage systems having to create and/or modify their network policies and/or fire wall rules may also be reduced. These are merely a few of the features and benefits of the large payload support system, and other features and benefits are further described below.

With general reference to notations and nomenclature used herein, the detailed descriptions, which follow, may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding, transitioning, updating, associating, disassociating, notifying, determining, providing, receiving, comparing, or the like, which may be commonly associated with mental operations performed by a human operator. However, no such capability of a human operator is necessary, or desirable in most cases, in any of the operations described herein, which form part of one or more embodiments. Rather, these operations are machine operations. Useful machines for performing operations of various embodiments may include, without limitation, general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a large payload support system 100. The large payload support system may include, without limitation, a client system 122, a cluster storage system 150, and/or a storage support system 120 communicatively and/or operatively coupled to each other via communications network(s) 108.

The client system 122 may include, without limitation, one or more client devices 102-*a* and may be implemented as one or more computing devices (e.g., hosts, servers, mobile devices, etc.) operatively coupled to the cluster nodes 104-*b*, in order to access (e.g., read, write, remove, store, retrieve, modify, etc.) their associated information or data in the node storages 112-*c*. Additionally, the client devices 102-*a* may also be generally arranged to communicate with the cluster storage system 150 in order to enable cluster administrators to perform configuration and/or management functions such as, for example, security, access control, diagnostic, and/or auditing functions.

It is worthy to note that "a" and "b" and "c" and similar designators as used herein are intended to be variables representing any positive integer. Thus, for example, if an implementation sets a value for a=4, then a complete set of elements 102-*a* may include elements 102-1, 102-2, 102-3, and 102-4. The embodiments are not limited in this context.

The cluster storage system 150 may include, without limitation, one or more cluster nodes 104-*b*, one or more node storages 112-*c*, storage interconnect 154, and/or cluster interconnect 110. The one or more cluster nodes 104-*b* may be operatively coupled with one or more client devices 102-*a* via communications network 108, in a client-server fashion or in a peer-to-peer fashion. To facilitate communication between the one or more client devices 102-*a* and the one or more cluster nodes 104-*b*, the communications network(s) 108 network may comprise one or more network devices (e.g., hubs, switches, routers, etc.) operatively connected to one or more network interface cards (NIC) and/or host bus adapters (HBA) attached to the one or more client devices 102-*b* and one or more physical network ports (e.g., Ethernet port on a NIC, etc.) attached to the one or more cluster nodes 104-*b*. In order to provide fault tolerance, load balancing, and/or maintenance of consistency of shared resources and/or shared states between and among the cluster nodes 104-*b*, the one or more cluster nodes 104-*b* may also be in communication with each other via cluster interconnect 110. To facilitate communication between the one or more cluster nodes 104, the cluster interconnect 110 network may comprise one or more network components (e.g., hubs, switches, routers, etc.) operatively connected to the one or more cluster nodes 104.

The one or more cluster nodes 104-*b* may also be operatively coupled to one or more node storages 112-*c* via storage interconnect 154. The one or more node storages 112-*c* may include, without limitation, one or more storage units, where the one or more storage units may include, without limitation, one or more data storage devices (e.g., hard disk drives, etc.) in one or more storage virtualization groups (e.g., redundant array of independent disks (RAID) groups, etc.). The one or more storage virtualization groups of the one or more storage units may be further logically abstracted as various data containers such as, for example, aggregates, volumes, LUNs, and/or any other data structure configured to store information. Additionally, each pair of cluster nodes such as cluster nodes 104-1 and 104-2 may be in communication with a pair of node storages 112-1 and 112-2 via storage interconnect 154 and to each other via high availability interconnect 156-*i* to form a high availability pair 152-*j*, so that when one cluster node (i.e., a high availability partner cluster node) in the high availability pair becomes communicatively inaccessible or not operational, the other cluster node may take ownership and management of data stored in both node storages 112-1 and 112-2. It may be appreciated that combination of cluster nodes 104-b and node storages 112-c may vary with a given implementation in order to provide redundancy and meet a client's need for availability and reliability.

The storage support system 150 may include, without limitation, a support server device 112, one or more support client devices 118-d, a server storage device 160, a large payload server device 114-1, a non-large payload server device 114-2, an analysis server device 116, and/or a load balancer device 170.

The server storage device 160 may include, without limitation, one or more datastores 160-e. The one or more datastores 160-e may include, without limitation, support datastore 160-1 and payload datastore 160-2. The support datastore 160-1 may generally arranged to store client support information associated with each client utilizing a cluster storage system 150. The client support account information may include, without limitation, client support identifier information (e.g., login name, email address, etc.), client support authentication information (e.g., passwords, etc.), client support contact information, and/or any other information for providing support to one or more cluster storage systems of one or more clients.

The payload datastore 160-2 may be generally arranged to store information (e.g., collection containers, datastore information, etc.) received from one or more cluster storage systems 150. The stored information may be generally associated with the client identifier information and may also be indexed in the payload datastore 160-2 based at least partially on the client support identifier information and/or case reference information (e.g., a reference such as a sequence of numbers, characters, and/or symbols associated with the one or more diagnostic containers comprising the diagnostic information, etc.).

The one or more support client devices 118-d may be generally arranged to provide support to one or more cluster storage systems (e.g., cluster storage system 150, etc.) by requesting for information (e.g., client support information, performance information, diagnostic information, etc.) associated with the one or more cluster nodes of one or more cluster storage systems. In some embodiments and in particular, the one or more support client devices 118-d may be associated with one or more client support services accounts for utilization by one or more client support services users to request for information, request for collection containers, and/or receive notifications. In some embodiments and in particular, the one or more support client devices 118-d may be configured to generate one or more requests for information and/or requests collection containers. The requested information may include, without limitation, datastore information (e.g., a listing of performance containers and their associated container attribute information, etc.), transfer statistics information (e.g., information regarding the current delivery status of one or more collection containers), and/or diagnostic datastore information (e.g., a listing of diagnostic containers and their associated container attribute information, etc.). The requested collection containers may include, without limitation, performance collection containers, and/or diagnostic collection containers.

The support server device 112 may be generally arranged to facilitate the communication between the support client device 118-1 and one or more cluster storage systems (e.g., cluster storage system 150, etc.). In some embodiments and in particular, support server device 112 may be configured to establish one or more secure communications connections and/or channels utilizing one or more protocols (e.g., Secure Socket Layer (SSL), Transport Layer Security (TLS), etc.) with one or more cluster nodes (e.g., cluster node 104-1, etc.) of one or more cluster storage systems (e.g., cluster storage system 150 etc.). In some embodiments the support server device may also be configured to notify a cluster storage system 150 for a client having an associated client support account information to perform one or more commands. The one or more commands may be configured to perform, without limitation, requesting of performance datastore information, requesting of diagnostic datastore information, requesting of performance collection container, and/or requesting of diagnostic collection container.

The large payload server device 114-1 may be generally arranged to store large size collection containers. In some embodiments and in particular, the large payload server device 114-1 may be configured to store large size collection containers in the payload datastore 160-2. In some embodiments, the large size collection containers may include, without limitation, performance collection containers and/or diagnostic collection containers. In some embodiments, the large size collection containers may also include any other collection container having a container size larger than a predefined large container size (e.g., greater than 10 Megabytes (MB), greater than 100 MB, etc.).

The non-large payload server device 114-2, may be generally arranged to store non-large size collection containers or normal size collection containers. In some embodiments, the non-large size collection containers may include any container except for performance collection containers and/or diagnostic collection containers. A non-limiting exemplary embodiment of a non-large size collection containers may include, but is not limited to, service processor containers including, without limitation, physical environment information and/or network configuration information. In some embodiments, the non-large size collection containers may also include any other collection container having a container size smaller than or equal to a predefined large container size (e.g., less than 10 MB, less than 100 MB, etc.).

The load balancing device 170 may be generally arranged to facilitate the transfer of collection containers and associated information between one or more cluster storage systems 150 and the storage support system 120. In some embodiments and in particular, the load balancing device 170 may be configured to establish one or more secure communications connections and/or channels with one or more cluster storage systems 150 and provide or forward received collection containers to the large payload server device 114-1 and/or non-large payload server device 114-2 based at least partially on container information associated with each collection container.

It may be appreciated that in various embodiments, the client devices 102-a, the cluster nodes 104-b, the node storage 112-c, the load balancer device 170, the support server device 112, the support client devices 118-d, the large payload server device 114-1, the non-large payload server device 114-2, the analysis server device 116, and/or the storage device 160, may each comprise one or more components. As used herein the terms "system" and "application" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an operating system running on client device 102-1, cluster node 104-1, and/or node storage 112-1 and the client device 102-1, cluster node 104-1, and/or node storage 112-1 themselves can be a component. One or more components can reside within a process and/or thread of execution, and a component can be localized on one computer and/or distributed between two or more computers as desired for a given implementation. The embodiments are not limited in this context.

In various embodiments, the one or more components may also be communicatively coupled via various types of communications media and may coordinate operations between each other. The coordination may involve the uni-directional or bi-directional exchange of information. The one or more components may communicate via one or more interfaces such as application program interfaces and/ or local or remote procedural mechanisms across one or more hardware and/or software boundaries. Additionally, the one or more components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, network interfaces, and bus interfaces.

Figure 2:
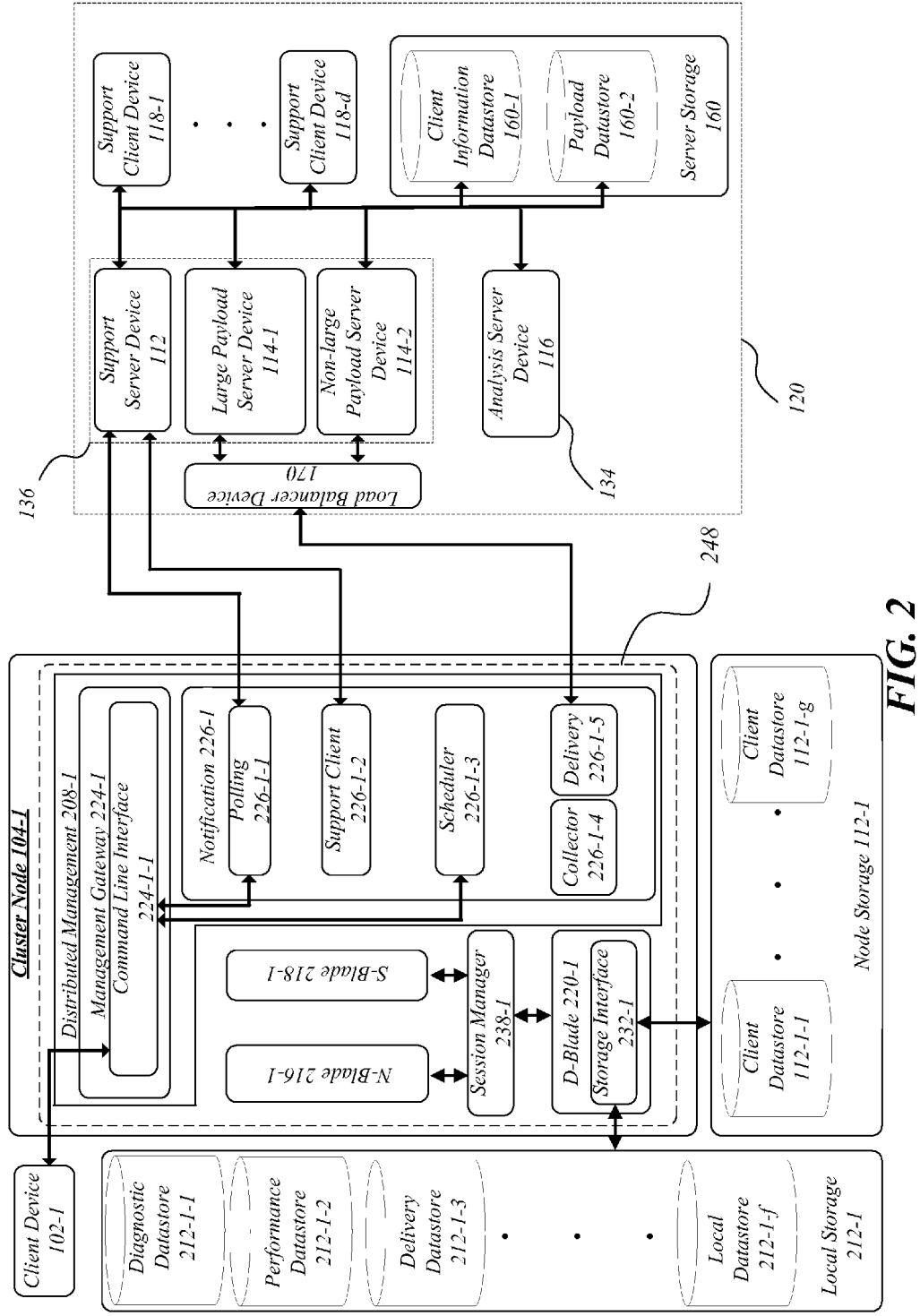
FIG. 2 illustrates a detailed embodiment of the large payload support system.

FIG. 2 illustrates a detailed embodiment of the large payload support system 100 and in particular, one or more components of cluster node 104-1 and local storage 212-1. While only a single cluster node (e.g., cluster node 104-1) and a single local storage (e.g., local storage 212-1) of the large payload support system 100 are illustrated and discussed hereinafter in detail, it may be appreciated that each cluster node of the one or more cluster nodes 104-b may be configured to include substantially similar components and/ or datastores (including their arrangements and/or configurations) to those components discussed in detail with respect to cluster node 104-1 and/or local storage 212-1. Accordingly, the detailed embodiment of the large payload support system 100 is not limited in this context.

As illustrated in FIG. 2, the cluster node 104-1 may be configured to execute, without limitation, a storage operating system 248 (e.g., ONTAP® from NetApp, Inc., etc.). The storage operating system 248 may include, without limitation, a distributed management component 208-1, a network blade (N-blade) component 216-1, a small computer system interface blade (S-blade) component 218-1, a session manager component 238-1, and/or a data blade (D-blade) component 220-1. The one or more components may be operatively coupled to each other to enable one or more client devices 102-a to access information or data stored in the one or more node storages 112-c in a cluster storage system 150 and/or manage the cluster storage system 150.

The N-Blade component 216-1 may be generally arranged to provide information or data access (read, write, remove, modify, etc.) to client devices 102-a for information stored in the node storages 112-c (e.g., node storage 112-1, etc.) hosted, managed, and/or owned by the one or more cluster nodes 104-b (e.g., cluster node 104-1, etc.) utilizing one or more protocols and session manager component 238-1. The one or more protocols may include, without limitation, network file system (NFS) protocol, and/or common internet file system (CIFS) protocol.

The S-Blade component 216-1 may also be generally arranged to provide information or data access (e.g., read, write, remove, modify, etc.) to client devices 102-a for information stored in the node storages 112-c (e.g., node storage 112-1, etc.) hosted, managed, and/or owned by the one or more cluster nodes 104-b (e.g., cluster node 104-1, etc.) utilizing one or more protocols and session manager component 238-1. The one or more protocols may include, without limitation, Fibre Channel (FC) protocol, Fibre Channel over Ethernet (FCoE) protocol, and/or internet SCSI (iSCSI) prtocol.

The D-blade component 220-1 may be generally arranged to host, manage, and/or own node storage 112-1 and provide information or data access (e.g., read, write, remove, modify, etc.) from one or more N-blade components (e.g., N-blade component 216-1, etc.) and/or one or more S-blade components (e.g., S-blade component 218-1, etc.) to the node storage 112-1 and may include, without limitation, a storage interface component 232-1. The storage interface component 232-1 may be generally arranged to receive one or more file input/output operations from the one or more N-blade components 216-1 and/or the one or more S-blade components 218-1 via one or more protocols (e.g., Spin Network protocol (SpinNP), etc.) and provide data access to client datastore 112-1-1) generally arranged to store client information in one or more aggregates, volumes, and/or logical units in the node storage 112-1. Moreover, the storage interface component 232-1 may be arranged to provide at least read and write functionality to one or more physical data storage devices (e.g., hard disk drives, etc.) utilizing one or more file layouts such as, for example, the Write Anywhere File Layout (WAFL) that provides read and write functionality to data/information in one or more data blocks.

The session manager component 238-1 may generally be arranged to facilitate communications between the S-Blade component 216-1 and one or more D-Blade components and/or between the N-Blade component 218-1 and one or more D-Blade components via one or more sessions established between the S-Blade component 218-1 and one or more D-Blade components and/or between the N-Blade component 216-1 and one or more D-Blade components via one or more protocols (e.g., Spin Network Protocol (SpinNP), etc.). The one or more sessions may be utilized by the N-Blade component 216-1, S-Blade components 218-1, and/or one or more D-Blade components to provide data/ information access operations. Additionally, the session manager component 238-1 may also be arranged to interface with other session manager components (e.g., session manager component 238-2 (not shown)) in other cluster nodes 104-b (e.g., cluster node 104-2) in order to establish one or more sessions and provide data access operations with other D-Blade components (e.g., D-Blade component 220-2 (not shown)) of other cluster nodes 104-b (e.g., cluster node 104-2), such that one or more client devices 102-a can access a node storage regardless of which cluster node is hosting or managing that node storage. For example, the session manager component 238-1 may enable the client device 102-1 operatively coupled to cluster node 104-1 to access information contained in node storage 112-2 via the cluster node 104-1, even though node storage 112-2 may be hosted, owned, and/or managed by cluster node 104-2. The example is not limited in this context.

The distributed management component 208-1 may be generally arranged to provide and update information between and among cluster nodes 104-*b*. Moreover, the distributed management component 208-1 may be generally arranged to provide and update cached configuration information to the one or more components. The distributed management component 208-1 may also include, without limitation, a management gateway component 224-1 and a notification component 226-1.

The management gateway component 224-1 may be generally arranged to provide a management gateway via one or more cluster management logical interfaces (LIFs) (not shown) in order for cluster administrators to perform management functions such as, for example, security, access control, diagnostic, and/or auditing functions. The management gateway component 224-1 may further include, without limitation, a command line user interface (CLI) component 224-1-1.

The CLI component 224-1-1 may be generally arranged to receive one or more commands via one or more client devices 102-*a* and/or one or more support client devices 118-*d*, where each command may include, without limitation, one or more command parameters. Additionally, in some embodiments, each received command may be associated with a command identifier information (e.g., a per cluster node unique value to identify a previously issued command, etc.). In some embodiments, the one or more commands may include, without limitation, diagnostic transfer command for initiating the transfer of diagnostic information, performance transfer command for initiating the transfer of performance information, transfer history command for requesting transfer statistics information, transfer cancellation command for cancelling a previously issued diagnostic transfer command and/or performance transfer command identified by a command identifier parameter, and transfer resume command for resuming or continuing a previously cancelled performance transfer command and/or diagnostic transfer command also identified by a command identifier parameter.

The CLI component 224-1-1 may also be generally arranged to generate one or more events including, without limitation, one or more event parameters based at least partially on the received one or more commands, and/or provide one or more responses to the one or more received commands to the one or more client devices 102-*a* and/or support client devices 118-*d*. It may be appreciated that the generated one or more events may be transmitted and/or distributed to one or more components of cluster node 104-1 via an event messaging system (EMS) (not shown).

The notification component 226-1 may be generally arranged to manage automated support of one or more cluster nodes in one or more cluster storage systems. The notification component 226-1 may include, without limitation, a polling component 226-1-1, support client component 226-1-2, scheduler component 226-1-3, collector component 226-1-4, and/or delivery component 226-1-5.

The polling component 226-1-1 may be generally arranged to manage one or more pending support requests for information initiated by one or more support client devices 118-*d* by establishing one or more secure communications connections/channels with support server device 112, issuing one or more commands comprising one or more parameters to the CLI component 224-1-1 based at least partially on the one or more pending support requests received over the secure communication connection/channel, and/or providing one or more responses to the one or more pending support requests to the one or more support client devices 118-*d*. To determine whether one or more pending support requests for information has been initiated, the polling component 226-1-1 may be arranged to periodically poll to support server device 112 based at least partially on a pre-determined internal (e.g., every second, every 10 seconds, every 15 seconds, every minute, every 10 minutes, every 15 minutes, every 30 minutes, every hour, etc.). It may be appreciated that by polling the storage support system 120 rather than receiving the support requests directly, the clients, users, administrators of the cluster storage system 150 may directly control and limit the amount of inbound and outbound information transmitted by the cluster storage system 150 and accordingly, reduce the potential scope or vector of cyber-attacks by reducing the number of open ports or eliminating all open ports for receiving connections from an external source.

The scheduler component 226-1-3 may be generally arranged to detect one or more events including, without limitation, one or more events generated by the CLI component 224-1-1, enqueue the one or more detected events into an event queue (not shown), dequeue one or more enqueued events from the event queue, request the generation and/or transmission of one or more trigger queries to the support server device 112, and/or request the generation and/or transmission of one or more collection containers to the storage support system 120.

The support client component 226-1-2 may be generally arranged to initiate automated support by generating one or more trigger queries, receive one or more trigger query responses, and/or caching the received one or more trigger query responses. The one or more trigger query responses may include, without limitation, delivery location information (e.g., uniform resource identifier (URI), uniform resource locator (URL), etc.) representative of a reference path for delivering one or more collection containers to the storage support system 120.

The collector component 226-1-4 may be generally arranged to 1) aggregate information generated by the one or more components of the cluster node 104-1 and stored in local storage 212-1 operatively coupled to the cluster node 104-1, and 2) generate one or more collection containers based at least partially on the one or more events including one or more event parameters. In some embodiments, the collection component 226-1-4 may be configured to aggregate diagnostic information stored in the diagnostic datastore 212-1-1, generate a diagnostic collection container based at least partially on the aggregated diagnostic information, determine collection container information based at least partially on the aggregated diagnostic information, and store the generated diagnostic collection container in the delivery datastore 212-1-3. In some embodiments, the collection component 226-1-4 may be further configured to aggregate performance information stored in the diagnostic datastore 212-1-1, generate a performance collection container based at least partially on the aggregated performance information, determine collection container information based at least partially on the aggregated performance information, and store the generated performance collection container in the delivery datastore 212-1-3.

The delivery component 226-1-5 may be generally arranged to deliver generated collection containers and associated collection container information stored in the delivery datastore 212-1-3 to the storage support system 120. In some embodiments, the delivery component 226-1-5 may be configured to segment the collection containers into one or more container segments, determine container segment information for each container segment, and/or deliver the one or more container segments and associated container segment information to the storage support system 120.

Also illustrated in FIG. 2, the cluster node 104-1 and in particular D-Blade component 220-1 may be further operatively coupled to a local storage 212-1. The local storage 212-1 may be generally arranged to store information associated with the execution and/or operation of the cluster node 104-1. The local storage 212-1 may include, without limitation, one or more local datastores 212-1-f. The one or more local datastores 212-1-f may include, without limitation, a diagnostic datastore 212-1-1, a performance datastore 212-1-2, and/or delivery datastore 212-1-3.

The diagnostic datastore 212-1-1 may be generally arranged to store one or more diagnostic containers comprising diagnostic information associated with one or more objects and/or components of the cluster node 104-1. The one or more diagnostic containers which may include, without limitation, core dump container comprising core dump information. The core dump information may include, without limitation, memory contents for user space and/or kernel space, component states for one or more components of cluster node 104-1, processor states for one or more processors of the cluster node 104-1 associated with a system failure or system crash (e.g., panic condition, etc.).

The performance datastore 212-1-2 may be generally arranged to store one or more performance containers comprising performance information associated with one or more objects in one or more components of the cluster node 104-1. The performance information may include, without limitation, workload queue N-Blade object, workload queue D-Blade object, workload queue S-Blade object, workload object, resource object, resource configuration object, workload configuration object, workload volume configuration object, aggregate object, disk object, CIFS object, FCP object, ifnet object, iSCSI object, or any other object in the cluster node 140-1.

The delivery datastore 212-1-3 may be generally arranged to store temporary support containers, and/or collection containers, generated by the collector component 226-1-4 and/or delivery component 226-1-5. It may be appreciated that depending on a particular implementation, each local datastore (e.g., diagnostic datastore 212-1-1, performance datastore 212-1-2, delivery datastore 212-1-3, etc.) of the one or more local datastores 212-1-f may be associated of one or more locations (e.g., paths, directories, sub-directories, etc.) within the file system of the node storage 112-1. Each location of the one or more locations may include, without limitation, the one or more containers (e.g., files, symbolic links, etc.) comprising information associated with the one or more local datastores 212-1-f. In one non-limiting exemplary embodiment, the diagnostic datastore 212-1-1 may be associated with and/or representative of the directory "/mroot/etc/crash" in the file system of the node storage 112-1. In another non-limiting exemplary embodiment, the performance datastore 212-1-2 may be associated with and/or representative of the directories "/mroot/etc/log/stats/ccma" and "/mroot/etc/log/rastrace" in the file system of the node storage 112-1. In yet another non-limiting exemplary embodiment, the delivery datastore 212-1-3 may be associated with and/or representative of the directory "/mroot/etc/log/autosupport" in the file system of the node storage 112-1.

Included herein is a set of embodiments and their associated operating environments representative of exemplary uses cases of one or more processes, steps, and/or events for performing novel aspects of the disclosed architecture. While, for purposes of simplicity of explanation, the one or more processes, steps, and/or events shown herein, for example, in the form of one or more use case diagrams and described as a series of timed sequence of processes, steps, and/or events, it is to be understood and appreciated that the one or more processes, steps, and/or events are not limited by the time or order shown, as some of the processes, steps, and/or events may, in accordance, occur in a different order, at a different time, and/or concurrently with other processes, steps, and/or events from that shown and described herein. Moreover, not all processes, steps, and/or events illustrated in a methodology may be needed for a novel implementation.

Figure 3A:
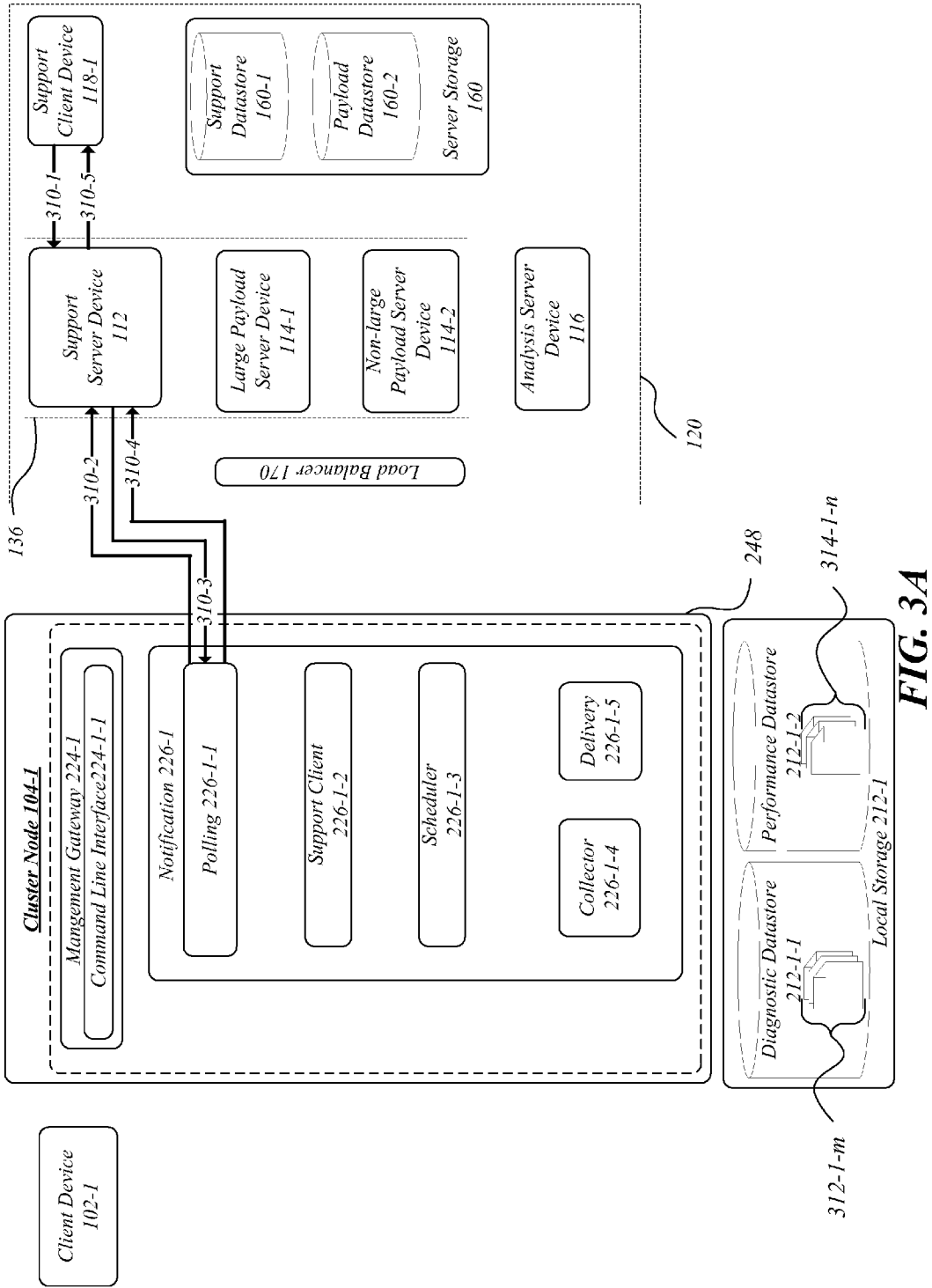
FIG. 3A illustrates an operating environment of the large payload support system for retrieving datastore information.

FIG. 3A illustrates an operating environment 300 of the large payload support system for retrieving datastore information. As illustrated in FIG. 3A, the support client device 118-1 may be configured to request for local datastore information from a cluster node 104-1 of a cluster storage system 150 having an associated client and client support account information at 310-1. In some embodiments and in particular, the support client device 118-1 may be configured to request for local datastore information by generating a support initiated local storage information request, and providing the request to the support server device 112 for enqueuing by the support server device 112 into a support server buffer (not shown) of one or more support server buffers, where the support server buffer may be associated with a client support account represented by client support account information. The support initiated local datastore information request may include, without limitation, one or more information datastore request parameters, which may include, without limitation, a datastore parameter (e.g., one or more directories identifying the local datastore, etc.), a recursion parameter (e.g., whether to include one or more sub-directories of the one or more directories, etc.), a polling rate parameter (e.g., the updated polling interval or rate of the polling component 226-1-1), and/or request identifier parameter (e.g., a unique identifier associated with the support initiated local datastore information request etc.).

The polling component 226-1-1 of cluster node 104-1 may be configured to 1) establish a secure communications connection and/or channel with support server device 112 and 2) poll the support server device 112 based at least partially on a pre-determined interval at 310-2. In some embodiments and in particular, the polling component 226-1-1 of cluster node 104-1 may be configured to establish a secure communications connection/channel by utilizing based at least partially on one or more cryptographic protocols such as, for example, TLS or SSL protocol. The polling component 226-1-1 of cluster node 104-1 may be further configured to poll the support server device 112 by generating and transmitting a poll query over the established secure communications connection/channel utilizing, for example, HTTP protocol (i.e., HTTPS) based at least partially on a predetermined interval (e.g., every 5 minutes, etc.). The poll query may include, without limitation, client support identifier information.

The support server device 112 may be configured to 1) dequeue at least one request from a buffer (not shown) and 2) provide the local datastore information request to the polling component 226-1-1, in response to receiving the poll query at 310-3. For example, the support server device 112 may be configured to dequeue at least one request from the support server buffer (not shown) that is associated with the client support account information based at least partially on the client support identifier information included within the received poll query. The at least one request may include, without limitation, the previously enqueued local datastore information request. The support server device 112 may be further configured to provide the local datastore information request to the polling component 226-1-1 as a polling query response, which may encode the local datastore information request in one or more formats (e.g., extensible markup language (XML) format, etc.).

The polling component 226-1-1 may be configured to 1) determine the local datastore information for a local datastore based at least partially on the received local datastore information request, and 2) provide the local datastore information and local datastore header information to the support server device 112 at 310-4. In some embodiments and in particular, the polling component 226-1-1 may be configured to determine local datastore information which may include, without limitation, a list of container information for one or more containers in the local datastore (e.g., diagnostic datastore 212-1, performance datastore, 212-1-2, delivery datastore 212-1-3, etc.) identified by the datastore parameter (e.g., "/mroot/etc/crash" identifying the diagnostic datastore 212-1-1, "/mroot/etc/log/stats/ccma" and "/mroot/etc/logs/rastrace" identifying the performance datastore 212-1-2, etc.).

With continued reference to the polling component 226-1-1 at 310-4, in some embodiments, the polling component 226-1-1 may be configured to determine the local datastore information for a local datastore (e.g., diagnostic datastore 212-1, performance datastore, 212-1-2, delivery datastore 212-1-3, etc.) identified by the datastore parameter. In some embodiments, the polling component 226-1-1 may be further configured to determine whether to provide a portion of containers in the identified local datastore or all containers in the local datastore based on the recursion parameter (e.g., whether to include any files in any subdirectories of "/mroot/etc/log/stats/ccma" or, etc.). In some embodiments, the polling component 226-1-1 may be further configured to update the existing polling rate to the polling rate identified by the polling rate parameter.

With continued reference to the polling component 226-1-1 at 310-4 and in a non-limiting example, the polling component 226-1-1 may be configured to determine local datastore information for all diagnostic containers 312-1-*m* including diagnostic information stored in the diagnostic datastore 212-1-1, when the datastore parameter includes "/mroot/etc/crash" and the recursion parameter indicates the inclusion of all containers. By way of another non-limiting example, the polling component 226-1-1 may be configured to determine local datastore information for all performance containers 314-1-*n* including performance information stored in the performance datastore 212-1-2, when the datastore parameter includes "/mroot/etc/log/stats/ccma" and "/mroot/etc/logs/rastrace" and the recursion parameter indicates the inclusion of all containers.

With continued reference to the polling component 226-1-1 at 310-4, in some embodiments, the polling component 226-1-1 may be configured to determine a list of container information for one or more containers of the identified local datastore, utilizing, for example, one or more storage operating system 248 application program interfaces (APIs) (e.g., scandir( ), readdir( ) etc.). The container information in the list of container information for each container may include, without limitation, container location information (e.g., full path to the container including container name, etc.), date and time information (e.g., the date and time the container was last modified, created, etc.), size information (e.g., size of the container in bytes), owner account information (e.g., the owner of the container, etc.), owner group information (e.g., the group the owner belongs to, etc.), access control information (e.g., the access control (read, write, execute, etc.) permission of the owner account, the owner group, and any other entity, etc.), and/or link information (e.g., number of references to the container, etc.).

With continued reference to the polling component 226-1-1 at 310-4, the polling component 226-1-1 may be further configured to provide the local datastore information and local datastore header information to the support server device 112 by transmitting the local datastore information and local datastore header information to the support server device 112, in response to the local datastore information request received from the support server device 112. The local datastore header information may include, without limitation, request identifier information which may include a unique identifier as indicated by the request identifier parameter, and/or local datastore name information which may include, without limitation, cluster node system identifier information (e.g., a serial number or identifier associated with a cluster node and/or cluster storage system, etc.), and/or timestamp information (e.g., timestamp of the current local time associated with the cluster node 104-1).

The support server device 112 may optionally provide the received local datastore information and/or local datastore header information to the support client device 118-1 for visual presentation on a display device (not shown) operatively coupled to the support client device 118-1 at 310-5.

Figure 3B:
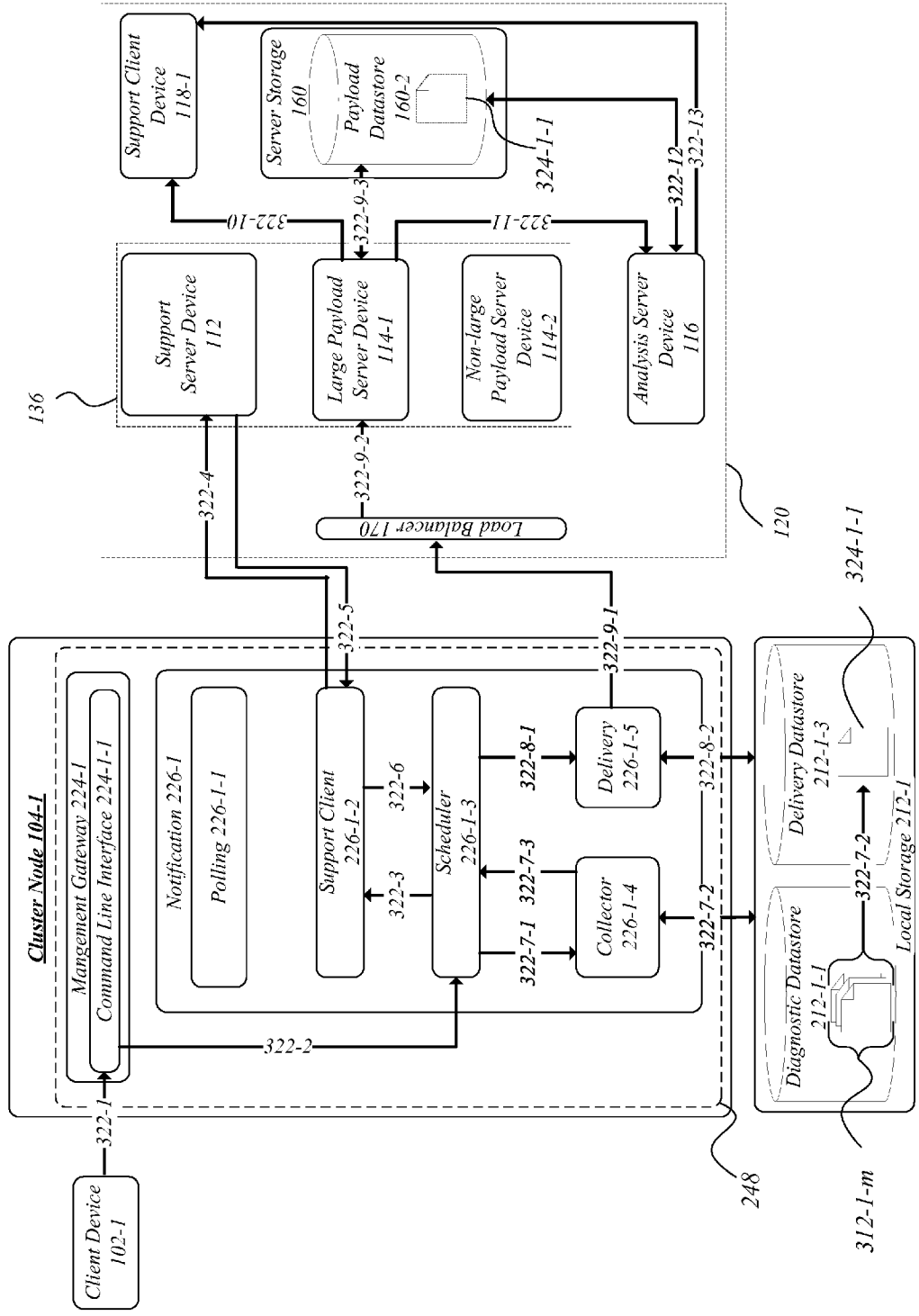
FIG. 3B illustrates an operating environment of the large payload support system for initiating the transfer of diagnostic information by a client device.

FIG. 3B illustrates an operating environment 320 of the large payload support system 100 for initiating the transfer of diagnostic information by a client device 102-1.

As illustrated in FIG. 3B, the client device 102-1 may be configured to request the transfer of a diagnostic container comprising diagnostic information to the storage support system 120 at 322-1. In some embodiments and in particular, the client device 102-1, may be configured to request the transfer of the diagnostic container by issuing a command line diagnostic transfer command having one or more diagnostic transfer parameters via a cluster management logical interface (not shown). The one or more diagnostic transfer parameters may include, without limitation, diagnostic container name parameter (e.g., a diagnostic container name identifying the diagnostic container to be transferred, etc.). Optionally, the one or more diagnostic transfer parameters may further include, without limitation, diagnostic container location parameter representative of a container name associated with the diagnostic container (e.g., a directory, path, and/or URI/URL identifying the datastore storing the diagnostic container such as "/mroot/etc/crash/", etc.), cluster node name parameter representative of an identifier associated with a cluster node (e.g., an identifier such as a sequence of numbers, characters, and/or symbols identifying which cluster node the diagnostic information is to be transferred, etc.), message parameter representative of a message (e.g., a message provided to a support client device such as support client device 118-1 after transfer, etc.), transfer location parameter representative of a URI/URL destination (e.g., a location such as a URI/URL for transferring the diagnostic information with a default location of "https://support.netapp.com/AsupPut", etc.), maximum segment size parameter (e.g., a size value in bytes with the default maximum segment size of 104,857,600 bytes or approximately 100 MB, etc.) for indicating the maximum size for each container segment, maximum transmit rate parameter for indicating the maximum rate that data for containers and/or container segments may be transmitted (e.g., a rate in bytes per second with the default value of 0 for indicating no limit, etc.), maximum receive rate parameter for indicating the maximum rate that data associated with the transfer of containers and/or container segments may be received, delivery processor parameter for indicating the number of delivery processors (e.g., a numerical value with the default of 4 to indicate a default of 4 delivery processors, etc.), and/or case reference parameter representative of case reference information (e.g., a reference such as a sequence of numbers, characters, and/or symbols associated with the one or more diagnostic containers comprising the diagnostic information, etc.).

With continued reference to the client device 102-1 at 322-1 and in a non-limiting example, a command line diagnostic transfer command may include, without limitation, "system node autosupport invoke-core-upload—corefilename corefile—message 'This is a corefile upload for latest crash'" which may request the transfer of a diagnostic container (e.g., diagnostic container 312-1-1) stored in diagnostic datastore 212-1-1 operatively coupled to cluster node 104-1 having the name "corefile.nz" with a message of "This is a corefile upload for a latest crash" to location "https://support.netapp.com/AsupPut".

The CLI component 224-1-1 may be configured to notify the scheduler component 226-1-3 of a transfer request to transfer diagnostic information, in response to the request from client device 102-1 to transfer a diagnostic container comprising diagnostic information at 322-2. In some embodiments and in particular, the command line interface 224-1-1 may be configured to notify the scheduler component 226-1-3 of a diagnostic container transfer request to transfer a diagnostic container comprising diagnostic information by generating a diagnostic transfer event comprising the one or more diagnostic transfer parameters discussed above and/or elsewhere for distribution by the EMS to the one or more components of the cluster node 102-1 (e.g., scheduler component 226-1-3, etc.). Additionally, the diagnostic transfer event may further comprise a large payload parameter which may indicate that the transfer of the diagnostic container may require large upload support.

The scheduler component 226-1-3 may be configured to 1) detect the generated diagnostic transfer event, 2) enqueue the detected diagnostic transfer event into a buffer (not shown), 3) dequeuing an event from the buffer (not shown), where the dequeued event may include, without limitation, the diagnostic transfer event, and 4) request the generation and/or transmission of a trigger query based at least partially on the diagnostic transfer event at 322-3. In some embodiments and in particular, the scheduler component 226-1-13 may be configured to detect the diagnostic transfer event distributed by the EMS (not shown) and enqueue the event into a scheduler buffer (not shown) within the scheduler component 226-1-3. In some embodiments, the scheduler component 226-1-3 may be configured to dequeue an event from the scheduler buffer, where the event dequeued may include, without limitation, the diagnostic transfer event. However, it may be appreciated that based at least partially on the order and/or timing of one or more events that was enqueued, in actual implementation, the next dequeued event may or may not include the diagnostic transfer event. Assuming that the dequeued event includes the diagnostic transfer event, in some embodiments, the scheduler component 226-1-3 may be further configured to request the support client component 226-1-2 to at least transmit a diagnostic transfer trigger query comprising one or more diagnostic transfer parameters discussed above and/or elsewhere.

The support client component 226-1-2 may be configured to 1) generate the diagnostic transfer trigger query comprising one or more diagnostic transfer parameters, 2) establish a secure communications connection/channel with server support device 112, and 3) transmitting the diagnostic transfer trigger query to the support server device 112 over the secure communications connection/channel at 322-4. In some embodiments and in particular, the support client component 226-1-2 may be configured to generate the diagnostic transfer trigger query comprising one or more diagnostic transfer parameters and/or a large payload parameter, and establish a secure communications connection/channel with server support device 112 utilizing TLS or SSL protocol. In some embodiments, after the secure communications connection/channel is established, the support client component 226-1-2 may further transmit the diagnostic transfer trigger query to the support server device 112 over the established secure communications connection/channel, in response to the request from the scheduler component 226-1-3.

The support server device 112 may be configured to transmit a trigger query response to the support client 226-1-2, in response to the diagnostic transfer trigger query at 322-5. In some embodiments and in particular, in response to receiving the diagnostic transfer trigger query, the support server device 112 may be configured to transmit a diagnostic transfer trigger query response. The diagnostic transfer trigger query response may include, without limitation, diagnostic transfer trigger query response information. The diagnostic transfer trigger query response information may include, without limitation, delivery location information. Optionally, diagnostic transfer trigger query response may further include, without limitation, case reference information and/or diagnostic container name information. The diagnostic transfer trigger query response information may be encoded in one or more formats (e.g., extensible markup language (XML) format, etc.).

The support client component 226-1-2 may be configured to provide the received diagnostic transfer trigger query response to the scheduler component 226-1-3, in response to receiving the diagnostic transfer trigger query response from the support server device 112 at 322-6.

The scheduler component 226-1-3 may be configured to request the collector component 226-1-4 to generate a diagnostic collection container 324-1-1, in response to receiving the diagnostic transfer trigger query response at 322-7-1.

The collector component 226-1-4 may be configured to generate a diagnostic collection container 324-1-1 comprising diagnostic information based at least partially on one or more diagnostic containers 312-1-$m$ and one or more diagnostic transfer parameters at 322-7-2. In some embodiments and in particular, the collection component 226-1-14 may be configured to generate a diagnostic container 324-1-1 based at least partially on diagnostic container name parameter which may be further discussed with respect to FIG. 4.

The collector component 226-1-4 may be configured to notify the scheduler component 226-1-3 regarding the generation of the diagnostic collection container 324-1-1, after the diagnostic collection container 324-1-1 has been generated at 322-7-3. In some embodiments, and in particular, the collector component 226-1-4 may be configured to notify the scheduler component 226-1-3 by generating and providing a diagnostic collection complete notification comprising collection container location information, collection container name information, and/or container integrity information which may be further discussed with respect to FIG. 4.

The scheduler component 226-1-3 may be configured to request the delivery of the diagnostic collection container 324-1-1 to the storage support system 120 after the generation of the diagnostic collection container 324-1-1 at 322-8-1. In some embodiments and in particular, the scheduler component 226-1-3 may be configured to request the delivery of the diagnostic collection container 324-1-1 by generating a diagnostic collection container delivery request comprising the collection container location information, the collection container name information, the one or more diagnostic transfer parameters, and/or large payload parameter discussed above and/or elsewhere. To request the delivery of the diagnostic collection container 324-1-1, the scheduler component 226-1-3 may also be configured to provide the diagnostic collection container delivery request to the delivery component 226-1-5 to request the delivery of the diagnostic collection container 324-1-1 to the storage support system 120 (e.g., large payload server device 114-1 and/or non-large payload server device 114-2, etc.) at 322-8-1.

The delivery component 226-1-5 may be optionally configured to segment the diagnostic collection container 324-1-1 into one or more container segments at 322-8-2. In some embodiments and in particular, the delivery component 226-1-5 may be optionally configured to segment the diagnostic collection container 324-1-1 into one or more container segments, when the large payload parameter indicates that large payload support is required which may be further discussed with respect to FIG. 5.

Generally, the delivery component 226-1-5 may be configured to deliver the diagnostic collection container 324-1-1 and associated transfer container header information to a payload server device (e.g., non-large payload server device 114-2, etc.) of the storage support system 120 via the load balancer device 170 at 322-9-1. However, in instances when the large payload parameter indicates that large payload support is required and consequently, the delivery component 226-1-5 has optionally segmented the diagnostic collection container 324-1-1 into one or more container segments, the delivery component 226-1-5 may deliver the one or more container segments of the diagnostic collection container 324-1-1 and associated transfer segment header information, serially or in parallel, over the one or more secure communications connections/channels to the load balancer device 170 which may be further discussed with respect to FIG. 5.

Assuming that the delivery component 226-1-5 has optionally segmented the diagnostic collection container 324-1-1, the load balancer device 170 may be configured to 1) receive one or more container segments of the diagnostic collection container 324-1-1, and 2) provide the received one or more container segments to the large payload server device 114-1 at 322-9-2. In those embodiments and in particular, the load balancer device 170 may be configured to receive one or more container segments serially or substantially in parallel over the one or more established secure communications connections/channels. Furthermore, in those embodiments, the delivery component 226-1-5 may be configured to provide the received one or more container segments and/or associated transfer segment header information to the large payload server device 114-1, when the transfer segment header information for a container segment indicates that the large payload support is required. Additionally or alternatively, the delivery component 226-1-5 may be configured to provide the received one or more collection containers and/or associated transfer container header information to the non-large payload server device 114-2, when the transfer container header information associated with a collection container indicates that the large payload support is not required or transfer segment header information has no indication (i.e., silent) whether large payload support is required.

Assuming that the delivery component 226-1-5 has optionally segmented the diagnostic collection container 324-1-1 and large payload support is required, the large payload server device 114-1 may be configured to 1) store the one or more received container segments, 2) aggregate the one or more container segments to form the diagnostic collection container 324-1-1, 3) verify integrity of the diagnostic collection container 324-1-1, 4) store the verified diagnostic collection container 324-1-1 in the payload datastore 160-2 at 322-9-3. In those embodiments and in particular, the large payload server device 114-1 may be configured to store the one or more received container segments in, for example, a temporary segment datastore (not shown) of a temporary storage (not shown) associated with the large payload server device 114-1. Each received container segment may be stored as a segment container having a container segment name to uniquely identify each and every container segment. In a non-limiting exemplary implementation, the container segment name may include, without limitation, a concatenation of the cluster node serial information, cluster node system identifier information, support generation timestamp information, segment number information, and/or total segments information, where the concatenated information may be delimited or separated by one or more symbols (e.g., "-", "_", "+", etc.).

With continued reference to those embodiments at 322-9-3, the large payload server device 114-1 may be further configured to join or aggregate the one or more segment containers representative of container segments based at least partially on the container name of the one or more segment containers which may include, without limitation the segment number information and/or total segments information for each container representative of each container segment. After aggregating the one or more container segments to form the diagnostic collection container 324-1-1, the large payload server device 114-1 may be further configured to verify the integrity of the diagnostic collection container 324-1-1 based at least partially on the received container integrity information and a generated recipient container integrity information. After the verification of the diagnostic collection container 324-1-1, the large payload server device 114-1 may be configured to store the diagnostic collection container 324-1-1 in the payload datastore 160-2 of the server storage 160 and generate verification result information to indicate that the integrity of the diagnostic collection container 324-1-1 has been successfully maintained, when the verification indicates that the integrity of the diagnostic collection container 324-1-1 has been maintained.

The large payload server device 114-1 may be optionally configured to notify the support client device 118-1 of the transferred diagnostic collection container 324-1-1 at 322-10. In some embodiments and in particular, the large payload server device 114-1 may be configured to notify the support client device 118-1 of the transferred diagnostic collection container 324-1-1 by generating a diagnostic transfer notification (e.g., an e-mail notification, etc.) indicating that a new diagnostic collection container 324-1-1 has been received and providing the diagnostic transfer notification to a client support services account associated with a client support services user, which may be further associated with the support client device 118-1. The diagnostic transfer notification may include, without limitation, at least a portion of collection container information, support generation information, and/or verification result information further discussed with respect to FIG. 4.

The large payload server device 114-1 may also be optionally configured to notify the analysis server device 116 of the transferred diagnostic collection container 324-1-1 at 322-11. In some embodiments and in particular, the large payload server device 114-1 may also be optionally configured to notify the analysis server device 116 by generating a notification indicating that a new diagnostic collection container 324-1-1 has been received.

The analysis server device 116 may be optionally configured to determine whether the transferred diagnostic collection container 324-1-1 includes a new system error and/or system crash that has not been previously analyzed, in response to receiving the notification at 322-12.

The analysis server device 116 may be optionally configured to notify the support client device 118-1, when the transferred diagnostic collection container 324-1-1 includes a new system error and/or system crash that has not been previously analyzed at 322-13.

Figure 3C:
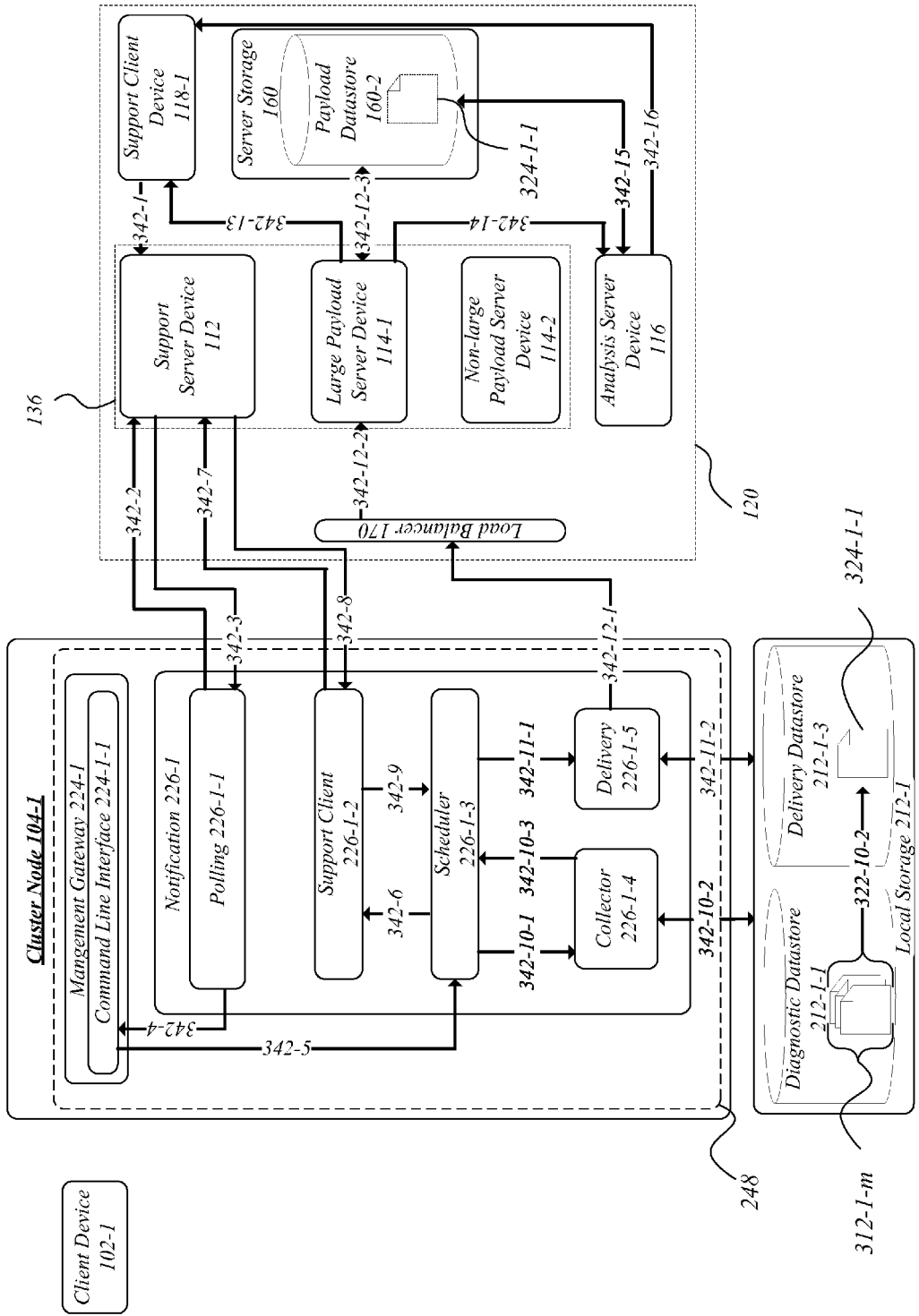
FIG. 3C illustrates an operating environment of the large payload support system for initiating the transfer of diagnostic information by a support client device.

FIG. 3C illustrates an operating environment 340 of the large payload support system 100 for initiating the transfer of diagnostic information by a support client device 118-1.

As illustrated in FIG. 3C, the support client device 118-1 may be configured to request the transfer of a diagnostic container comprising diagnostic information to the storage support system 120 at 342-1. In some embodiments and in particular, the client device 102-1, may be configured to request the transfer of the diagnostic container by generating a support initiated diagnostic information request and providing the request to the support server device 112 for enqueuing by the support server device 112 into a support server buffer (not shown) of one or more support server buffers, where the support server buffer is associated with a client support account represented by client support account information. The support initiated diagnostic information request may include, without limitation, one or more diagnostic transfer parameters discussed above and/or elsewhere.

The polling component 226-1-1 of cluster node 104-1 may be configured to 1) establish a secure communications connection and/or channel with support server device 112 based at least partially on one or more cryptographic protocols and 2) poll the support server device 112 based at least partially on a pre-determined interval at 342-2. In some embodiments and in particular, the polling component 226-1-1 of cluster node 104-1 may be configured to establish a secure communications connection/channel by utilizing TLS or SSL protocol. The polling component 226-1-1 of cluster node 104-1 may be further configured to poll the support server device 112 by generating and transmitting a poll query over the established secure communications connection/channel utilizing HTTP protocol (i.e., HTTPS) based on a predetermined interval or rate (e.g., every 5 minutes, etc.). The poll query may include, without limitation, client support identifier information.

The support server device 112 may be configured to 1) dequeue at least one request from a buffer (not shown) and 2) provide the support initiated diagnostic information request to the polling component 226-1-1, in response to the received poll query at 342-3. In some embodiments and in particular, the support server device 112 may be configured to dequeue at least one request from a support server buffer (not shown) associated with the client support account information based at least partially on the client support identifier information. The at least one request may include, without limitation, the previously enqueued support initiated diagnostic information request. The support server device 112 may be further configured to provide the support initiated diagnostic information request as a polling query response, which may encode the support initiated diagnostic information request in one or more formats (e.g., extensible markup language (XML) format, etc.).

The polling component 226-1-1 may be configured to request the transfer of a diagnostic container comprising diagnostic information to the storage support system 120, in response to receiving the polling query response at 342-4. In some embodiments and in particular, the polling component 226-1-1 may be configured to request the transfer of a diagnostic container, in response to receiving the polling query response representative of the support initiated diagnostic information request by issuing a diagnostic transfer command having the one or more diagnostic transfer parameters via one or more APIs of the CLI component 224-1-1.

The CLI component 224-1-1 may be configured to notify the scheduler component 226-1-3 of a transfer request to transfer diagnostic information based at least partially on a generated diagnostic transfer event at 342-5. In some embodiments and in particular, the command line interface 224-1-1 may be configured to notify the scheduler component 226-1-3 of a diagnostic container transfer request to transfer a diagnostic container comprising diagnostic information by generating a diagnostic transfer event comprising the one or more diagnostic transfer parameters for distribution by the EMS to one or more components of cluster node 104-1 (e.g., scheduler component 226-1-3, etc.) discussed above and/or elsewhere. Additionally, the diagnostic transfer event may further comprise a large payload parameter which may indicate that the transfer of the diagnostic container may require large upload support.

The scheduler component 226-1-3 may be configured to 1) detect the generated diagnostic transfer event, 2) enqueue the detected diagnostic transfer event into a buffer (not shown), 3) dequeuing an event from the buffer (not shown), where the dequeued event may include, without limitation, the diagnostic transfer event, and 4) request the generation and/or transmission of a trigger query based at least partially on the diagnostic transfer event at 342-6. In some embodiments and in particular, the scheduler component 226-1-3 may be configured to perform one or more processes, steps, and/or events substantially similar to those discussed above at 322-3.

The support client component 226-1-2 may be configured to 1) generate the diagnostic transfer trigger query comprising one or more diagnostic transfer parameters, 2) establish a secure communications connection/channel with server support device 112, and 3) transmitting the diagnostic transfer trigger query to the support server device 112 over the secure communications connection/channel at 342-7. In some embodiments and in particular, the support client component 226-1-2 may be configured to perform one or more processes, steps, and/or events substantially similar to those discussed above at 322-4.

The support server device 112 may be configured to transmit a trigger query response to the support client 226-1-2, in response to the diagnostic transfer trigger query at 342-8. In some embodiments and in particular, the support server device 112 may be configured substantially similar as discussed above at 322-5.

The support client component 226-1-2 may be configured to provide the received diagnostic transfer trigger query response to the scheduler component 226-1-3, in response to receiving the diagnostic transfer trigger query response from the support server device 112 at 342-9.

The scheduler component 226-1-3 may be configured to request the collector component 226-1-4 to generate a diagnostic collection container 324-1-1, in response to receiving the diagnostic transfer trigger query response at 342-10-1.

The collector component 226-1-4 may be configured to generate a diagnostic collection container 324-1-1 comprising diagnostic information based at least partially on one or more diagnostic containers 312-1-$m$ and one or more diagnostic transfer parameters at 322-10-2. In some embodiments and in particular, the collector component 226-1-4 may be configured to perform one or more processes, steps, and/or events substantially similar to those discussed above at 322-7-2.

The collector component 226-1-4 may be configured to notify the scheduler component 226-1-3 regarding the generation of the diagnostic collection container 324-1-1 after the diagnostic collection container 324-1-1 has been generated at 322-10-3.

The scheduler component 226-1-3 may be configured to request the delivery of the diagnostic collection container 324-1-1 to the storage support system 120 after the generation of the diagnostic collection container 324-1-1 at 342-11-1. In some embodiments and in particular, the scheduler component 226-1-3 may be configured to perform one or more processes, steps, and/or events substantially similar to those discussed above at 322-8-1.

The delivery component 226-1-5 may be optionally configured to segment the diagnostic collection container 324-1-1 into one or more container segments at 342-11-2. In those embodiments and in particular, the delivery component 226-1-5 may be configured to perform one or more processes, steps, and/or events substantially similar to those discussed above at 322-8-2.

Generally, the delivery component 226-1-5 may be configured to deliver the diagnostic collection container 324-1-1 and associated transfer container header information to a payload server device (e.g., non-large payload server device 114-2, etc.) of the storage support system 120 via the load balancer device 170 at 342-12-1. However, in instances when the large payload parameter indicates that large payload support is required and consequently, the delivery component has optionally segmented the diagnostic collection container 324-1-1 into one or more container segments, the delivery component 226-1-5 may deliver the one or more container segments of diagnostic collection container 324-1-1 and associated transfer segment header information, serially or in parallel, over the one or more secure communications connections/channels to the load balancer device 170. In the immediately above embodiments and in particular, the delivery component 226-1-5 may be configured to perform one or more processes, steps, and/or events substantially similar to those discussed above at 322-9-1 and further discussed with respect to FIG. 5.

Assuming that the delivery component 226-1-5 has been optionally configured to segment the diagnostic collection container 324-1-1, the load balancer device 170 may be configured to 1) receive one or more container segments of the diagnostic collection container 324-1-1, and 2) provide the received one or more container segments to the large payload server device 114-1 at 342-12-2. In those embodiments and in particular, the load balancer device 170 may be configured substantially similar as discussed above at 322-9-2.

Assuming that the delivery component 226-1-5 has optionally segmented the diagnostic collection container 324-1-1, the large payload server device 114-1 may be configured to 1) store the one or more received container segments, 2) join the one or more container segments to form the diagnostic collection container 324-1-1, 3) verify integrity of the diagnostic collection container 324-1-1, 4) store the verified diagnostic collection container 324-1-1 in the payload datastore 160-2 at 342-12-3. In those embodiments and in particular, the large payload server device 114-1 may be configured substantially similar as discussed above at 322-9-3.

The large payload server device 114-1 may be optionally configured to notify the support client device 118-1 of the transferred diagnostic collection container 324-1-1 at 342-13. In some embodiments and in particular, the large payload server device 114-1 may be configured substantially similar as discussed above at 322-10.

The large payload server device 114-1 may also be optionally configured to notify the analysis server device 116 of the transferred diagnostic collection container 324-1-1 at 342-14. In some embodiments and in particular, the large payload server device 114-1 may be configured substantially similar as discussed above at 322-11.

The analysis server device 116 may be optionally configured to determine whether the transferred diagnostic collection container 324-1-1 includes a new system error and/or system crash that has not been previously analyzed, in response to receiving the notification at 342-15.

The analysis server device 116 may be optionally configured to notify the support client device 118-1, when the transferred diagnostic collection container 324-1-1 includes a new system error and/or system crash that has not been previously analyzed at 342-16.

Figure 3D:
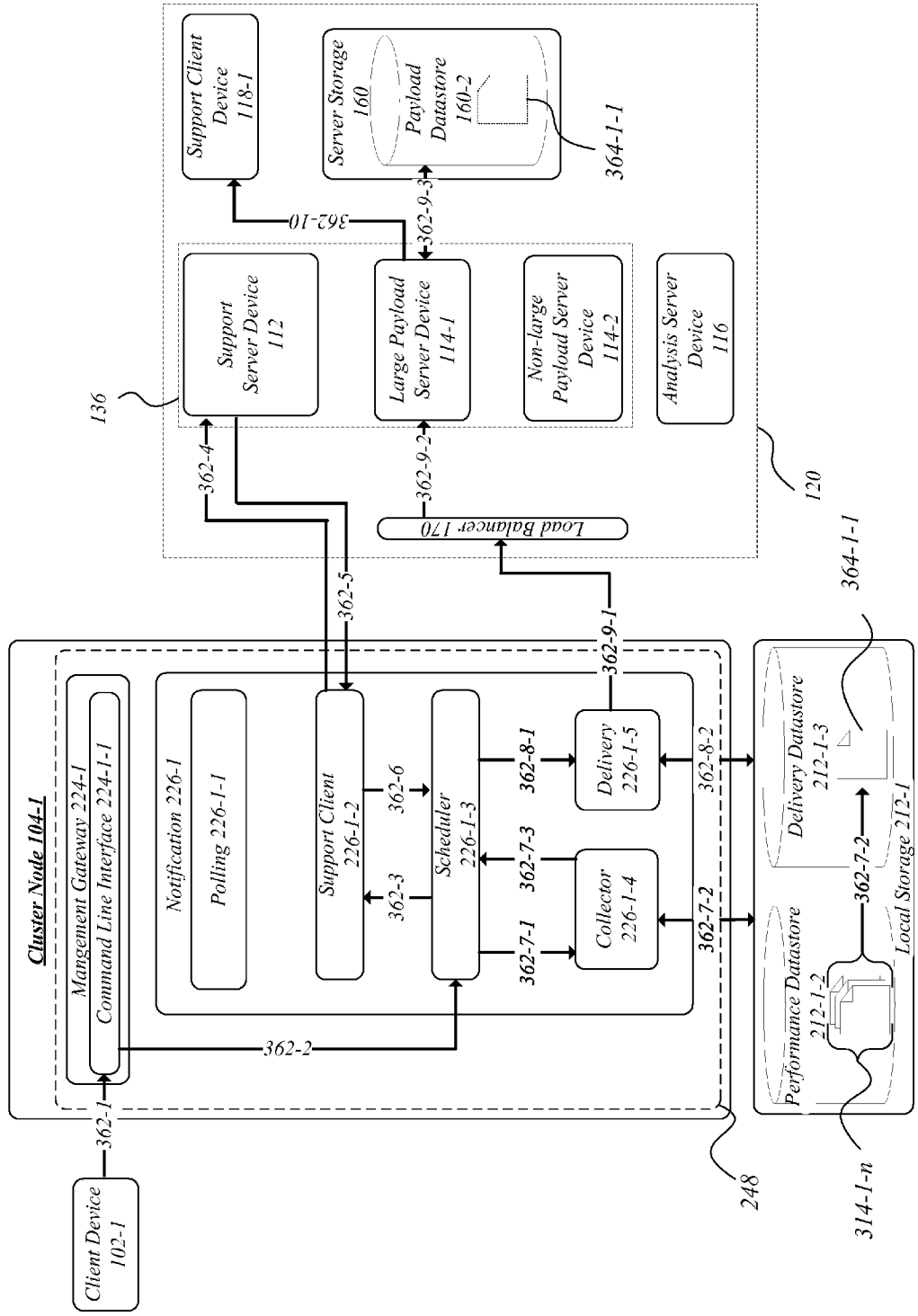
FIG. 3D illustrates an operating environment the large payload support system for initiating the transfer of performance information by a client device.

FIG. 3D illustrates an operating environment 360 of the large payload support system 100 for initiating the transfer of performance information by a client device 102-1.

As illustrated in FIG. 3D, the client device 102-1 may be configured to request the transfer of one or more performance containers comprising performance information to the storage support system 120 at 362-1. In some embodiments and in particular, the client device 102-1, may be configured to request the transfer of one or more performance containers comprising performance information by issuing a command line performance transfer command having one or more performance transfer parameters via a cluster management logical interface (not shown). The one or more performance transfer parameters may include, without limitation, start time parameter and end time parameter. In some embodiments, the start time parameter and end time parameter may be received via received the command line in a "MM/DD/YYYY HH:MM:SS" format where "MM" represents the two digit month, "DD" represents the two digit date, "YYYY" represents the four digit year, "HH" represents the two digit hour, "MM" represents two digit minutes, and "SS" represents the two digit seconds. In other embodiments, the start time parameter and end time parameter may be received via one or more APIs of the command in a different format such as, for example, Portable Operating System Interface (POSIX) time or Epoch time starting from 01/01/1970 at 00:00:00 Coordinated Universal Time (UTC). Optionally, the one or more performance transfer parameters may further include, without limitation, cluster node name parameter representative of an identifier associated with a cluster node (e.g., an identifier such as a sequence of numbers, characters, and/or symbols identifying which cluster node the performance information is to be transferred, etc.), message parameter representative of a message (e.g., a message provided to a support client device such as support client device 118-1 after transfer, etc.), transfer location parameter representative of a URI/URL destination (e.g., a location such as a URI/URL for transferring the performance information with a default location of "https://support.netapp.com/AsupPut", etc.), maximum segment size parameter (e.g., a size value in bytes with the default maximum segment size of 104,857,600 bytes or approximately 100 MB, etc.) for indicating the maximum size for each container segment, maximum transmit rate parameter for indicating the maximum rate that data for containers and/or container segments may be transmitted (e.g., a rate in bytes per second with the default value of 0 for indicating no limit, etc.), maximum receive rate parameter for indicating the maximum rate that data associated with the transfer of containers and/or container segments may be received, delivery processor parameter for indicating the number of delivery processors (e.g., a numerical value with the default of 4, etc.), and/or case reference parameter representative of case reference information (e.g., a reference comprising a sequence of numbers, characters, and/or symbols associated with the one or more performance containers comprising the performance information such as "ABC123456", etc.).

With continued reference to the client device 102-1 at 362-1 and in a non-limiting example, a command line performance transfer command may include, without limitation, "system node autosupport invoke-performance-archive—start-date 12/20/2013 19:19:47—end-date 12/20/2013 23:00:00—message 'This is a performance upload for 12/20/2013' which may request the transfer of one or more performance containers (e.g., performance containers 314-1-n) stored in performance datastore 212-1-2 operatively coupled to cluster node 104-1 having performance container creation time between 12/20/2013 19:19:47 and 12/20/2013 23:00:00 with a message of "This is a performance upload for 12/20/2013" to location "https://support.netapp.com/AsupPut".

The CLI component 224-1-1 may be configured to notify the scheduler component 226-1-3 of a transfer request to transfer performance information, in response to the request to transfer one or more performance containers from client device 102-1 comprising performance information at 362-2. In some embodiments and in particular, the command line interface 224-1-1 may be configured to notify the scheduler component 226-1-3 of a performance container transfer request to transfer one or more performance containers comprising performance information by generating a performance transfer event comprising the one or more performance transfer parameters discussed above and/or elsewhere for distribution by the EMS to the one or more components of the cluster node 102-1 (e.g., scheduler component 226-1-3, etc.). Additionally, the performance transfer event may further comprise a large payload parameter which may indicate that the transfer of the one or more performance containers may require large upload support.

The scheduler component 226-1-3 may be configured to 1) detect the generated performance transfer event, 2) enqueue the detected performance transfer event into a buffer (not shown), 3) dequeuing an event from the buffer (not shown), where the dequeued event may include, without limitation, the performance transfer event, and 4) request the generation and/or transmission of a trigger query based at least partially on the performance transfer event at 362-3. In some embodiments and in particular, the scheduler component 226-1-13 may be configured to detect the performance transfer event distributed by the EMS (not shown) and enqueue the event into a scheduler buffer (not shown) within the scheduler component 226-1-3. In some embodiments, the scheduler component 226-1-3 may be configured to dequeue an event from the scheduler buffer, where the event dequeued may include, without limitation, the performance transfer event. However, it may be appreciated that based at least partially on the order and/or timing of one or more events that was enqueued, in actual implementation, the next dequeued event may or may not include the performance transfer event and may include, without limitation, the performance transfer event discussed above or elsewhere. Assuming that the dequeued event includes the performance transfer event, in some embodiments, the scheduler component 226-1-3 may be further configured to request the support client component 226-1-2 to at least transmit a performance transfer trigger query comprising one or more performance transfer parameters discussed above and/or elsewhere.

The support client component 226-1-2 may be configured to 1) generate the performance transfer trigger query comprising one or more performance transfer parameters, 2) establish a secure communications connection/channel with server support device 112, and 3) transmitting the performance transfer trigger query to the support server device 112 over the secure communications connection/channel at 362-4. In some embodiments and in particular, the support client component 226-1-2 may be configured to generate the performance transfer trigger query comprising one or more performance transfer parameters and/or a large payload parameter, and establish a secure communications connection/channel with server support device 112 utilizing TLS or SSL protocol. In some embodiments, after the secure communications connection/channel is established, the support client component 226-1-2 may further transmit the performance transfer trigger query to the support server device 112 over the established secure communications connection/channel, in response to the request from the scheduler component 226-1-3.

The support server device 112 may be configured to transmit a trigger query response to the support client 226-1-2, in response to the performance transfer trigger query at 362-5. In some embodiments and in particular, in response to receiving the performance transfer trigger query, the support server device 112 may be configured to transmit a performance transfer trigger query response. The performance transfer trigger query response may include, without limitation, performance transfer trigger query response information. The performance transfer trigger query response information may include, without limitation, delivery location information. Optionally, performance transfer trigger query response may further include, without limitation, case reference information. The performance transfer trigger query response information may be encoded in one or more formats (e.g., XML format, etc.).

The support client component 226-1-2 may be configured to provide the received performance transfer trigger query response to the scheduler component 226-1-3, in response to receiving the performance transfer trigger query response from the support server device 112 at 362-6.

The scheduler component 226-1-3 may be configured to request the collector component 226-1-4 to generate a performance collection container, in response to receiving the performance transfer trigger query response at 362-7-1.

The collector component 226-1-4 may be configured to generate a performance collection container 364-1-1 comprising performance information based at least partially one or more performance containers 314-1-n and one or more performance transfer parameters at 362-7-2. In some embodiments and in particular, the collector component 226-1-4 may be configured to generate performance collection container 364-1-1 based at least partially on start time parameter and end time parameter which may be further discussed with respect to FIG. 4.

The collector component 226-1-4 may be configured to notify the scheduler component 226-1-3 regarding the generation of the performance collection container 364-1-1 after the performance collection container 364-1-1 has been generated at 362-7-3.

The scheduler component 226-1-3 may be configured to request the delivery of the performance collection container 364-1-1 to the storage support system 120 after the generation of the performance collection container 364-1-1 at 362-8-1. In some embodiments and in particular, the scheduler component 226-1-3 may be configured to request the delivery of the performance collection container 364-1-1 by generating a performance collection container delivery request comprising the collection container location information, the collection container name information, the one or more performance transfer parameters, and/or large payload parameter discussed above and/or elsewhere. To request the delivery of the performance collection container 364-1-1, the scheduler component 226-1-3 may also be configured to provide the performance collection container delivery request to the delivery component 226-1-5 to request the delivery of the performance collection container 364-1-1 to the storage support system 120 (e.g., large payload server device 114-1 and/or non-large payload server device 114-2, etc.) at 362-8-1.

The delivery component 226-1-5 may be optionally configured to segment the performance collection container 364-1-1 into one or more container segments at 362-8-2. In some embodiments and in particular, the delivery component 226-1-5 may be optionally configured to segment the performance collection container 364-1-1 into one or more container segments, when the large payload parameter indicates that large payload support is required which may be further discussed with respect to FIG. 5.

Generally, the delivery component 226-1-5 may be configured to deliver the performance collection container 364-1-1 and associated transfer container header information to a payload server device (e.g., non-large payload server device 114-2, etc.) of the storage support system 120 via the load balancer device 170 at 362-9-1. However, in instances when the large payload parameter indicates that large payload support is required and consequently, the delivery component 226-1-5 has optionally segmented the performance collection container 364-1-1 into one or more container segments, the delivery component 226-1-5 may deliver the one or more container segments of the performance collection container 364-1-1 and associated transfer segment header information, serially or in parallel, over the one or more secure communications connections/channels to the load balancer device 170 which may be further discussed with respect to FIG. 5.

Assuming that the delivery component 226-1-5 has optionally segmented the performance collection container 364-1-1, the load balancer device 170 may be configured to 1) receive one or more container segments of the performance collection container 364-1-1, and 2) provide the received one or more container segments to the large payload server device 114-1 at 362-9-2. In those embodiments and in particular, the load balancer device 170 may be configured to receive one or more container segments serially or substantially in parallel over the one or more established secure communications connections/channels. Furthermore, in those embodiments, the delivery component 226-1-5 may be configured to provide the received one or more container segments and/or associated transfer segment header information to the large payload server device 114-1, when the large payload indicator information of the transfer segment header information indicates that the large payload support is required. As discussed above at 322-9-2 and/or elsewhere, it may be appreciated that in instances when large payload indicator information is not present or does not indicate that large payload support is required, any received collection containers and/or associated transfer container header information may be provided to the non-large payload server device 114-2.

Assuming that the delivery component 226-1-5 has optionally segmented the performance collection container 364-1-1, the large payload server device 114-1 may be configured to 1) store the one or more received container segments, 2) aggregate the one or more container segments to form the performance collection container 364-1-1, 3) verify integrity of the performance collection container 364-1-1, 4) store the verified performance collection container 364-1-1 in the payload datastore 160-2 at 362-9-3. In those embodiments and in particular, the large payload server device 114-1 may be configured to store the one or more received container segments in, for example, a temporary segment datastore (not shown) of a temporary storage (not shown) associated with the large payload server device 114-1. Each received container segment may be stored as a segment container having a container segment name to uniquely identify each and every container segment. In a non-limiting exemplary implementation, the container segment name may include, without limitation, a concatenation of the cluster node serial information, cluster node system identifier information, support generation timestamp information, segment number information, and/or total segments information, where the concatenated information may be separated by one or more symbols (e.g., "–", "_", "+", etc.).

With continued reference to those embodiments at 322-9-3, the large payload server device 114-1 may be further configured to join or aggregate the one or more containers representative of container segments based at least partially on the container segment name (e.g., segment number information, total segments information, etc.) for each container representative of each container segment. After aggregating the one or more container segments to form the performance collection container 364-1-1, the large payload server device 114-1 may be further configured to verify the integrity of the performance collection container 364-1 based at least partially on the received container integrity information and a generated recipient container integrity information. After the verification of the performance collection container 364-1-1, the large payload server device 114-1 may be configured to store the performance collection container 364-1-1 in the payload datastore 160-2 of the server storage 160 and generate verification result information to indicate that the integrity of the performance collection container 364-1-1 has been successfully maintained, when the verification indicates that the integrity of the performance collection container 364-1-1 has been maintained.

The large payload server device 114-1 may be optionally configured to notify the support client device 118-1 of the transferred performance collection container 364-1-1 at 362-10. In some embodiments and in particular, the large payload server device 114-1 may be configured to notify the support client device 118-1 of the transferred performance collection container 364-1-1 by generating a performance transfer notification (e.g., an e-mail notification, etc.) indicating that a new performance collection container 364-1-1 has been received and providing the performance transfer notification to a client support services account associated with a client support services user associated with the support client device 118-1. The performance transfer notification may include, without limitation, at least a portion of performance collection container information, support generation information, and/or verification result information.

FIG. 3E illustrates an operating environment 380 of the large payload support system 100 for initiating the transfer of performance information by a support client device 118-1.

As illustrated in FIG. 3E, the support client device 118-1 may be configured to request the transfer of a one or more performance containers comprising performance information to the storage support system 120 at 382-1. In some embodiments and in particular, the client device 102-1, may be configured to request the transfer of the one or more performance containers by generating a support initiated performance information request and providing the request to the support server device 112 for enqueuing by the support server device 112 into a support server buffer (not shown) of one or more support server buffers, where the support server buffer is associated with a client support account represented by client support account information. The support initiated performance information request may include, without limitation, one or more performance transfer parameters discussed above and/or elsewhere.

The polling component 226-1-1 of cluster node 104-1 may be configured to 1) establish a secure communications connection and/or channel with support server device 112, and 2) poll the support server device 112 based at least partially on a pre-determined interval at 382-2. In some embodiments and in particular, the polling component 226-1-1 of cluster node 104-1 may be configured to establish a secure communications connection/channel by utilizing one or more cryptographic protocols such as, for example, TLS or SSL protocol. The polling component 226-1-1 of cluster node 104-1 may be further configured to poll the support server device 112 by generating and transmitting a poll query over the established secure communications connection/channel utilizing, for example, HTTP protocol (i.e., HTTPS) based on a predetermined interval or rate (e.g., every 5 minutes, etc.). The poll query may include, without limitation, client support identifier information.

The support server device 112 may be configured to 1) dequeue at least one request from a buffer (not shown) and 2) provide the support initiated performance information request to the polling component 226-1-1, in response to the received poll query at 382-3. In some embodiments and in particular, the support server device 112 may be configured to dequeue at least one request from a support server buffer (not shown) associated with the client support account information based at least partially on the client support identifier information. The at least one request may include, without limitation, the previously enqueued support initiated performance information request. The support server device 112 may be further configured to provide the support initiated performance information request as a polling query response, which may encode the support initiated performance information request in one or more formats (e.g., XML format, etc.).

The polling component 226-1-1 may be configured to request the transfer of one or more performance containers comprising performance information to the storage support system 120, in response to receiving the polling query response at 382-4. In some embodiments and in particular, the polling component 226-1-1 may be configured to request the transfer of one or more performance containers, in response to receiving the polling query response representative of the support initiated performance information request by issuing a performance transfer command having the one or more performance transfer parameters via one or more APIs of the CLI component 224-1-1. It may be appreciated and as discussed above, in instances when the performance transfer command is issued via the one or more APIs of the CLI component 224-1-1, the start time parameter and the end time parameter may be encoded in a POSIX time or epoch time format.

The CLI component 224-1-1 may be configured to notify the scheduler component 226-1-3 of a transfer request to transfer performance information based at least partially on a generated performance transfer event at 382-5. In some embodiments and in particular, the command line interface 224-1-1 may be configured to notify the scheduler component 226-1-3 of a performance container transfer request to transfer one or more performance containers comprising performance information by generating a performance transfer event comprising the one or more performance transfer parameters for distribution by the EMS to one or more components of cluster node 104-1 (e.g., scheduler component 226-1-3, etc.) discussed above and/or elsewhere. Additionally, the performance transfer event may further comprise a large payload parameter which may indicate that the transfer of the performance container may require large upload support.

The scheduler component 226-1-3 may be configured to 1) detect the generated performance transfer event, 2) enqueue the detected performance transfer event into a buffer (not shown), 3) dequeuing an event from the buffer (not shown), where the dequeued event may include, without limitation, the performance transfer event, and 4) request the generation and/or transmission of a trigger query based at least partially on the performance transfer event at 382-6. In some embodiments and in particular, the scheduler component 226-1-3 may be configured to perform one or more processes, steps, and/or events substantially similar to those discussed above at 362-3.

The support client component 226-1-2 may be configured to 1) generate the performance transfer trigger query comprising one or more performance transfer parameters, 2) establish a secure communications connection/channel with server support device 112, and 3) transmitting the performance transfer trigger query to the support server device 112 over the secure communications connection/channel at 382-7. In some embodiments and in particular, the support client component 226-1-2 may be configured to perform one or more processes, steps, and/or events substantially similar to those discussed above at 362-4.

The support server device 112 may be configured to transmit a trigger query response to the support client 226-1-2 at 382-8. In some embodiments and in particular, support server device 112 may be configured to perform one or more processes, steps, and/or events substantially similar to those discussed above at 362-5.

The support client component 226-1-2 may be configured to provide the received performance transfer trigger query response to the scheduler component 226-1-3, in response to receiving the performance transfer trigger query response from the support server device 112 at 382-9.

The scheduler component 226-1-3 may be configured to request the collector component 226-1-4 to generate a performance collection container, in response to receiving the performance transfer trigger query response at 382-10-1.

The collector component 226-1-4 may be configured to generate a performance collection container 364-1-1 comprising performance information based at least partially one or more performance containers 314-1-n and one or more performance transfer parameters at 382-10-2. In some embodiments and in particular, the collector component 226-1-4 may be configured to perform one or more processes, steps, and/or events substantially similar to those discussed above at 362-7-2.

The collector component 226-1-4 may be configured to notify the scheduler component 226-1-3 regarding the generation of the performance collection container 364-1-1 after the performance collection container 364-1-1 has been generated at 382-10-3.

The scheduler component 226-1-3 may be configured to request the delivery of the performance collection container 364-1-1 to the storage support system 120 after the generation of the performance collection container 364-1-1 at 382-11-1. In some embodiments and in particular, the scheduler component 226-1-3 may be configured to perform one or more processes, steps, and/or events substantially similar to those discussed above at 362-8-1.

The delivery component 226-1-5 may be optionally configured to segment the performance collection container 364-1-1 into one or more container segments at 382-11-2. In some embodiments and in particular, the delivery component 226-1-5 may be configured to perform one or more processes, steps, and/or events substantially similar to those discussed above at 362-8-2.

Generally, the delivery component 226-1-5 may be configured to deliver the performance collection container 364-1-1 and associated transfer container header information to a payload server device (e.g., a non-large payload server device 114-2) of the storage support system 120 via the load balancer device 170 at 382-12-1. However, in instances when the large payload parameter indicates that large payload support is required and consequently, the delivery component has optionally segmented the performance collection container 364-1-1 into one or more container segments, the delivery component 226-1-5 may deliver the one or more container segments and associated transfer segment header information, serially or in parallel, over the one or more secure communications connections/channels to the load balancer device 170. In the immediately above embodiments and in particular, the delivery component 226-1-5 may be configured to perform one or more processes, steps, and/or events substantially similar as discussed above at 362-9-1 and further discussed with respect to FIG. 5.

Assuming that the delivery component 226-1-5 has been optionally configured to segment the performance collection container 364-1-1, the load balancer device 170 may be configured to 1) receive one or more container segments of the performance collection container 364-1-1, and 2) provide the received one or more container segments to the large payload server device 114-1 at 382-12-2. In those embodiments and in particular, the load balancer device 170 may be configured substantially similar as discussed above at 362-9-2.

Assuming that the delivery component 226-1-5 has optionally segmented the performance collection container 324-1-1, the large payload server device 114-1 may be configured to 1) store the one or more received container segments, 2) join the one or more container segments to form the performance collection container 364-1-1, 3) verify integrity of the performance collection container 364-1-1, 4) store the verified performance collection container 364-1-1 in the payload datastore 160-2 at 382-12-3. In those embodiments and in particular, the large payload server device 114-1 may be configured substantially similar as discussed above at 362-9-3.

The large payload server device 114-1 may be optionally configured to notify the support client device 118-1 of the transferred performance collection container 364-1-1 at 382-13. In some embodiments and in particular, the large payload server device 114-1 may be configured substantially similar as discussed above at 362-10.

Figure 4:
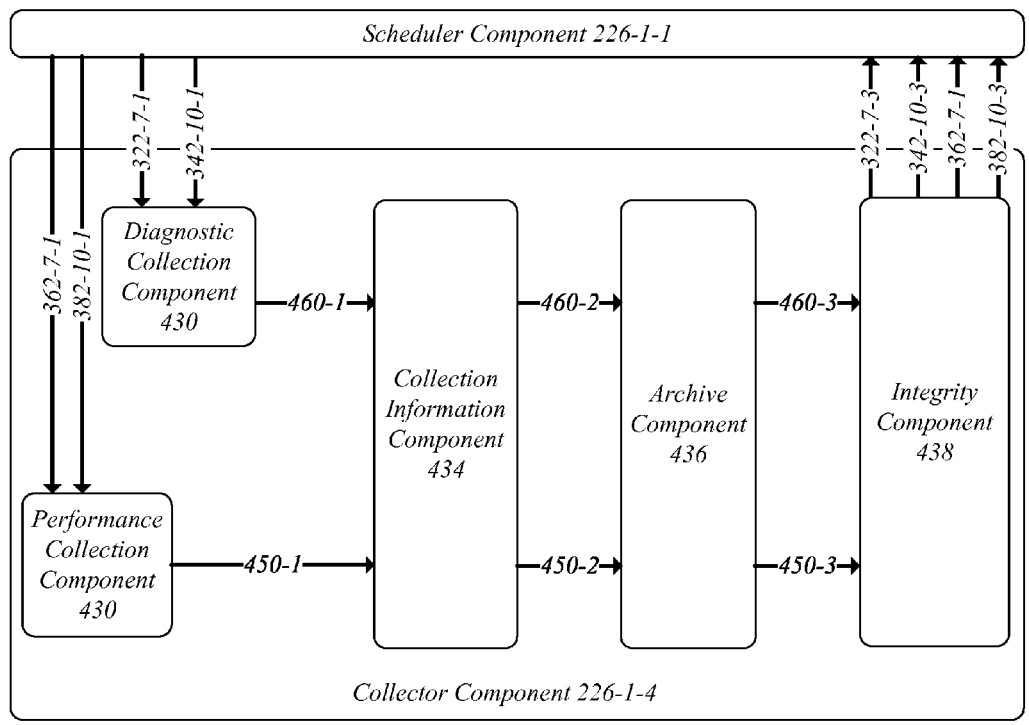
FIG. 4 illustrates an operating environment of a collector component of the large payload support system.
Figure 4:
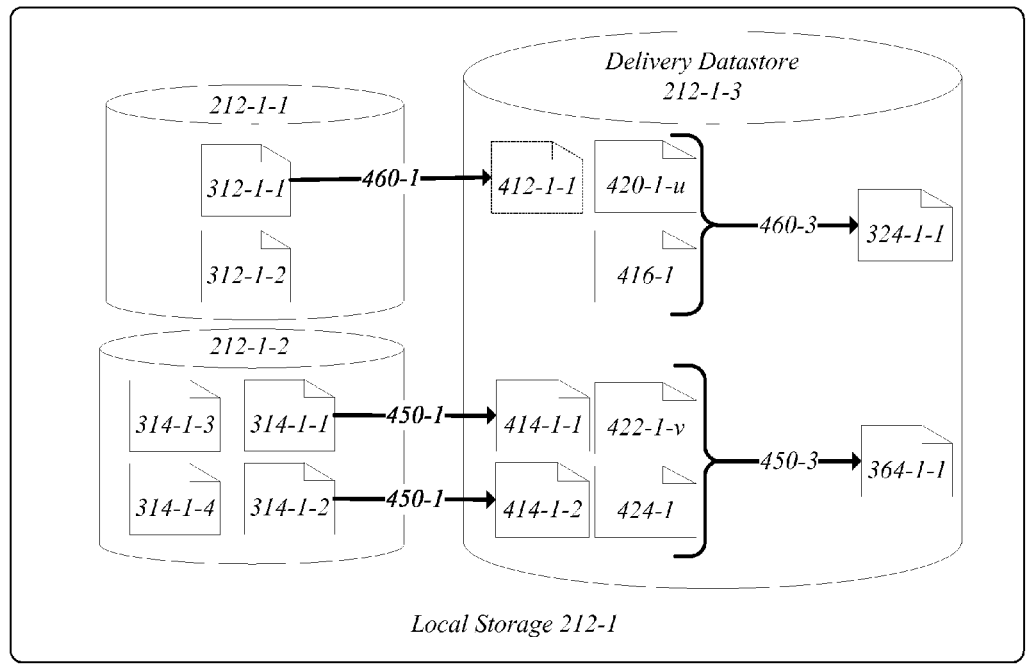

FIG. 4 illustrates an operating environment of the collector component 226-1-4 of the large payload support system. As illustrated in FIG. 4, the collector component 226-1-4 may further, include without limitation, a diagnostic collection component 430, a performance collection component 430, a collection information component 434, and/or an archive component 436, where each component may be operatively coupled to each other to facilitate the generation of one or more diagnostic collection containers and/or performance collection containers. Additionally, in one non-limiting exemplary embodiment, the diagnostic datastore 212-1-1 may include, without limitation, diagnostic container 312-1-1 having the container name "corefile.nz" and diagnostic container 312-1-2 having the container name "corefile.2013-11-19.13_15_43.ucore.bz2". The performance datastore 212-1-2 may include, without limitation, performance container 314-1-1 having a container name "000001_0060_1413456857937_0118937.ccma.gz" and container creation time of "12/20/2013 20:00:00", performance container 314-1-2 having a container name "000001_0060_1413456857937_0118937.ccma.meta" and container creation time of "12/20/2013 20:00:00", performance container 314-1-3 having a container name "000001_0060_1413456857930_0118930.ccma.gz" and a container creation time of "12/19/2013 14:00:00", and performance container 314-1-4 having a container name "000001_0060_1413456857930_0118930.ccma.meta" and a container creation time of "12/19/2013 14:00:00".

Also illustrated in FIG. 4 and discussed above and/or elsewhere, the scheduler component 226-1-1 may request the generation of a diagnostic collection container 324-1-1 at 322-7-1 and/or at 342-10-1. The diagnostic collection component 430 may be configured to identify a diagnostic datastore and/or diagnostic container for transfer based at least partially on the one or more diagnostic transfer parameters, in response to the request from the scheduler component 226-1-1 at 460-1. In some embodiments and in particular, the collector component 226-1-4 may be configured to identify a diagnostic datastore 212-1-1 (e.g., diagnostic datastore 212-1-1 representative of the directory "/mroot/etc/crash/", etc.) by, for example, matching the directory, path, and/or URI/URL represented by one or more local datastores 212-1-f with the directory, path, and/or URI/URL represented by diagnostic container location parameter (e.g., "/mroot/etc/crash", etc.). Additionally or alternatively, the collector component 226-1-4 may be configured to identify a diagnostic container (e.g., diagnostic container 312-1-1 having the name "corefile.nz", etc.) among one or more diagnostic containers 312-1-m within the identified diagnostic datastore 212-1-1 (e.g., directory "/mroot/etc/crash/" associated with or represented by the diagnostic datastore 212-1-1, etc.) by, for example, searching and matching the name of the diagnostic container in the diagnostic datastore 212-1-1 with the diagnostic container name parameter (e.g., "corefile.nz"). After identifying a diagnostic container such as diagnostic container 312-1-1, the diagnostic collection component 430 may be further configured to create a diagnostic reference container 412-1-1 (e.g., a container containing a symbolic link) in the delivery datastore 212-1-3 containing a reference to the identified diagnostic container 312-1 in the diagnostic datastore 212-1-1.

The collection information component 434 may be configured to generate a diagnostic collection header information container 416-1 and/or one or more storage system information containers 420-1-$u$ at 460-2. In some embodiments and in particular, the collection information component 434 may be further configured to generate a diagnostic collection header information container 416-1 comprising a diagnostic collection header information. The collection information component 434 may also be configured to generate one or more storage system information containers 420-1-$u$ comprising storage system information, after or in response to the generation of the diagnostic reference container 412-1-1. The diagnostic collection header information may include, without limitation, cluster node configuration information (e.g., storage operating system version information of the cluster node, cluster node serial information (e.g., "4070308-98-6", etc.), cluster node system identifier information (e.g., "4070308986", etc.), cluster storage system configuration information (cluster storage system name, cluster storage system identifier, etc.), diagnostic container name information (e.g., name of the diagnostic container archived within the diagnostic collection container 324-1-1 such as "corefile.nz"), maximum segment size information (e.g., value in bytes as indicated by the maximum segment size parameter with the default being 104,857,600 bytes, etc.), large payload indicator information (e.g., Boolean value for indicating whether large payload support is required) based on the large payload parameter, support generation information, diagnostic collection container information. The support generation information may include, without limitation, support subject information for a core upload (e.g., a short message comprising "CORE UPLOAD:" followed by the diagnostic container name such as "corefile.nz"), support generation timestamp information for providing a date and time when the diagnostic container transfer request was created (e.g., "Mon Dec 23 13:50:13 UTC 2013", etc.). The storage system information may include, without limitation, storage system license information, storage system configuration information, support system information, and/or any other information associated with storage operating system 248.

The archive component 436 may be configured to archive the diagnostic container 312-1-1 referenced by diagnostic reference container 412-1-1, diagnostic collection header information container 416-1, and/or one or more storage system information containers 420-1-$u$ into a diagnostic collection container at 460-3. In some embodiments and in particular, the archive component 436 may be further configured to archive the diagnostic container 324-1-1 referenced by diagnostic reference container 412-1-1, diagnostic collection header information container 416-1, and/or one or more storage system information containers 420-1-$u$ after or in response to the generation of the one or more containers. In one non-limiting example, the archive component 436 may be configured to archive the containers in delivery datastore 212-1-3 utilizing one or more archive algorithms (e.g., algorithms associated with the tape archive format (TAR), etc.) and/or compressing the aggregated containers into a single diagnostic collection container 324-1-1 stored in the delivery datastore 212-1-3 (e.g., directory "/mroot/etc/log/autosupport" associated with and/or represented by delivery datastore 212-1-3) utilizing one or more compression algorithms (e.g., Lempel-Ziv-Markov chain algorithm (LZMA), LZMA2, Prediction by Partial Matching (PPM), Burrows-Wheeler, etc.). It may be appreciated that while the diagnostic reference container 412-1-1 may contain a reference to the diagnostic container 312-1-1 in order to conserve storage space in the local storage 212-1, the diagnostic collection container 324-1-1 may include an archived and/or compressed copy (instead of a reference) of the diagnostic container 312-1-1 for transfer to the storage support system 120.

The integrity component 438 may be configured to 1) generate container integrity information for the diagnostic collection container 324-1-1, and 2) notify the scheduler component 226-1-3 after archiving the diagnostic container 312-1-1, the diagnostic collection header information container 416-1, and/or one or more storage system information containers 420-1-$u$ at 322-7-3 and/or 342-10-3. In some embodiments and in particular, the integrity component 438 may be configured to generate container integrity information for the diagnostic collection container 324-1-1 utilizing well known checksum and/or hashing methods, steps and/or algorithms (e.g., checksum, message digest algorithms such as MD5, secure hash algorithm such as SHA-1, etc.). Additionally, the integrity component 438 may notify the scheduler component 226-1-3 by generating and providing a diagnostic collection complete notification. The diagnostic collection complete notification may include, without limitation, diagnostic collection container location information (e.g., directory "/mroot/etc/log/autosupport" associated with and/or represented by delivery datastore 212-1-3) for indicating the datastore in local storage 212-1 that contained the diagnostic collection container 324-1-1, diagnostic collection container name information for indicating the name of the diagnostic collection container 324-1-1 (e.g., "corefile.7z"), and/or generated container integrity information for verification of integrity of the diagnostic collection container after transfer to the storage support system 120.

Further illustrated in FIG. 4 and discussed above and/or elsewhere, the scheduler component 226-1-1 may request the generation of a performance collection container 364-1-1 at 362-7-1 and/or 382-10-1. The performance collection component 430 may be configured to identify a performance datastore and/or one or more performance containers for transfer based at least partially on the one or more performance transfer parameters at 450-1. In some embodiments and in particular, the performance datastore may be identified as a predetermined datastore such as, for example, the performance datastore 212-1-2 which may be representative of the directories and/or subdirectories of "/mroot/etc/log/stats/", "/mroot/etc/log/rastrace", or any other directory for storing performance information. In some embodiments and in particular, the collector component 226-1-4 may be configured to identify one or more performance containers 314-1-$n$ by, for example, searching for one or more containers with container names that may include, without limitation, ".perfstat.gz", ".perfstat.meta", ".ccma.gz", ".ccma.meta", ".dmp" in the performance datastore 212-1-2. Additionally or alternatively, the performance collection component 430 may be configured to identify one or more performance containers 314-1-$n$ having a container creation time between the time indicated in the start time parameter and end time parameter as one or more filtered performance containers. In one non-limiting example, the performance collection component 430 may identify performance container 314-1-1 and 314-1-2 having a container creation time of "12/20/2013 20:00:00", when the requests received from scheduler component 226-1-1 to generate performance collection container 364-1-1 includes a start time parameter of "12/20/2013 19:19:47" and an end time parameter of "12/

20/2013 23:00:00". After identifying performance containers within the specified performance container star time parameter and end time parameter such as performance container 314-1-1 and 314-1-2, the performance collection component 430 may be further configured to copy or duplicate the identified performance containers 314-1-1 and 314-1-2 as filtered performance containers 414-1-1 and 414-1-2 and store filtered performance containers 314-1-1 and 314-1-1 in the delivery datastore 212-1-3.

The collection information component 434 may be configured to generate a performance collection header information container 424-1 and/or one or more storage system information containers 422-1-$v$ at 450-2. In some embodiments and in particular, the collection information component 434 may be configured to generate a performance collection header information container 424-1 comprising performance collection header information and one or more storage system information containers 420-1-$v$ comprising storage system information, after or in response to the generation of the filtered performance containers 414-1-1 and 414-1-2. The performance collection header information may include, without limitation, cluster node configuration information, diagnostic container name information, maximum segment size information, large payload indicator information, support generation information, diagnostic collection container information. The support generation information may include, without limitation, support subject information for a performance archive upload (e.g., a short message comprising "PERFORMANCE ARCHIVE UPLOAD:" followed by the start time parameter and end time parameter such as "12/20/2013 19:19:47 to 12/20/2013 23:00:00", etc.), support generation timestamp information for providing a date and time when the performance container transfer request was created (e.g., "Mon Dec 23 13:50:13 UTC 2013", etc.), maximum segment size information for indicating the maximum segment size as indicated by the maximum segment size parameter. The storage system information may include, without limitation, storage system license information, storage system configuration information, support system information, and/or any other information associated with storage operating system 248.

The archive component 436 may be configured to archive the filtered performance containers 414-1-1 and 414-1-2 which contain copies or duplicates of performance containers 314-1-1 and 314-1-2, performance collection header information container 424-1, and/or one or more storage system information containers 422-1-$v$ into a performance collection container at 450-3. In some embodiments and in particular, the archive component 436 may be further configured to archive the filtered performance containers 414-1-1 and 414-1-2, performance collection header information container 424-1, and/or one or more storage system information containers 422-1-$v$ after or in response to the generation of the one or more containers. In a non-limiting example, archive component 436 may aggregate the containers into a single performance collection container 364-1-1 utilizing one or more archive algorithms (e.g., archiving algorithm associated with TAR, etc.) and/or compressing the containers into a single performance collection container 364-1-1 stored in the delivery datastore 212-1-3 (e.g., directory "/mroot/etc/log/autosupport" associated with and/or represented by delivery datastore 212-1-3) utilizing one or more compression algorithms (e.g., LZMA, LZMA2, PPM, Burrows-Wheeler, etc.).

The notification component 438 may be configured to 1) generate container integrity information for the performance collection container 364-1-1 and 2) notify the scheduler component 226-1-3 after archiving the performance containers 314-1-1 and 314-1-2, performance collection header information container 424-1, and/or one or more storage system information containers 422-1-$v$ at 362-7-3 and/or 382-10-3. In some embodiments and in particular, the integrity component 438 may be configured to generate container integrity information (e.g., checksum, MD5, SHA-1, etc.) for the performance collection container 364-1-1 utilizing well known checksum and/or hashing methods, steps and/or algorithms. Additionally, integrity component 438 may be configured to notify the scheduler component 226-1-3 by generating and providing a performance collection complete notification. The performance collection complete notification may include, without limitation, performance collection container location information (e.g., directory "/mroot/etc/log/auto support" associated with and/or represented by delivery datastore 212-1-3) for indicating the datastore in local storage 212-1 that contained the performance collection container 364-1-1, performance collection container name information for indicating the name of the performance collection container 364-1-1 (e.g., "performance-archive.7z"), and/or generated container integrity information for verification of integrity of the diagnostic collection container after transfer to the storage support system 120.

Figure 5:
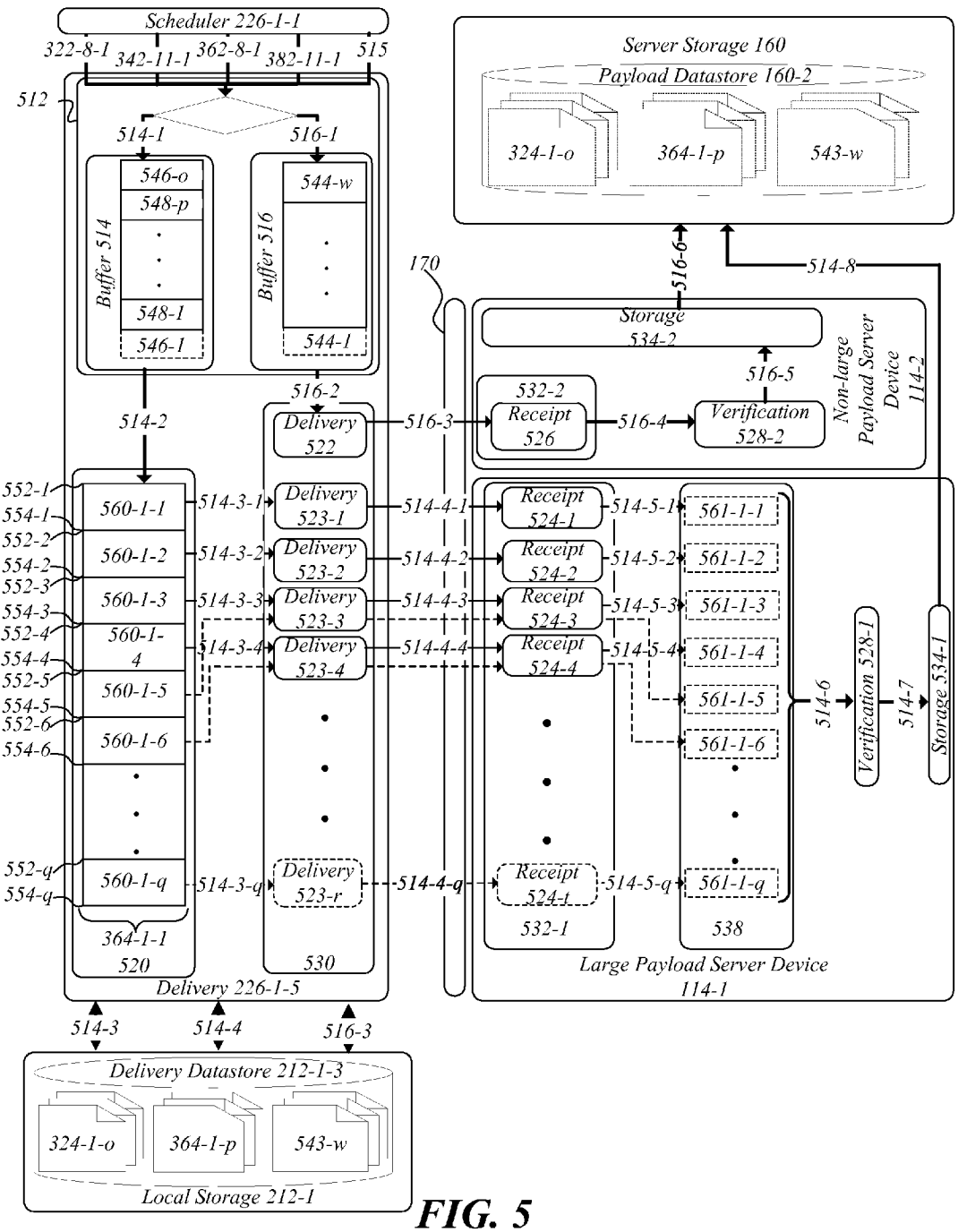
FIG. 5 illustrates an operating environment of a delivery component of the large payload support system.

FIG. 5 illustrates an operating environment 500 of the delivery component 226-1-5 of the large payload support system 100. As illustrated in FIG. 5, the delivery component 226-1-5 may further include, without limitation, delivery queue component 512 comprising a large payload buffer 514 and a non-large payload buffer 516, container segmentation component 520, and/or delivery processor component 530 comprising delivery processor 522 and one or more delivery processors 523-$r$. Each component of the delivery component 226-1-5 may also be operatively connected to each other to facilitate the transfer of one or more collection containers. The large payload server device 114-1 may include, without limitation, a receipt component 352-1 comprising one or more receipt processors 524-$t$, a segment aggregation component 538, a verification component 528-1, and/or storage component 534-1. Each component of the large payload server device 114-1 may also be operatively connected to each other to facilitate the receipt of one or more diagnostic collection containers and/or performance collection containers. The non-large server device 114-2 may further include, without limitation, a receipt component 352-1 comprising receipt processor 526, a verification component 528-2, and/or a storage component 341-2. Each component of the non-large server device 114-2 may also be operatively connected to each other to facilitate the transfer of one or more non-large collection containers. The delivery datastore 212-1-1 may include, without limitation, one or more diagnostic collection containers 324-1-$o$, one or more performance collection containers 364-1-$p$, and/or one or more non-large collection containers 543-$w$ for transfer to the support storage system 120.

As illustrated in FIG. 5 and discussed above or elsewhere, the scheduler component 226-1-1 may generate and provide collection container delivery requests for the delivery of one or more diagnostic collection containers 324-1-$o$ such as, for example, diagnostic collection container 324-1-1 at 322-8-1 and/or 342-11-1, and/or one or more performance collection containers 364-1-$p$ such as, for example, performance collection container 364-1-1 at 362-8-1 and/or 382-11-1. The collection container delivery requests (e.g., diagnostic collection container delivery requests, performance collection container delivery requests, etc.) may include, without limitation, the collection container location information, the collection container name information, the one or more transfer parameters (e.g., one or more diagnostic transfer parameters and/or one or more performance transfer parameters, etc.), and/or large payload parameter, as discussed above and/or elsewhere.

The delivery queue component 512 be configured to enqueue the one or more collection container delivery requests received from the scheduler component 226-1-1 in a large payload buffer 514, when the large payload parameter indicates that large payload support is required at 514-1. In some embodiments, and in particular, delivery queue component 512 be configured to enqueue the one or more collection container delivery requests in the large payload buffer 514 such as, for example, one or more diagnostic collection container delivery requests 546-$o$ and/or one or more performance collection container delivery requests 548-$p$.

With continued reference to the delivery queue component 512 at 514-1, in some embodiments, the large payload buffer 514 may be configured as a first-in first-out (FIFO) buffer, where a collection container delivery request that may be enqueued before another collection container delivery request may also be dequeued before that other collection container delivery request. As such, the large payload buffer 514 may include, without limitation, one or more diagnostic collection container delivery requests 546-$o$ such as diagnostic collection container delivery request 546-1, and/or one or more performance collection container delivery requests 546-1 such as performance collection container delivery requests 548-1.

The delivery queue component 512 may be configured to 1) dequeue one or more enqueued collection container delivery requests in the large payload buffer 514, and 2) provide the one or more dequeued collection container delivery requests to the container segmentation component 520 at 514-2. In some embodiments and in particular, the delivery queue component 512 be configured to dequeue one or more collection container delivery requests 546-$o$ and/or 548-$p$, such as, for example, the diagnostic collection container delivery request 546-1 from the large payload buffer 514. Furthermore, in some embodiments, the delivery queue component 512 may be configured to provide the dequeued performance collection container delivery requests 546-$o$ and/or 548-$p$, such as, for example, diagnostic collection container delivery request 546-1 to the container segmentation component 520 for segmentation.

The container segmentation component 520 may be configured to 1) segment, logically, a collection container identified by the collection container location information and collection container name information, and 2) provide one or more container segments and the associated container segment information to the delivery processor component 530 for transfer at 514-3-$q$. In some embodiments and in particular, the container segmentation component 520 may be configured to segment, logically, a collection container such as, for example, performance collection container 364-1-1 identified by the collection container location information and collection container name information into one or more container segments 560-1-$q$ based at least partially on maximum segment size information and/or collection container size information. It may be appreciated that by logically segmenting the collection containers in place rather than creating new containers for each container segment, little or no additional temporary storage space may be required to store any of the information or data in each container segment because each container segment may be directly accessed (e.g., read, retrieved, etc.) within the collection container utilizing, for example, asynchronous container input/output operations.

With continued reference to the container segmentation component 520 at 514-3-$q$, the container segmentation component 520 may be configured to segment, logically, the collection container such as, for example, the performance collection container 364-1-1 by determining segment offset information and container segment information for each container segment of the one or more container segments 560-1-$q$. The segment offset information for one or more container segments 560-1-$q$ may include, without limitation, one or more container segment starting offsets 552-$q$ and one or more container segment ending offsets 554-$q$ which may define the boundaries of each corresponding container segment. The container segment starting offset may include, without limitation, a reference (e.g., a pointer, a numerical value, etc.) to indicate a starting position for a container segment within a collection container (e.g., the performance collection container 364-1-1, etc.). Similarly, the container segment ending offset may include, without limitation, a reference (e.g., a pointer, numerical value, etc.) to indicate the ending position for a container segment within a collection container.

With continued reference to the container segmentation component 520 at 514-3-$q$, the container segment information determined for each container segment of the one or more container segments 560-1-$q$ may include, without limitation, segment number information for indicating the sequence or order of a particular container segment (e.g., a numerical value such as 1, 2, 3, 4, etc.) among the one or more container segments, the segment size information for indicating the size of the container segment (e.g., the size in bytes with a default size of 104,857,600 bytes, etc.), total segments information (e.g., integer value such as 1, 2, 3, etc.) for indicating a total number of container segments, large payload indicator information (e.g., a Boolean true or false value, etc.) for optionally indicating whether large payload support is required. It may be appreciated that large payload indicator information may be determined based on the large payload parameter previously discussed with respect to the diagnostic transfer event.

With continued reference to the container segmentation component 520 at 514-3-$q$, it may be appreciated that in instances when the container size of a collection container is less than the maximum segment size parameter, the collection container may be represented as a single container segment having a container segment size information indicating a container segment size that is equal to the container size of a collection container. Additionally, the segment offset information for that container segment may also be appropriately updated.

With continued reference to the container segmentation component 520 at 514-3-$q$ and in a non-limiting example, the performance collection container 364-1-1 may have an associated collection container size of 681,574,440 bytes or 650 MB and the maximum segment size as indicated by the maximum segment size parameter may be 104,857,600 bytes or 100 MB. The container segmentation component 520 may logically segment the performance collection container 364-1-1 into container segments 560-1-1, 560-1-2, 560-1-3, 560-1-4, 560-1-4, and 560-1-5, and 560-1-6, based at least partially on the maximum segment size parameter and associated collection container size. The container segmentation component 520 may determine the total segments information which may indicate that the total number of container segments as 6 based at least partially on the maximum segment size parameter and associated collection container size. The container segmentation component 520 may further determine the segment number information for each of the container segments 560-1-1, 560-1-2, 560-1-3, 560-1-4, 560-1-4, 560-1-5 and 560-1-6 as the first segment (e.g., a numerical value of 1), the second segment (e.g., a numerical value of 2), the third segment (e.g., a numerical value of 3), the fourth segment (e.g., a numerical value of 4), the fifth segment (e.g., a numerical value of 5), and the sixth segment (e.g., a numerical value of 6), respectively. The container segmentation component 520 may also determine the segment size information for the container segments 560-1-1, 560-1-2, 560-1-3, 560-1-4, 560-1-4, and 560-1-5 as 104,857,600 bytes or approximately 100 MB and determine that the segment size information of container segment 560-1-6 as 52,428,800 bytes or 50 MB for total of 681,574,440 bytes.

With continued reference to the container segmentation component 520 at 514-3-$q$ and the above non-limiting example, the container segment 560-1-1 may be associated with a container segment offset information which may include, without limitation, container segment starting offset 552-1 and/or container segment ending offset 554-1. Similarly, the remaining container segments 560-1-2, 560-1-3, 560-1-4, 560-1-4, 560-1-5, and 560-1-6 may each be associated with their respective container segment offset information which may include, without limitation, container segment starting offset and/or container segment ending offset as illustrated in FIG. 5.

With continued reference to the container segmentation component 520 at 514-3-$q$, the container segmentation component 520 may configured to provide the one or more container segments 560-1-$q$ to the delivery processor component 530 for transfer at 514-3-$q$. In some embodiments and in particular, the container segment component 520 may be configured to provide the one or more container segments to the delivery processor component 530, in response to receiving one or more delivery access requests from one or more delivery processors 523-$r$ of the delivery processor component 530. Thus, in a non-limiting example, container segmentation component 520 may provide the container segments 560-1-1, 560-1-2, 560-1-3, 560-1-4, 560-1-5, and 560-1-6, to the delivery processor component 530 for transfer at 514-3-1, in response to receiving one or more delivery access requests from delivery processors 523-1, 523-2, 523-3, and 523-4.

The delivery processor component 530, which may include, without limitation, one or more delivery processors 523-$r$, where each delivery processor of the one or more delivery processors 523-$r$ may be configured to 1) request access to one or more container segments 560-1-$q$, 2) establish one or more secure communications connections/channels, 3) determine, optionally, segment resume information for the one or more container segments 560-1-$q$ to be transferred, 4) determine transfer segment header information for one or more container segments 560-1-$q$, 5) access the one or more container segments 560-1-$q$ to be transferred, 6) transfer the one or more container segments 560-1-$q$ and the associated transfer segment header information, and 7) determine and/or update transfer statistics information at 514-4-$q$. In some embodiments and in particular, the delivery processor component 530 may include one or more delivery processors 523-$r$, where the number of delivery processors 523-$r$ may be based at least partially on the delivery processor parameter discussed above and/or elsewhere. It may be appreciated that depending on the implementation, the one or more delivery processors 523-$r$ may be implemented as one or more threads of execution (e.g., threads within a process) and/or as one or more processes. Accordingly, each delivery processor may be configured to perform the steps discussed above substantially in parallel, simultaneously, concurrently, or contemporaneously with other delivery processors of the one or more delivery processors 523-$r$ and/or delivery processor 522.

With continued reference to the delivery processor component 530 at 514-4-$q$, in some embodiments and in particular, each delivery processor of the one or more delivery processors 523-$r$ may be configured to request access via one or more delivery access requests to the container segmentation component 520 to access one or more un-transferred container segments 560-1-$q$.

With continued reference to the delivery processor component 530 at 514-4-$q$, each delivery processor of the one or more delivery processors 523-$r$ may be configured to establish a secure communications connection/channel with load balancer device 170 identified by or indicated in the transfer location parameter (e.g., "support.netapp.com/AsupPut") utilizing one or more cryptographic protocols such as, for example, TLS or SSL protocols, after or in response to receiving access to one or more un-transferred container segments 560-1-$q$.

With continued reference to the delivery processor component 530 at 514-4-$q$ and optionally, in some embodiments, each delivery processor of the one or more delivery processors 523-$r$ may be configured to determine segment resume information for their respective container segment that a delivery processor has requested for transfer by generating a resume information request which may include, without limitation, segment identifier information associated with a container segment, providing the generated resume information request to the storage support system 120 (e.g., load balancer device 170 and/or receipt processor component 532-1 of the large payload server device 114-1) via the established secure communications connections/channels, and receiving the segment resume information for the container segment from the storage support system 120 via the established secure communications connections/channels. The segment resume information may include, without limitation, a container segment resume offset for indicating whether the container segment has already been at least partially received and stored by the storage support system 120 (e.g., large payload server device 114-1) and the amount of data (e.g., number of bytes received and stored, etc.) for that container segment that was already received and stored by the storage support system 120. It may be appreciated that the storage support system 120 may partially receive and store one or more container segments in instances when an unplanned interruption and/or planned interruption previously occurred between the cluster storage system 150 and storage support system 120.

With continued reference to the delivery processor component 530 at 514-4-$q$, the unplanned interruption may include without limitation, loss of network connection, failure of a cluster node (e.g., failure of cluster node 104-1, etc.), or any other unanticipated event that may result in the termination of the established secure communications connections/channels. The planned interruption may include, receiving a command line transfer cancellation command including a command identifier parameter and/or cluster node name parameter from client device 102-1 to cancel a transfer command on a particular cluster node identified by the command identifier parameter and cluster node name parameter that is currently being processed by one or more components of that identified cluster node such as, for example, performance transfer command associated with the performance collection container delivery request 546-1 being processed by cluster node 104-1. In response to receiving by the CLI component 224-1-1 a transfer cancellation command to cancel a particular transfer command, the delivery component 226-1-5 may stop, suspend, or otherwise terminate all delivery processors (e.g., terminate on the next read and/or write operation, etc.) currently transferring data associated with a collection container in response to that particular transfer command.

With continued reference to the delivery processor component 530 at 514-4-$q$ and regardless of the circumstances for the interruption, an administrator and/or user of client device 102-1 may issue a transfer resume command to the CLI component 224-1-1 including a command identifier parameter and/or a cluster node name parameter identifying the previously cancelled command to resume the transfer of one or more container segments and/or collection containers for a particular cluster node identified by the cluster node name parameter.

With continued reference to the delivery processor component 530 at 514-4-$q$ and in those above instances when a previous transfer command is being resumed, the delivery processor component 530 may optionally advance the container starting segment offset based at least partially on a container segment resume offset, when the container segment resume offset indicates that one or more bytes of data has already been received and stored by the storage support system 120 (e.g., received and stored by the large payload server device 114-1, etc.) for that container segment. Additionally, in instances when the segment resume offset indicates that the container segment has already been received and stored by the storage support system 120 in entirety, then the one or more delivery processors 523-$r$ may be configured to skip the already received container segment by for example performing steps 1), 3), 4), 5), 6), and 7) outlined above at 514-4-$q$. This may enable the delivery processor component 530 to efficiently transfer data by transferring only the data for a container segment that has not yet been received and stored by the storage support system 120 (e.g., received and stored by the large payload server device 114-1, etc.).

With continued reference to the delivery processor component 530 at 514-4-$q$ and in some embodiments, each delivery processor may also be configured to determine transfer segment header information for one or more container segments 560-1-$q$ by generating the transfer segment header information. Transfer segment header information may include, without limitation, on cluster node configuration information (e.g., storage operating system version information of the cluster node (e.g., storage operating system 248 of cluster node 104-1, etc.), cluster node serial information (e.g., "4070308-98-6", etc.), cluster node system identifier information (e.g., "4070308986", etc.), cluster storage system configuration information (cluster storage system name, cluster storage system identifier, etc.), support generation information, collection container information, and/or container segment information for each container segment of the collection container.

With continued reference to the delivery processor component 530 at 514-4-$q$, the support generation information may include, without limitation, support subject information for a core upload (e.g., a short message comprising "CORE UPLOAD:" followed by the diagnostic container name such as "corefile.nz") or a performance archive upload (e.g., a short message comprising "PERFORMANCE ARCHIVE UPLOAD:" followed by the start time parameter and end time parameter such as "12/20/2013 19:19:47 to 12/20/2013 23:00:00", etc), and/or support generation timestamp information for providing a date and time when the container transfer request (e.g., performance container transfer request, diagnostic container transfer request, etc.) was created (e.g., "Mon Dec 23 13:50:13 UTC 2013", etc.).

With continued reference to the delivery processor component 530 at 514-4-$q$, the collection container information may include, without limitation, the collection container reference information (e.g., full directory, path, and/or URI/URL for the diagnostic collection container such as "/mroot/etc/log/autosupport/corefile.7z" for a core diagnostic collection container, full directory, path, and/or URI/URL for the performance collection container such as "/mroot/etc/log/autosupport/performance-archive.7z", etc.) for indicating the datastore and/or name of the container before the transfer, the collection container size for indicating the collection container size in bytes, container integrity information (e.g., a checksum, MD5 hash, etc.) for the collection container, and/or diagnostic container name (e.g., "corefile.nz") for optionally indicating the name of the diagnostic container archived within a collection container (i.e., a diagnostic collection container).

With continued reference to the delivery processor component 530 at 514-4-$q$, the container segment information for each container segment may include, without limitation, segment number information for indicating the sequence of a particular container segment (e.g., a numerical value such as 1, 2, 3, 4, etc.), the segment size information for indicating the actual size of the container segment (e.g., 12 MB, 35 MB, 100 MB, 200 MB, etc.), total segments information (e.g., integer value such as 1, 2, 3, etc.) for indicating a total number of container segments, segment identifier information (e.g., "asup_4070308-98-6_4070308986_201312191350_13_1_of_4.chunk", etc.) for uniquely identifying the container segment and/or segment container, and/or large payload indicator information (e.g., a Boolean true or false value) for optionally indicating whether large payload support is required based on the large payload parameter.

With continued reference to the delivery processor component 530 at 514-4-$q$, the segment identifier information (e.g., "asup_4070308-98-6_4070308986_201312191350_13_1_of 4.chunk", etc.) for identifying the container segment and/or segment container (e.g., a segment container stored by the large payload server device 114-1 for each received container segment, etc.) may include, without limitation, a concatenation of the cluster node serial information, cluster node system identifier information, support generation timestamp information, segment number information, and/or total segments information, where the concatenated information may be delimited or separated by one or more symbols (e.g., "–", "_", "+", etc.).

With continued reference to the delivery processor component 530 at 514-4-$q$, the transfer segment header information may include, without limitation, at least a portion of cluster node configuration information for a cluster node (e.g., cluster node 104-1, etc.), at least a portion of collection container information for a collection container (e.g., a diagnostic collection container 324-1-1, a performance collection container 364-1-1, etc.), at least a portion of cluster storage system configuration information for cluster storage system 150, support subject information, and/or container segment information.

With continued reference to the delivery processor component 530 at 514-4-$q$, each delivery processor may also be configured to access the one or more container segments 560-1-$q$ by reading data associated with or within the one or more container segments 560-1-$q$ of a collection container. Moreover, in some embodiments, each delivery processor may be configured to read data in one or more un-transferred blocks of data starting from the container segment starting offset for a container segment and ending at the container segment ending offset. Additionally or alternatively, each delivery processor may also be configured to read data in one or more un-transferred blocks of data starting from the container segment starting offset and ending when number of bytes read for transfer is equal to number of bytes as indicated by the segment size information for that container segment.

With continued reference to the delivery processor component 530 at 514-4-$q$, each delivery processor of the one or more delivery processors 523-$r$ may be configured to transmit the read data for a container segment and the associated transfer segment header information to the load balancer device 170 of the storage support system 120 identified by the transfer location parameter (e.g., "support.netapp.com/AsupPut", etc.) over the established secure communications connection/channel. In one non-limiting implementation one or more delivery processors 523-$r$ may be configured to transmit one or more container segments of a collection container and associated transfer segment header information utilizing, for example, HTTP requests (e.g., "HTTP PUT/asup_4070308-98-6_4070308986_201309191350_27_1_of 4.chunk HTTP/1.1") over the one or more secure communications connections/channel (i.e., HTTPS). The HTTPS requests may include, without limitation, HTTPS headers, which may include, without limitation, the transfer segment header information.

To ensure that the delivery processors 523-$r$ and/or delivery processor 522 (further discussed below and/or elsewhere), do not use all available bandwidth at a client site during a collection container transfer, in some embodiments, the aggregate upload rate for all delivery processors of the one or more delivery processors 523-$r$ and delivery processor 522 may be limited or throttled based at least partially on the maximum transmit rate parameter. Additionally or alternatively, the aggregate download rate for all delivery processors of the one or more delivery processors 523-$r$ and delivery processor 522 may also be limited or throttled based at least partially on the maximum receive rate parameter. It may be appreciated that once any delivery processor of the one or more delivery processors 523-$r$ completes the transfer of a container segment, the delivery processor may be configured to transfer another un-transferred container segment by performing the similar steps discussed above (e.g., steps 1), 2), 4), 5), 6), 7) at 514-4-$q$) utilizing already established secure communications connections/channels until all container segments for a collection container are transferred.

With continued reference to the delivery processor component 530 at 514-4-$q$ and as discussed above and/or elsewhere, after the load balancer device 170 receives data of one or more container segments 560-1-$q$ and associated transfer segment header information for each of the one or more container segments 560-1-$q$, the load balancer device 170 may be configured to provide the received data over the secure communications connections/channels from one or more container segments 560-1-$q$ to the large payload server device 114-1, when the large payload indicator information of the associated transfer segment header information indicates that the large payload support is required. Additionally or alternatively and as discussed above and/or elsewhere, after the load balancer device 170 receives data for one or more collection containers and associated transfer container header information, the load balancer device 170 may be configured to provide the data received over the secure communications connections/channels for one or more collection containers to the non-large payload server device 114-2, when the large payload indicator information of the associated transfer container header information is not present or indicates that the large payload support is not required (i.e., non-large collection containers, such as, for example, one or more non-large collection containers 543-$w$).

With continued reference to the delivery processor component 530 at 514-4-$q$, each delivery processor of the one or more delivery processors 523-$r$ and 522 (further discussed below and/or elsewhere) may be configured to determine and/or update the transfer statistics information on a periodic basis (e.g., every 100 milliseconds, 500 milliseconds, every second, etc.) for each collection container and/or container segment when a collection container and/or container segment is transferred. The transfer statistics information for transfer of container segments (i.e., segment transfer statistics information) may include, without limitation, segment remaining time information for indicating the estimated time remaining until the container segment is transferred, segment delivery time information for indicating the amount of time already elapsed in delivering a container segment, segment completion information for indicating the percentage and/or amount of data in bytes of the container segment that has already been transferred, segment bandwidth usage information for indicating the total number of bytes used for transferring a container segment, and/or segment upload rate information for indicating the instantaneous and/or average upload rate that the container segment is uploaded to the storage support system 120.

With continued reference to the delivery processor component 530 at 514-4-$q$, in some embodiments, the delivery processor component 530 may be further configured to determine and/or update, on a periodic basis (e.g., every 100 milliseconds, 500 milliseconds, every second, etc.) transfer statistics information for a collection container (i.e., container transfer statistics information) that has been segmented into one or more container segments based at least partially on the segment remaining time information, segment delivery time information, segment completion information, segment bandwidth usage information, and segment upload rate information, for all container delivery processors 523-$r$ that are transferring container segments for that collection container. The transfer statistics information for transfer of a collection container may include, without limitation, container remaining time information for indicating the estimated time remaining until that collection container is transferred, container delivery time information for indicating the amount of time elapsed in delivering a collection container, container completion information for indicating the percentage and/or amount of data in bytes of that collection container has already been transferred, container bandwidth usage information for indicating the total number of bytes used for transferring a collection container, and container upload rate information for indicating the instantaneous and/or average upload rate that collection container is uploaded to the storage support system 120.

With continued reference to the delivery processor component 530 at 514-4-$q$, in some embodiments, the delivery processor component 530 may be further configured to determine and/or update, on a periodic basis (e.g., every 100 milliseconds, 500 milliseconds, every second, etc.), transfer statistics information for the delivery component 226-1-5

(i.e., support transfer statistics information), which may include, all collection container transfers. The transfer statistics information for the delivery component 226-1-5 may include, without limitation, total delivery time information for indicating the amount of time elapsed or spent in seconds in delivering one or more collection containers, total bandwidth usage information for indicating the total number of bytes sent by the delivery component 226-1-5 for transferring one or more collection containers, and total upload rate information for indicating the instantaneous and/or average upload rate that one or more collection containers is uploaded to the storage support system 120.

With continued reference to the delivery processor component 530 at 514-4-$q$ and while not illustrated, an administrator or user of a client device (e.g., client device 102-1, etc.) may issue a command line transfer history command including one or more transfer history parameters to request the above discussed transfer statistics information for one or more container segments, one or more collection containers, and/or the delivery component 226-1-5 and view the requested transfer statistics information on the client device 102-1. The one or more transfer history parameters may include, cluster node name parameter representative of an identifier associated with a cluster node (e.g., an identifier such as a sequence of numbers, characters, and/or symbols identifying which cluster node to retrieve the transfer statistics information from, etc.), command identifier parameter (e.g., a integer value that the previously processed diagnostic transfer command or performance transfer command). In a non-limiting example, a command line transfer history command may include, without limitation, "system node autosupport history show-upload-detail" which may retrieve transfer statistics information for the delivery component 226-1-5 on cluster node 104-1.

With continued reference to the delivery processor component 530 at 514-4-$q$ and in one non-limiting example, delivery processor component 530 may include, without limitation, four delivery processors 523-1, 523-2, 523-3, and 523-4 configured for the transfer of container segments 560-1-1, 560-1-2, 560-1-3, 560-1-4, 560-1-5, and 560-1-6. Moreover, each of the four delivery processors 523-1, 523-2, 523-3, and 523-4 may be configured to request the container segmentation component 520 for access to one or more un-transferred container segments. In particular, the delivery processor 523-1 may request the container segmentation component 520 to access a container segment and in response, the delivery processor 523-1 may receive access from container segmentation component 520 to un-transferred container segment 560-1-1. Similarly, the delivery processors 523-2, 523-3, 523-4, may each request access to an un-transferred container segment and in response, the delivery processors 523-2, 523-3, and 523-4 may receive access from container segmentation component 520 to un-transferred container segments 560-1-2, 560-1-3, and 560-1-4, respectively.

With continued reference to the delivery processor component 530 at 514-4-$q$, and the above non-limiting example, each of the delivery processors 523-1, 523-2, 523-3, and 523-4, may establish a secure communications connection/channel utilizing TLS or SSL protocol with the load balancer device 170. Optionally, each of the delivery processors 523-1, 523-2, 523-3, and 523-4 may determine segment resume information for their respective by generating resume information requests including segment identifier information for container segments 560-1-1, 560-1-2, 560-1-3, and 560-1-4, respectively. Each of the delivery processors 523-1, 523-2, 523-3, and 523-4 may also optionally, provide the generated resume information requests to the storage support system 120 (e.g., HTTP HEAD requests over their respective secure communications connections/channels to the large payload server device 114-1, etc.) and optionally receive the requested segment resume information for their respective container segments, when their respective container segments have been at least partially received and stored by the storage support system 120. The segment resume information may include, without limitation, segment resume offset which may indicate whether the container segments 560-1-1, 560-1-2, 560-1-3, and 560-1-4 have been at least partially received and stored by the storage support system 120 and the amount of data in bytes represented by segment resume offset.

With continued reference to the delivery processor component 530 at 514-4-$q$, and the above non-limiting example, each of the delivery processors 523-1, 523-2, 523-3, and 523-4 may, substantially in parallel, access their respective container segments 560-1-1, 560-1-2, 560-1-3, and 560-1-4 by reading one or more un-transferred blocks of data beginning from their respective container segment starting offsets 552-1, 552-2, 552-3, 552-4, and transmit, substantially in parallel, the un-transferred blocks of data and the associated and respective transfer segment header information for each container segments 560-1-1, 560-1-2, 560-1-3, and 560-1-4, to the load balancer device 170 over their respective secure communications connections/channels. Each of the delivery processors 523-1, 523-2, 523-3, and 523-4 may continue to access by reading one or more un-transferred blocks of data in the respective container segments 560-1-1, 560-1-2, 560-1-3, and 560-1-4 and transmit the un-transferred blocks of data until the respective container segment ending offset 554-1, 554-2, 554-3, and 554-4 is reached, i.e., until all blocks of data between the respective container segment starting offsets and container segment ending offsets have been read and transferred.

With continued reference to the delivery processor component 530 at 514-4-$q$, and the above non-limiting example, after any of the delivery processors 523-1, 523-2, 523-3, and 523-4 have completed transfer of their respective container segments 560-1-1, 560-1-2, 560-1-3, and 560-1-4, the delivery processors 523-1, 523-2, 523-3, and 523-4 may request access to the next un-transferred container segment until all container segments have been transferred. In particular, the delivery processor 323-3 may request access to an un-transferred container segment from delivery segmentation component 520, when delivery processor 323-3 completes the transfer of the container segment 560-1-3. The delivery processor 323-3 may then receive access to the container segment 560-1-5 and transfer the container segment 560-1-5 and associated transfer segment header information utilizing the already established secure communications connection/channel to the load balancer device 170. Similarly, the delivery processor 323-4 may also request access to an un-transferred container segment from delivery segmentation component 520, when delivery processor 323-4 completes the transfer of the container segment 560-1-4. The delivery processor 323-3 may then receive access to the container segment 560-1-6 and transfer the container segment 560-1-6 and associated transfer segment header information utilizing the already established secure communications connection/channel to the load balancer device 170. It may be appreciated that the delivery processors 323-3 and delivery processor 323-4 may request access and transfer the container segments 560-1-5 and 560-1-6, respectively, substantially in parallel with the continued transfer of container segments 560-1-1 and 560-1-2 by delivery processors 523-1 and 523-2. It may also be appreciated that as discussed above and/or elsewhere, the load balancer device 170 may receive data for one or more container segments over the established secure communications connections/channels with delivery processors 523-1, 523-2, 523-3, 523-4, and may provide the received data to the large payload server device 114-1, when the transfer segment header information and in particular, the large payload indicator information indicates that large payload support is required.

The receipt processor component 532-1, which may include, without limitation, one or more receipt processors 523-t, where each receipt processor of the one or more receipt processors 523-t, may be configured to 1) provide, optionally, segment resume information for one or more container segments 560-1-q, 2) receive data for the one or more container segments 560-1-q from the one or more delivery processors 523-r, and 3) store the received data for the one or more container segments 560-1-q into one or more segment containers 561-1-q at 514-5-q. In some embodiments and in particular, the receipt processor component 532-1 may include one or more receipt processors 523-t which may include, but is not limited to, receipt processors 524-1, 524-2, 524-3, and 524-4. While only a limited number of receipt processors 524-t are illustrated, it may be appreciated that the actual number of receipt processors 524-t may vary with implementation. Thus, in order to provide support services for a plurality of cluster storage systems 150 the number of receipt processors 524-t may be substantially greater than number of receipt processors 524-t as illustrated. It may also be appreciated that depending on the implementation, the one or more receipt processors 524-t may be implemented as one or more threads of execution (e.g., threads within a process) and/or as one or more processes. Accordingly, each receipt processor may be configured to perform the steps discussed above substantially in parallel, simultaneously, concurrently, or contemporaneously with other receipt processors of one or more receipt processors 524-t.

With continued reference to the receipt processor component 532-1 at 515-5-q and optionally, in some embodiments, each receipt processor of the one or more receipt processors 524-t may be configured to provide segment resume information for a container segment having an associated segment identifier information, in response to receiving a resume information request including segment identifier information from the one or more delivery processors 523-r. Each receipt processor may be configured to determine whether a segment container storing the corresponding container segment and having an associated container name indicated by the received segment identifier information already exists in a temporary datastore (not shown) associated with the large payload server device 114-1. Each receipt processor may be further configured to provide a container size for a segment container as the segment resume information, when the segment container identified by the received segment identifier information already exists in the temporary datastore (not shown). In some embodiments, the segment resume information may not be provided, when the segment container identified by the received segment identifier information does not exist in the temporary datastore (not shown).

With continued reference to the receipt processor component 532-1 at 515-5-q and in some embodiments, each receipt processor of the one or more receipt processors 524-t may be configured to receive data for the one or more container segments 561-1-q from the one or more delivery processors 523-r and store the received data for each of the container segments 560-1-q as one or more corresponding segment containers 561-1-q in a temporary datastore (not shown), where each of the segment containers 561-1-q may include an associated container name as represented by the segment identifier information for each received container segment. It may be appreciated that once the transfer for a container segment is completed by a receipt processor, the receipt processor may be configured to receive additional container segments by performing substantially similar steps discussed above (e.g., steps 1), 2), 3) at 514-5-q.) until all container segments have been received.

With continued reference to the receipt processor component 532-1 at 515-5-q and in one non-limiting example, the receipt processor component 532-1, may include without limitation, receipt processors 524-1, 524-2, 524-3, and 524-4. Each receipt processor may optionally receive a resume information request from delivery processors 523-1, 523-2, 523-3, and 523-4, respectively, for segment resume information associated with container segments 560-1-1, 560-1-2, 560-1-3, 560-1-4, respectively. Additionally, receipt processors 524-3 and 524-4 may optionally receive a resume information request from delivery processors 523-3, and 523-4, respectively, for segment resume information associated with container segments 560-1-5 and 560-1-6. In response, the receipt processors 524-1, 524-2, 524-3, and 524-4 may optionally determine and optionally provide segment resume information based at least partially on whether the segment containers 561-1-1, 561-1-2, 561-1-3, 561-1-4, 561-1-5, and/or 561-1-6 corresponding to container segments 560-1-1, 560-1-2, 560-1-3, 560-1-4, 560-1-5 and/or 560-1-6, respectively, already exists in a temporary datastore (not shown) based on the received segment identifier information for each container segment of the one or more container segments 560-1-1, 560-1-2, 560-1-3, 560-1-4, 560-1-5 and/or 560-1-6. Additionally, the receipt processors 524-1, 524-2, 524-3, and 524-4 may optionally provide the container size for a segment container (e.g., segment container 561-1-1, etc.) as segment resume information, when the one or more of the segment containers (e.g., segment container 561-1-1, etc.) already exists in the temporary datastore (not shown).

With continued reference to the receipt processor component 532-1 at 515-5-q and the above non-limiting example, receipt processors 524-1, 524-2, 524-3, and 524-4 may be further configured to receive, substantially in parallel, data for the one or more container segments 560-1-1, 560-1-2, 560-1-3, 560-1-4 via load balancer device 170. The receipt processors 524-1, 524-2, 524-3, and 524-4 may further store the received data for the container segments 560-1-1, 560-1-2, 560-1-3, and 560-1-4 as segment containers 561-1-1, 561-1-2, 561-1-3, and 561-1-4 in the temporary datastore (not shown), where each segment container has an associated container name as provided by the segment identifier information for each of the container segments 560-1-1, 560-1-2, 560-1-3, and 560-1-4. Additionally, after receiving all data for the container segments 560-1-3 and 560-1-4 and storing all the received data in segment containers 561-1-3 and 561-1-4, respectively, the receipt processors 524-3 and 524-4 may further receive data for container segments 560-1-5 and 560-1-6 and store all the received data in segment containers 561-1-5 and 561-1-6, respectively, while the receipt processors 524-1 and receipt processor 524-2 may continue to receive container segments 560-1-1 and 560-1-2.

The segment aggregation component 538 may be configured to 1) aggregate the one or more segment containers of a collection container into a container representative of the collection container, and 2) notify the verification component 528-1 to verify integrity of the collection container at 514-6. In some embodiments and in particular, the segment aggregation component 538 may be configured to aggregate the one or more segment containers into a collection container stored in a temporary datastore (not shown), when all container segments for a collection container have been received. Moreover, the segment aggregation component 538 may aggregate the one or more received segment containers by concatenating the container segments in sequence (e.g., numerical sequence such as 1, 2, 3, 4, 5, etc.) into a collection container based at least partially on the segment number information associated with each container segment and encoded in the container name for each segment container. The collection container may have an associated container name as indicated by the received collection container name information. Additionally, the segment aggregation component 538 may further determine when all container segments for a collection container have been received by determining whether all corresponding segment containers for a collection container exists in the temporary datastore (not shown) based at least partially on the segment number information and/or total segments information encoded in the container name of each segment container. Furthermore, the segment aggregation component 538 may compare container size of each of the segment containers as stored in the temporary datastore (not shown) with a respective received segment size information to ensure that all container segments have been received and stored in entirety in the corresponding segment container before aggregation into a collection container.

With continued reference to the segment aggregation component 538 at 514-6, the segment aggregation component 538 may be further configured to notify the verification component 528-1 to verify integrity of the collection container by generating a container verification request which may include, without limitation, the collection container name information and the received container integrity information.

With continued reference to the segment aggregation component 538 at 514-6 and in one non-limiting example, the segment aggregation component 538 may be configured to aggregate the segment containers 561-1-1, 561-1-2, 561-1-3, 561-1-4, 561-1-5, and 561-1-6, by concatenating the segment containers 561-1-1, 561-1-2, 561-1-3, 561-1-4, 561-1-5, and 561-1-6, in sequence (e.g., starting from segment container 561-1-1 and ending at segment container 561-1-6, etc.), into the performance collection container 364-1-1 based at least partially on the segment number information for each of the container segments stored as the segment containers 561-1-1, 561-1-2, 561-1-3, 561-1-4, 561-1-5, and 561-1-6, when container segments 560-1, 560-2, 560-3, 560-4, 560-5, and 560-6 have all been received and stored in the temporary datastore (not shown). The segment aggregation component 538 may further generate a container verification request including the collection container name information (e.g., "performance-archive.7z") and received container integrity information (e.g., a checksum, MD5 hash, SHA-1 hash etc.) for the performance collection container 364-1-1.

The verification component 528-1 may be configured to 1) verify a collection container based at least partially on the received container integrity information and a generated recipient container integrity information, and 2) notify a storage component 534-1 to store the verified collection container into the payload datastore at 514-7. In some embodiments and in particular, the verification component 528-1 may be configured to verify a collection container by receiving a container verification request which may include, without limitation, collection container name information for identifying which container to verify. The verification component 528-1 may then be configured to generate a recipient container integrity information utilizing substantially the same or similar checksum or hashing methods, steps, and/or algorithms utilized by the cluster storage system 150, and compare the recipient container integrity information with the received container integrity information. The verification component 528-1 may be further configured to determine the verification result information for indicating that the integrity of the collection container has been successfully preserved, when the recipient container integrity information matches the received container integrity information.

With continued reference to the verification component 528-1 at 514-7, the verification component 528-1 may be further configured to notify the storage component 534-1 to store the verified collection container into the payload datastore 160-2 at 514-7 by generating a storage request including, without limitation, the collection container name information for identifying which container to store and the verification result information for indicating whether the integrity of the collection container identified by the collection container name information has been preserved.

The storage component 534-1 may be configured to store the collection container in the payload datastore 160-2, in response to receiving the storage request at 514-8. In some embodiments and in particular, the storage component 534-1 may be configured to store the collection container in the payload datastore 160-2 by copying and/or moving the collection container identified by the collection container name information to the payload datastore 160-2. Optionally, the storage component 534-1 may be further configured to notify the support client device 118-1 of the transferred diagnostic collection container 324-1-1 by generating a diagnostic transfer notification including, without limitation, the verification result information as discussed above and/or elsewhere.

Also illustrated in FIG. 5, the scheduler component 226-1-1 may generate and provide collection container delivery requests for the delivery of one or more non-large collection containers (e.g., system log collection containers 543-w for the service processor component (not shown), etc.) that do not require large payload support.

The delivery queue component 512 be configured to enqueue the one or more collection container delivery requests received from the scheduler component 226-1-1 in a non-large payload buffer 516, when the large payload parameter does not indicate that large payload support is required or the large payload parameter is non-existent at 516-1. In some embodiments, and in particular, delivery queue component 512 be configured to enqueue the one or more collection container delivery requests in the non-large payload buffer 516 such as, for example, one or more non-large collection container delivery requests 544-w.

With continued reference to the delivery queue component 512 at 516-1, in some embodiments, the non-large payload buffer 516 may be configured as a first-in first-out (FIFO) buffer. As such, the non-large payload buffer 516 may include, without limitation, one or more non-large collection container delivery requests 544-w such as non-large collection container delivery request 544-1.

The delivery queue component 512 may be configured to 1) dequeue one or more enqueued collection container delivery requests in the non-large payload buffer 516, and 2)

provide the one or more dequeued collection container delivery requests to the delivery processor component 530 at 516-2. In some embodiments and in particular, the delivery queue component 512 be configured to dequeue one or more collection container delivery requests 544-w, such as, for example, the non-large collection container delivery request 544-1 from the non-large payload buffer 516. Furthermore, in some embodiments, the delivery queue component 512 may be configured to provide the dequeued collection container delivery requests 544-w, such as, for example, non-large collection container delivery request 544-w to the delivery processor component 530 for delivery.

The delivery processor component 530, which may include, without limitation, delivery processor 522 dedicated for the delivery of non-large collection containers and may be configured to 1) establish one or more secure communications connections/channels, 2) determine transfer container header information for the non-large collection container, 3) access the non-large collection container to be transferred, 4) transfer the one or more container segments 560-1-q and the associated transfer container header information, and 5) update transfer statistics information at 516-3. In some embodiments and in particular, the delivery processor component 530 may include a dedicated delivery processor 522 for the delivery of non-large collection containers. It may be appreciated that depending on the implementation, the dedicated delivery processor 522, may be configured to perform the steps discussed above substantially in parallel, simultaneously, concurrently, or contemporaneously with other delivery processors (e.g., one or more delivery processors 523-r). This may enable the delivery component 226-1-5 to quickly transfer non-large collection containers and complete their transfer without waiting for one or more delivery processors 523-r to finish the transfer of the collection containers that require large payload support, which may be of substantial size and consequently, may require substantial amount of time to transfer depending on the bandwidth available.

With continued reference to the delivery processor component 530 at 516-3, the delivery processor 522 may be configured to establish a secure communications connection/channel with load balancer device 170 identified by or indicated in the transfer location parameter (e.g., "support.netapp.com/AsupPut") utilizing one or more cryptographic protocols such as, for example, TLS or SSL protocols.

With continued reference to the delivery processor component 530 at 516-3 and in some embodiments, the delivery processor 522 may also be configured to determine transfer container header information for one or more non-large collection containers 543-w by generating the container header information. The transfer container header information for a non-large collection container may include, without limitation, on cluster node configuration information, cluster node serial information, cluster node system identifier information, cluster storage system configuration information, support generation information, and/or collection container information for a non-large collection container.

With continued reference to the delivery processor component 530 at 516-3, the delivery processor 522 may also be configured to access non-large collection container by reading data associated with or within the non-large collection container.

With continued reference to the delivery processor component 530 at 516-3, the delivery processor 522 of may be configured to transmit the read data for a non-large collection container and the transfer container header information to the load balancer device 170 of the storage support system 120 identified by the transfer location parameter (e.g., "support.netapp.com/AsupPut", etc.) over the established secure communications connection/channel. To ensure that the delivery processors 523-r and/or 522, do not use all available bandwidth at a client site during a collection container transfer, in some embodiments, the aggregate upload rate for all delivery processors of the one or more delivery processors 523-r and 522 may be limited or throttled based at least partially on the maximum transmit rate parameter as previously discussed.

With continued reference to the delivery processor component 530 at 516-3, t the one or more delivery processors 523-r and/or 522 (discussed above and/or elsewhere) may be configured to continuously update the transfer statistics information on a periodic basis (e.g., every 100 milliseconds, 500 milliseconds, every second, etc.) for each collection container and/or container segment when a collection container and/or container segment is transferred as discussed above and/or elsewhere. It may also be appreciated and as discussed above and/or elsewhere, the load balancer device 170 may receive data for collection containers over the established secure communications connection/channel with the delivery processor 522 and may provide the received data to the non-large payload server device 114-2, when the transfer container header information and in particular, the large payload indicator information indicates that large payload support is not required or the large payload indicator information is non-existent (i.e., silent).

The receipt processor component 532-2, which may include, without limitation, receipt processor 526 configured to 1) receive data for one or more non-large collection containers 543-w from the delivery processor 522, 2) store the received data into a collection container, and 3) notify the verification component 528-2 to verify integrity of the collection container at 516-4. In some embodiments and in particular, the receipt processor component 532-2 may include receipt processor 526. While only a single receipt processor 526 is illustrated, it may be appreciated that the actual number of receipt processors may vary with implementation. Thus, in order to provide support services for a plurality of cluster storage systems 150 the number of receipt processors in the receipt processor component 532-2 may be substantially greater than the single receipt processor 526 as illustrated. It may also be appreciated that depending on the implementation, one or more receipt processors of the receipt processor component 532-2 may be implemented as one or more threads of execution (e.g., threads within a process) and/or as one or more processes. Accordingly, each receipt processor of the one or more receipt processors of the receipt processor component 532-2 may be configured to perform the steps discussed above substantially in parallel, simultaneously, concurrently, or contemporaneously with other receipt processors of one or more receipt processors.

With continued reference to the receipt processor component 532-2 at 516-4 and in some embodiments, the receipt processor 526 may be configured to receive data for the one or more non-large containers 543-w from the delivery processor 522 and store the received data for each of the one or more non-large collection containers 543-w as one or more non-large collection containers 543-w in a temporary datastore (not shown), having a container name as represented by the collection container name information for each received non-large collection container.

With continued reference to the receipt processor component 532-2 at 516-4, the receipt processor component 532-2 may be further configured to notify the verification component 528-2 to verify integrity of the received non-large collection container by generating a container verification request which may include, without limitation, the collection container name information and the received container integrity information. It may be appreciated that once the transfer for a container segment is completed by a receipt processor, the receipt processor may be configured to receive additional container segments and notifying the verification component 532-2 by performing substantially similar steps (e.g., steps 1), 2), and 3) at 516-4) discussed above until all container segments have been received.

The verification component 528-2 may be configured to 1) verify the non-large collection container based at least partially on the received container integrity information and a generated recipient container integrity information, and 2) notify a storage component 534-2 to store the verified collection container into the payload datastore at 516-5. In some embodiments and in particular, the verification component 528-2 may be configured to verify a non-large collection container by receiving a container verification request which may include, without limitation, the non-large collection container name information for identifying which container to verify. The verification component 528-2 may then be configured to generate a recipient container integrity information utilizing substantially the same or similar checksum or hashing methods, steps, and/or algorithms utilized by the cluster storage system 150, and compare the recipient container integrity information with the received container integrity information. The verification component 528-2 may be further configured to determine the verification result information for indicating that the integrity of the collection container has been successfully preserved, when the recipient container integrity information matches the received container integrity information.

With continued reference to the verification component 528-2 at 516-5, the verification component 528-2 may be further configured to notify the storage component 534-2 to store the verified non-large collection container into the payload datastore 160-2 by generating a storage request which may include, without limitation, the collection container name information for identifying which container to store and the verification result information for indicating whether the integrity of the non-large collection container identified by the collection container name information has been preserved.

The storage component 534-2 may be configured to store the collection container in the payload datastore 160-2, in response to receiving the storage request at 516-6. In some embodiments and in particular, the storage component 534-2 may be configured to store the collection container in the payload datastore 160-2 by copying and/or moving the collection container identified by the collection container name information to the payload datastore 160-2. Optionally, the storage component 534-2 may be further configured to notify the support client device 118-1 of the transferred diagnostic collection container 324-1-1 by generating a diagnostic transfer notification including, without limitation, the verification result information as discussed above and/or elsewhere.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be needed for a novel implementation.

Figure 6:
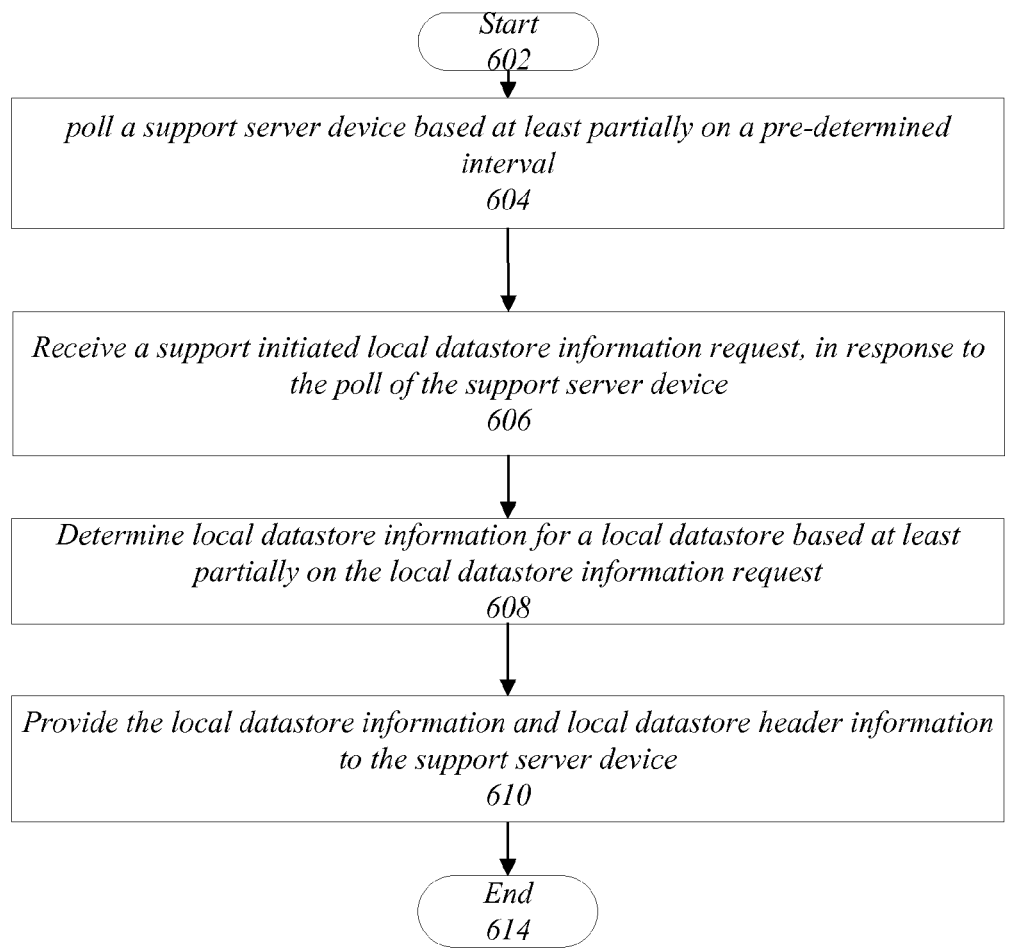
FIG. 6 illustrates an embodiment of a logic flow of a large payload support system for retrieving local datastore information.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may start at block 602 and may poll a support server device based at least partially on a pre-determined interval at 602. For example, polling component 226-1-1 may poll a support server device 112 every 5 minutes by generating and transmitting a poll query over an established secure communications connection/channel utilizing, for example, HTTP protocol.

The logic flow 600 may receive a support initiated local datastore information request, in response to the poll of the support server device at 606. For example, polling component 226-1-1 may receive support initiated local datastore information request in response to the poll of the support server device 112.

The logic flow 600 may determine local datastore information for a local datastore based at least partially on the local datastore information request at 608. For example, the polling component 226-1-1 may determine local datastore information which may include, without limitation, a list container information for one or more containers in the identified local datastore (e.g., diagnostic datastore 212-1, performance datastore, 212-1-2, delivery datastore 212-1-3, etc.).

The logic flow 600 may provide the local datastore information and local datastore header information to the support server device at 610. For example, polling component 226-1-1 may provide the local datastore information and local datastore header information to the support server device 112 by transmitting the local datastore information and local datastore header information to the support server device 112. The examples are not limit in this context.

Figure 7A:
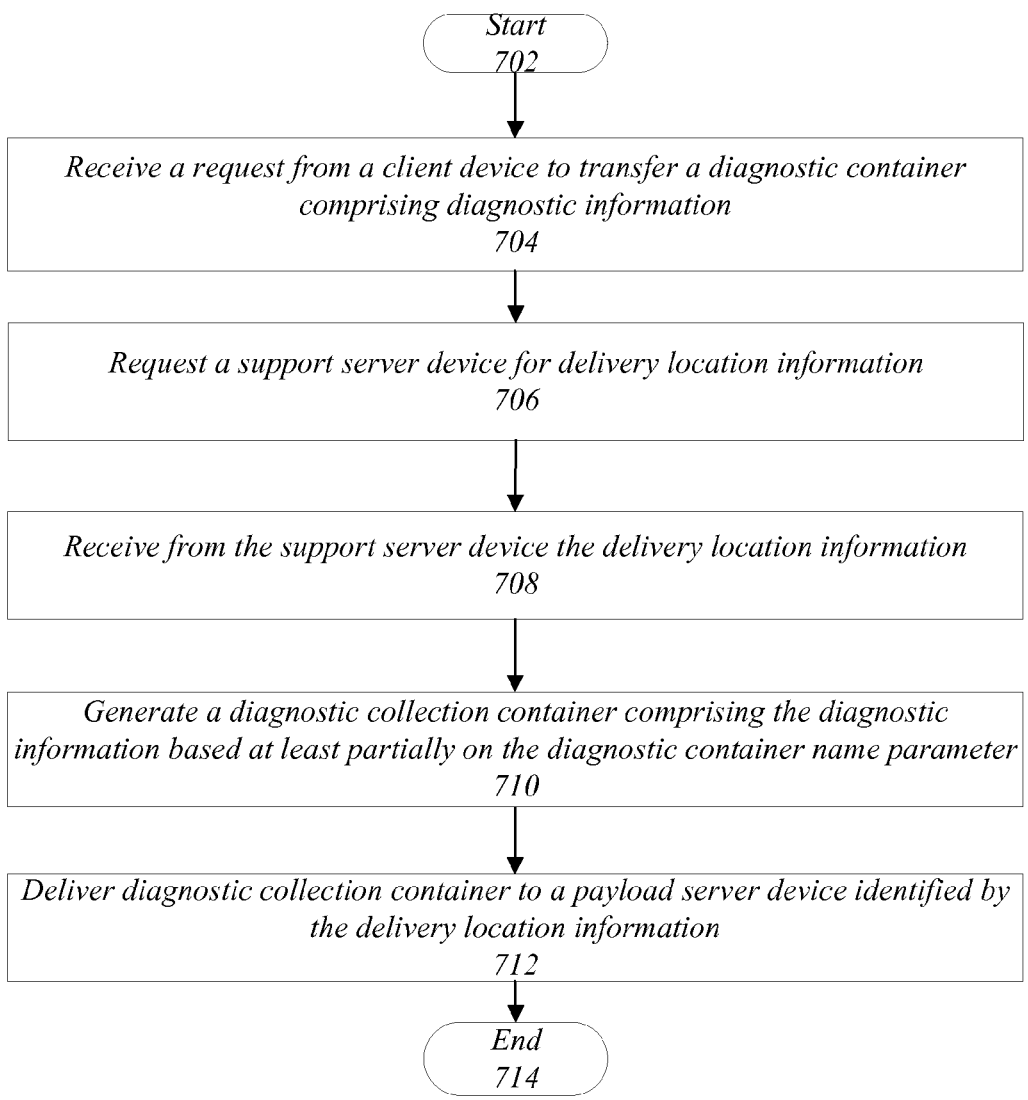
FIG. 7A illustrates an embodiment of a logic flow of a large payload support system for initiating transfer of diagnostic information by the client device.

FIG. 7A illustrates one embodiment of a logic flow 700. The logic flow 700 may be representative of some or all of the operations executed by one or more embodiments described herein.

In the illustrated embodiment shown in FIG. 7A, the logic flow 700 may start at block 702 and may receive a request from a client device to transfer a diagnostic container comprising diagnostic information at 704. For example, CLI component 224-1-1 may receive a request from client device 102-1 to transfer a diagnostic container comprising diagnostic information. The request comprising a diagnostic transfer command having one or more associated diagnostic transfer parameters, the one or more associated diagnostic transfer parameters including a diagnostic container name parameter.

The logic flow 700 may request a support server device for delivery location information at 706. For example, the support client component 226-1-2 may request a support server device 112 for delivery location information by generating a diagnostic transfer trigger query comprising one or more diagnostic transfer parameters and/or a large payload parameter, and transmitting the diagnostic transfer trigger query to the support server device 112 over a secure communications connection/channel.

The logic flow 700 may receive from the support server device the delivery location information at 708. For example, support client component 226-1-2 may receive a diagnostic transfer trigger query response from the support server device 112. The diagnostic transfer trigger query response including diagnostic transfer trigger query response information which may include, without limitation, delivery location information.

The logic flow 700 may generate a diagnostic collection container comprising the diagnostic information based at least partially on the diagnostic container name parameter at 710. For example, collector component 226-1-4 may generate a diagnostic collection container 324-1-1 comprising diagnostic information based at least partially on one or more diagnostic containers 312-1-*m* and one or more diagnostic transfer parameters (e.g., diagnostic container name parameter, etc.).

The logic flow 700 may deliver diagnostic collection container to a payload server device identified by the delivery location information at 712 and end at 714. For example, delivery component 226-1-5 may be configured to deliver the diagnostic collection container 324-1-1 to a large payload server device 114-1 of the storage support system 120 identified by the delivery location information via the load balancer device 170. The examples are not limit in this context.

Figure 7B:
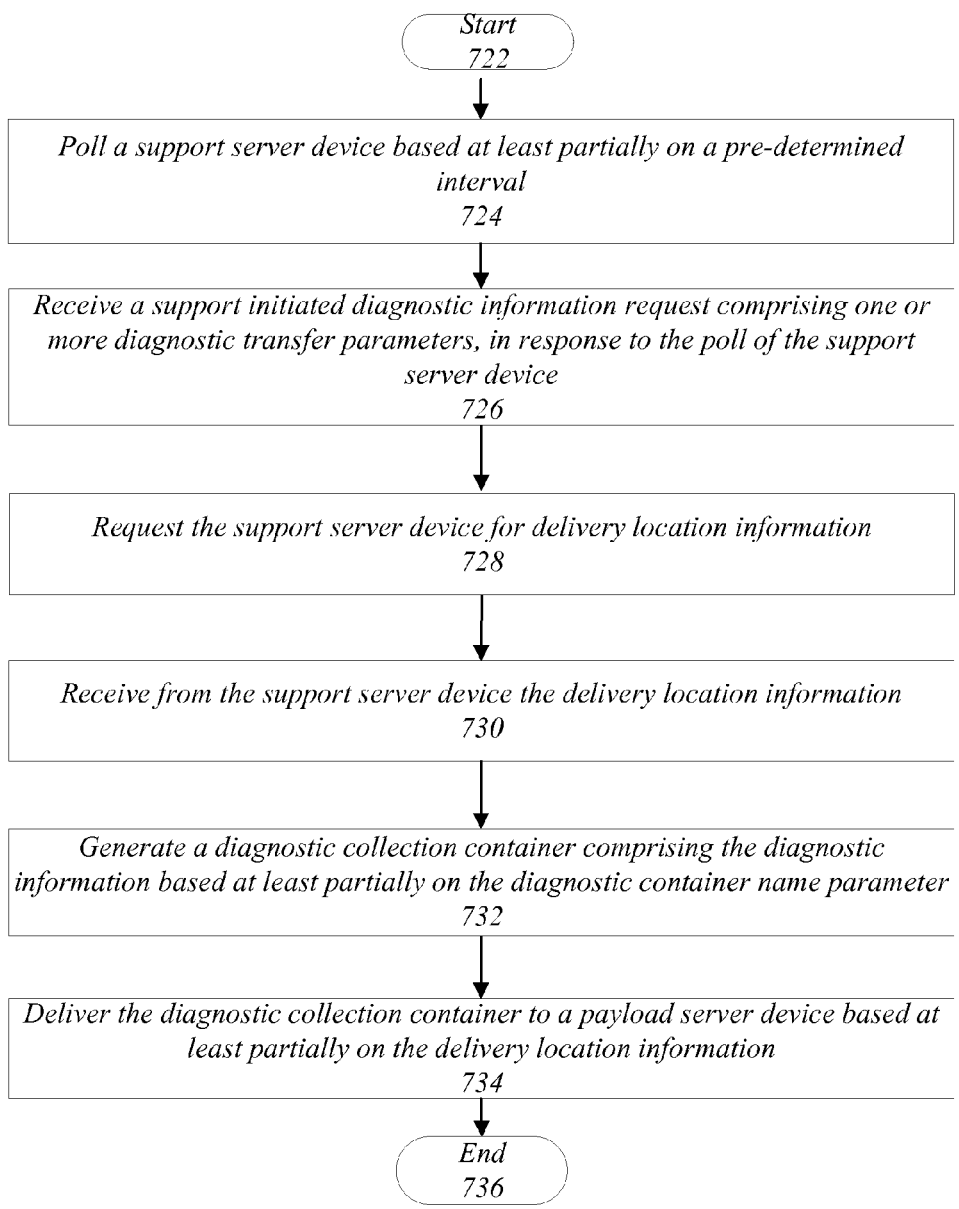
FIG. 7B illustrates an embodiment of a logic flow of a large payload support system for initiating the transfer of diagnostic information by a support client device.

FIG. 7B illustrates one embodiment of a logic flow 720. The logic flow 720 may be representative of some or all of the operations executed by one or more embodiments described herein.

In the illustrated embodiment shown in FIG. 7B, the logic flow 720 may start at block 722 and may poll a support server device based at least partially on a pre-determined interval at 724. For example, polling component 226-1-1 may be configured to poll the support server device 112 by generating and transmitting a poll query over the established secure communications connection/channel utilizing HTTP protocol (i.e., HTTPS) based on a predetermined interval (e.g., every 5 minutes, etc.).

The logic flow 720 may receive a support initiated diagnostic information request comprising one or more diagnostic transfer parameters, in response to the poll of the support server device at 726. For example, the polling component 226-1-1 may receive the support initiated diagnostic information request comprising one or more diagnostic transfer parameters (e.g., diagnostic container name parameter, etc.), in response to the poll of the support server device 112.

The logic flow 720 may request a support server device for delivery location information at 728. For example, the support client component 226-1-2 may request a support server device 112 for delivery location information by generating a diagnostic transfer trigger query comprising one or more diagnostic transfer parameters and/or a large payload parameter, and transmitting the diagnostic transfer trigger query to the support server device 112 over a secure communications connection/channel.

The logic flow 720 may receive from the support server device the delivery location information at 730. For example, support client component 226-1-2 may receive the diagnostic transfer trigger query response from the support server device 112. The diagnostic transfer trigger query response including diagnostic transfer trigger query response information which may include, without limitation, delivery location information.

The logic flow 720 may generate a diagnostic collection container comprising the diagnostic information based at least partially on the diagnostic container name parameter at 732. For example, collector component 226-1-4 may generate a diagnostic collection container 324-1-1 comprising diagnostic information based at least partially on one or more diagnostic containers 312-1-*m* and one or more diagnostic transfer parameters (e.g., diagnostic container name parameter, etc.).

The logic flow 720 may deliver diagnostic collection container to a payload server device identified by the delivery location information 734 and end at 736. For example, delivery component 226-1-5 may be configured to deliver the diagnostic collection container 324-1-1 to a large payload server device 114-1 of the storage support system 120 identified by the delivery location information via the load balancer device 170. The examples are not limit in this context.

Figure 7C:
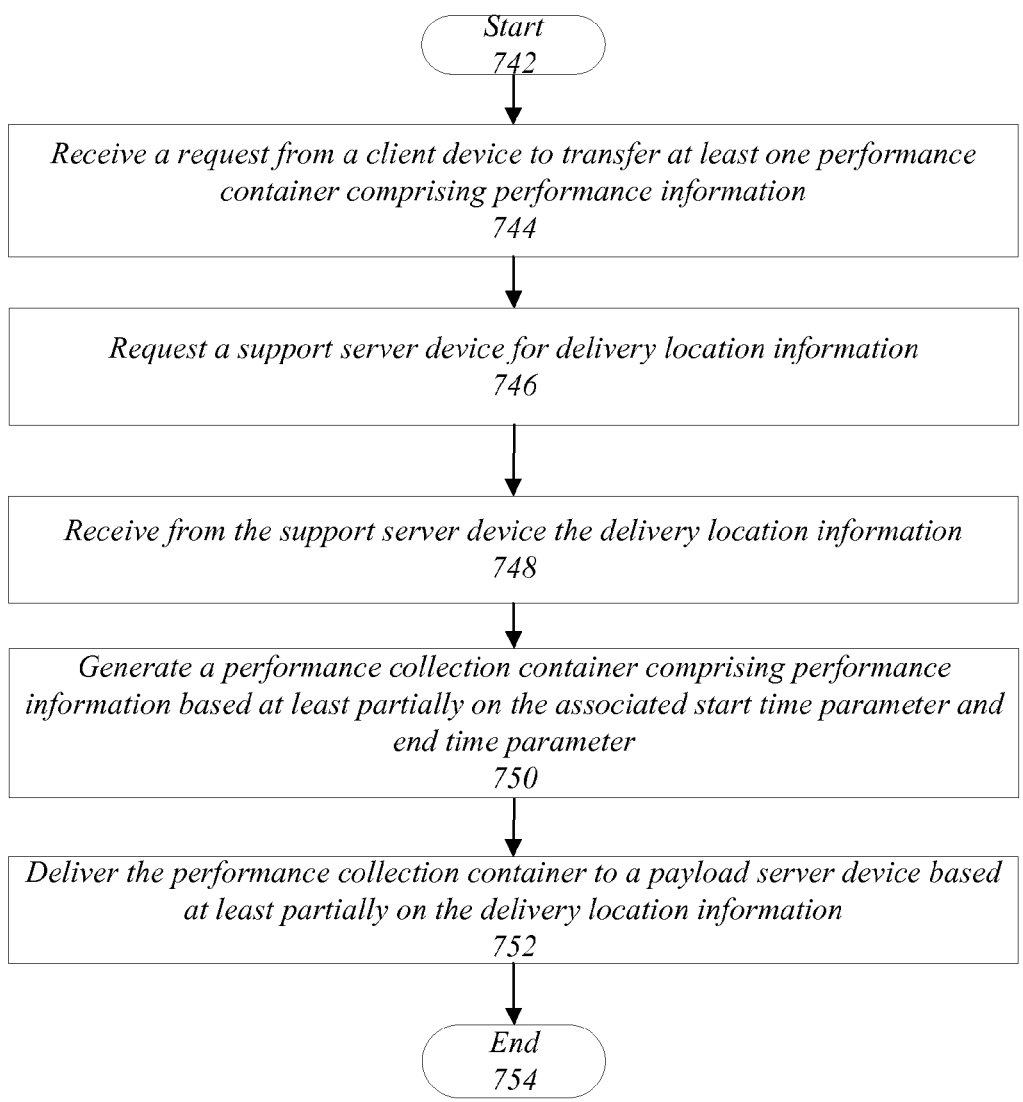
FIG. 7C illustrates an embodiment of a logic flow of a large payload support system for initiating the transfer of performance information by a client device.

FIG. 7C illustrates one embodiment of a logic flow 740. The logic flow 740 may be representative of some or all of the operations executed by one or more embodiments described herein.

In the illustrated embodiment shown in FIG. 7C, the logic flow 740 may start at block 742 and may receive a request from a client device to transfer at least one performance container comprising performance information at 746. For example, CLI component 224-1-1 may receive a request from client device 102-1 to transfer at least one performance container comprising performance information. The request comprising a performance transfer command having one or more associated performance transfer parameters, the one or more associated performance transfer parameters including a start time parameter and an end time parameter.

The logic flow 740 may request a support server device for delivery location information at 746. For example, the support client component 226-1-2 may request a support server device 112 for delivery location information by generating a performance transfer trigger query comprising one or more performance transfer parameters and/or a large payload parameter, and transmitting the performance transfer trigger query to the support server device 112 over a secure communications connection/channel.

The logic flow 740 may receive from the support server device the delivery location information at 748. For example, support client component 226-1-2 may receive a performance transfer trigger query response from the support server device 112. The performance transfer trigger query response including performance transfer trigger query response information which may include, without limitation, delivery location information.

The logic flow 740 may generate a performance collection container comprising performance information based at least partially on the associated start time parameter and end time parameter at 750. For example, the collector component 226-1-4 may be configured to generate performance collection container 364-1-1 based at least partially on start time parameter and end time parameter.

The logic flow 740 may deliver the performance collection container to a payload server device based at least partially on the delivery location information at 752. For example, delivery component 226-1-5 may be configured to deliver the performance collection container 364-1-1 to a large payload server device 114-1 of the storage support system 120 identified by the delivery location information via the load balancer device 170. The examples are not limit in this context.

Figure 7D:
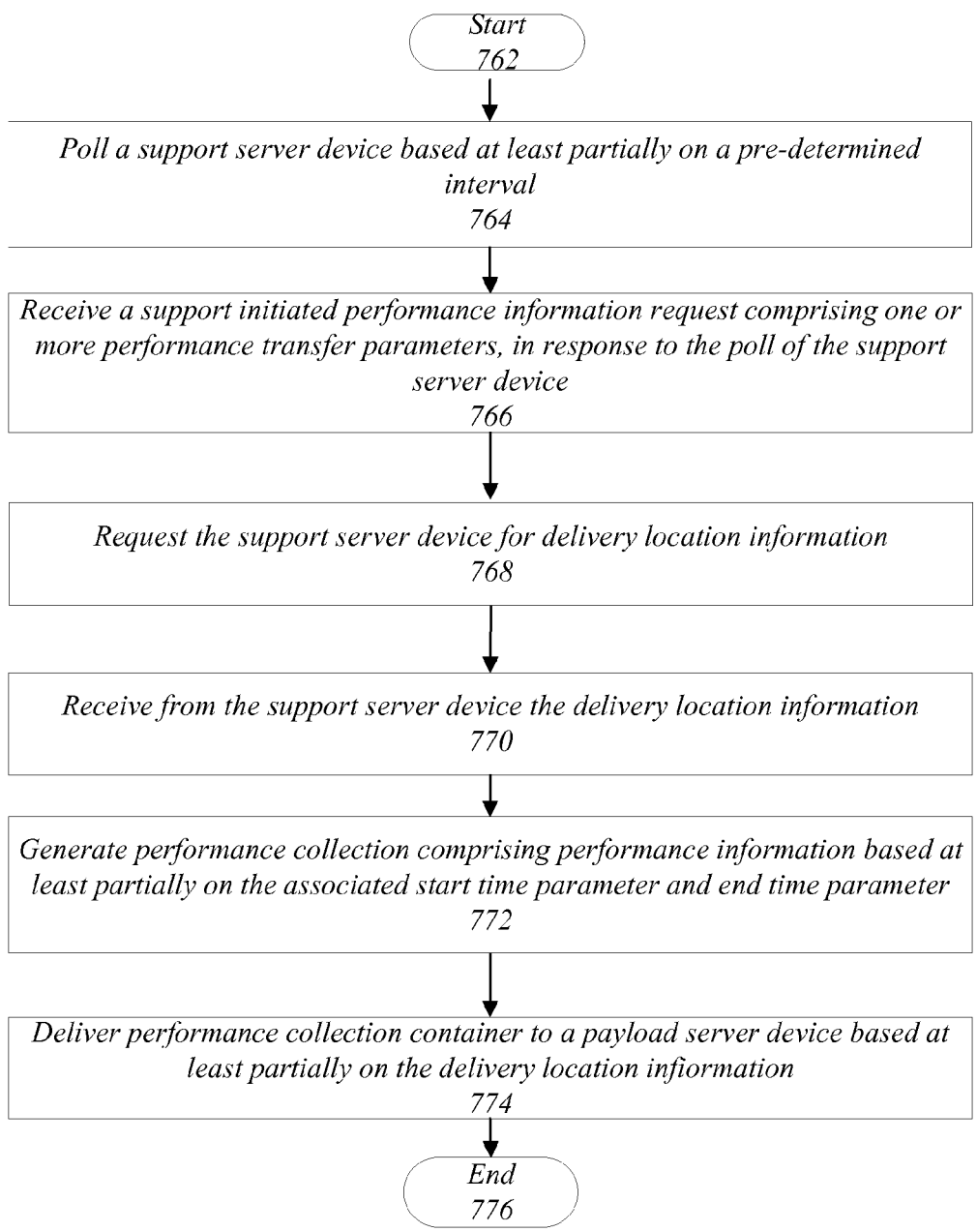
FIG. 7D illustrates an embodiment of a logic flow of a large payload support system for initiating the transfer of performance information by a support client device.

FIG. 7D illustrates one embodiment of a logic flow 760. The logic flow 760 may be representative of some or all of the operations executed by one or more embodiments described herein.

In the illustrated embodiment shown in FIG. 7D, the logic flow 760 may start at block 762 and may poll a support server device based at least partially on a pre-determined interval at 764. For example, polling component 226-1-1 may be configured to poll the support server device 112 by generating and transmitting a poll query over the established secure communications connection/channel utilizing HTTP protocol (i.e., HTTPS) based on a predetermined interval (e.g., every 5 minutes, etc.).

The logic flow 760 may receive a support initiated performance information request comprising one or more performance transfer parameters, in response to the poll of the support server device at 766. For example, the polling component 226-1-1 may be configured to request the transfer of one or more performance containers, in response to receiving the polling query response representative of the support initiated performance information request.

The logic flow 760 may request a support server device for delivery location information at 768. For example, the support client component 226-1-2 may request a support server device 112 for delivery location information by generating a performance transfer trigger query comprising one or more performance transfer parameters and/or a large payload parameter, and transmitting the performance transfer trigger query to the support server device 112 over a secure communications connection/channel.

The logic flow 760 may receive from the support server device the delivery location information at 770. For example, support client component 226-1-2 may receive a performance transfer trigger query response from the support server device 112. The performance transfer trigger query response including performance transfer trigger query response information which may include, without limitation, delivery location information.

The logic flow 760 may generate a performance collection container comprising performance information based at least partially on the associated start time parameter and end time parameter at 772. For example, the collector component 226-1-4 may be configured to generate performance collection container 364-1-1 based at least partially on start time parameter and end time parameter.

The logic flow 760 may deliver the performance collection container to a payload server device based at least partially on the delivery location information at 774 and end at 776. For example, delivery component 226-1-5 may be configured to deliver the performance collection container 364-1-1 to a large payload server device 114-1 of the storage support system 120 identified by the delivery location information via the load balancer device 170. The examples are not limit in this context.

Figure 8:
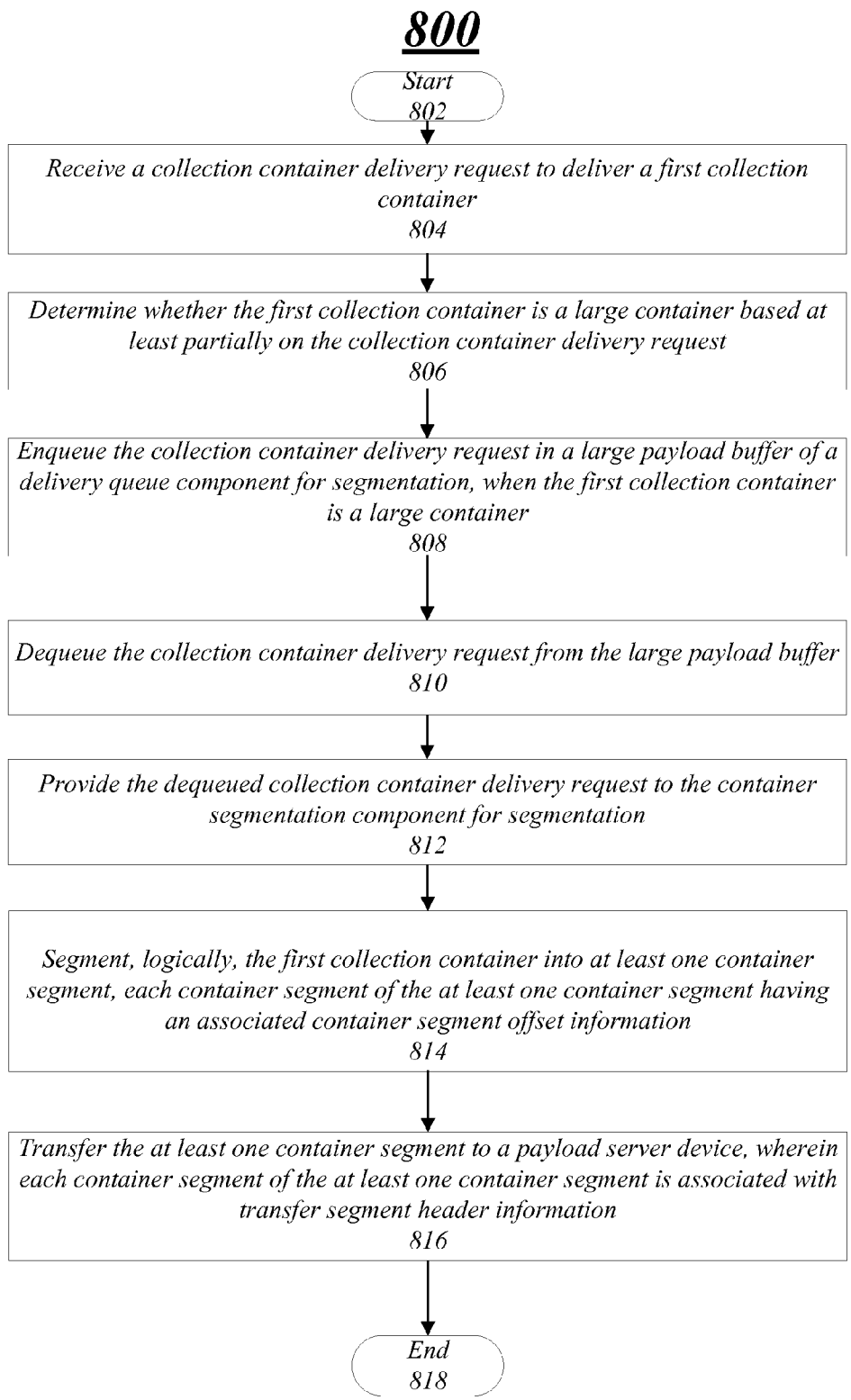
FIG. 8 illustrates an embodiment of a logic flow of a large payload support system for transferring information by a delivery component.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may start at block 802 and may receive a collection container delivery request to deliver a first collection container at 804. For example, delivery queue component 512 may receive one or more collection container delivery requests from the scheduler component 226-1-1.

The logic flow 800 may determine whether the first collection container is a large container based at least partially on the collection container delivery request at 806. For example, delivery queue component 512 may determine whether the first collection container is a large container based at partially on a large payload parameter included in a collection container delivery request.

The logic flow 800 may enqueue the collection container delivery request in a large payload buffer of a delivery queue component for segmentation, when the first collection container is a large container at 808. For example, delivery queue component 512 may enqueue the one or more collection container delivery requests received from the scheduler component 226-1-1 in a large payload buffer 514, when the large payload parameter indicates that large payload support is required.

The logic flow 800 may dequeue the collection container delivery request from the large payload buffer at 810. For example, the delivery queue component 512 be configured to dequeue one or more collection container delivery requests 546-*o* and/or 548-*p*.

The logic flow 800 may provide the dequeued collection container delivery request to the container segmentation component for segmentation at 812. For example, delivery queue component 512 may provide the dequeued collection container delivery requests 546-*o* and/or 548-*p*, such as, for example, diagnostic collection container delivery request 546-1 to the container segmentation component 520 for segmentation.

The logic flow 800 may segment, logically, the first collection container into at least one container segment, each container segment of the at least one container segment having an associated container segment offset information at 814. For example, the container segmentation component 520 may be configured to segment, logically, a collection container such as, for example, performance collection container 364-1-1 identified by the collection container location information and collection container name information into one or more container segments 560-1-*q* based at least partially on maximum segment size information and/or collection container size information. Additionally, the container segmentation component 520 may be configured to segment, logically, the collection container such as, for example, the performance collection container 364-1-1 by determining associated segment offset information and container segment information for each container segment of the one or more container segments 560-1-*q*.

The logic flow 800 may transfer the at least one container segment to a payload server device, wherein each container segment of the at least one container segment is associated with transfer segment header information at 816 and end at 818. For example, the delivery processor component 530 may include, without limitation, one or more delivery processors 523-*r*, where each delivery processor of the one or more delivery processors 523-*r* may be configured to transmit the read data for a container segment and an associated transfer segment header information to the load balancer device 170 of the storage support system 120 identified by the transfer location parameter (e.g., "support.netapp.com/AsupPut", etc.) over an established secure communications connection/channel. The examples are not limited in this context.

Figure 9:
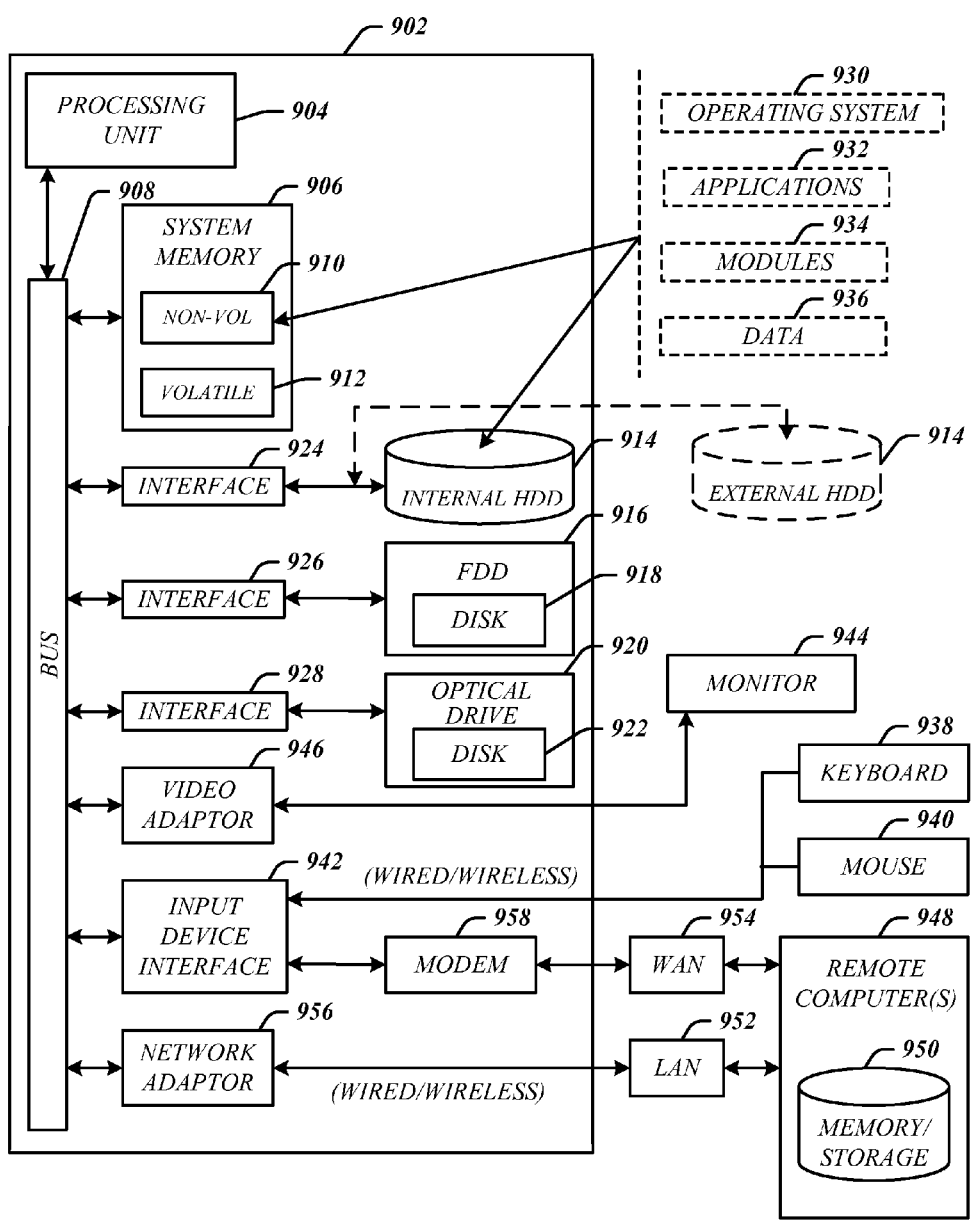
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device (e.g., server device, client device, cluster node, local storage, cluster node, server storage, node storage, load balancer device, etc.). The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, a program module, an application, an operating system, and/or a computer. By way of illustration, both an operating system running on a server device and the server device itself can be a component. In another illustration, both an application running on a cluster node, and the cluster node itself can also be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930 (e.g., a storage operating system), one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It may be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a collection container delivery request to deliver a first collection container;
determining whether the first collection container is a large container based at least partially on the collection container delivery request;
segmenting, logically, the first collection container into at least one container segment, each container segment of the at least one container segment having an associated container segment offset information, wherein segmenting of the first collection container comprises determining a total number of the first container segments based on at least partially on the size of the first collection container and a maximum segment size parameter; determining the container segment offset information for each container segment of the at least one container segment; and providing each container segment and associated segment offset information to a delivery processor component, the delivery processor component comprising at least two delivery processors, the at least two delivery processors comprising a first delivery processor and a second delivery processor; and transfer the at least one container segment to a payload server device, wherein each container segment of the at least one container segments is associated with transfer segment header information.

2. The computer-implemented method of claim 1, wherein the at least one container segment comprises a first container segment, a second container segment, and a third container segment, and the delivering the at least one container segments to the payload server device further comprises: determining the transfer segment header information associated with each container segment of the at least one container segment; transmitting the first container segment and the associated transfer segment header information to a payload server device by the first delivery processor; and transmitting the second container segment and the associated transfer segment header information to the server device by the second delivery processor substantially in parallel with the first delivery processor.

3. The computer-implemented method of claim 2, wherein the delivering of the at least one container segment to the payload server device further comprises:
transmitting the third container segment and the associated container segment information by the first delivery processor after the first container segment is transmitted and in parallel with the with the second delivery processor.

4. The computer-implemented method of claim 2, wherein the first container segment and the second container segment are the same size and the third container segment is a smaller size than the first and second container segments.

5. The computer-implemented method of claim 2, wherein the transfer segment header information associated with each container segment comprises at least one of: payload information, case reference information, diagnostic container information, total segments information, segment information, current segment integrity information, payload integrity information, or any combination thereof.

6. The computer-implemented method of claim 2, further comprising:
enqueuing the collection container delivery request in a large payload buffer of a delivery queue component for segmentation, when the first collection container is a large container;
dequeuing the collection container delivery request from the large payload buffer; and
providing the dequeued collection container delivery request to a container segmentation component for segmentation.

7. A system, comprising:
a processor circuit; and
memory operatively coupled to the processor circuit, the memory comprising a storage operating system for execution by the processor circuit and at least one component to
receive a collection container delivery request to deliver a first collection container;
determine whether the first collection container is a large container based at least partially on the collection container delivery request,
segment, logically, the first collection container into at least one container segment, each container segment of the at least one container segment having an associated container segment offset information, wherein the at least one component to segment, logically, the first collection container is to determine a total number of the first container segments based on at least partially on the size of the first collection container and a maximum segment size parameter, determine the starting segment offset information for each container segment of the at least one container segment, and provide each container segment and associated segment offset information to a delivery processor component, the delivery processor component comprising at least two delivery processors, the at least two delivery processors comprising a first delivery processor and a second delivery processor; and
transfer the at least one container segment to a payload server device, wherein each container segment of the at least one container segments is associated with transfer segment header information.

8. The system of claim 7, wherein the at least one container segment comprises a first container segment, a second container segment, and a third container segment, and the at least one component to deliver the first collection container is to further: determine the transfer segment header information associated with each container segment of the at least one container segment; and transmit the first container segment and the associated transfer segment header information to a payload server device by the first delivery processor; and transmit the second container segment and the associated transfer segment header information to the payload server device by the second delivery processor substantially in parallel with the first delivery processor.

9. The system of claim 8, wherein the at least one component to deliver the first collection container is to further:
determine, by the second delivery processor, the whether at least a portion of the third segment has already been received and stored by the payload server device; and
resume the transfer of the third container segment, when at least a portion of the third container segment has been received and stored by the payload server device.

10. The system of claim 7, wherein the at least one component is to further:
determine segment transfer statistics information associated with each container segment, the segment transfer statistics information comprising at least one of: segment remaining time information, segment delivery time information, segment completion information, segment bandwidth usage information, segment upload rate information, or any combination thereof; and
determine container transfer statistics information associated with each container based at least partially on the segment transfer statistics information associated with each container segment, the container transfer statistics information comprising at least one of: container remaining time information, container delivery time information, container completion information, container bandwidth usage information, container upload rate information, or any combination thereof.

11. The system of claim 7, wherein the delivering the first collection container to the payload server device is limited to maximum transmit rate parameter.

12. The computer-implemented method of claim 8, wherein the payload server device receives the first container segment and the second container segment substantially in parallel, aggregates the first, second, and third container segments into a received collection container, verifies integrity of the first received container segment, and stores the first receive container in a payload datastore.

13. At least one computer-readable storage medium comprising instructions that, when executed, cause a system to:
receive a collection container delivery request to deliver a first collection container;

determine whether the first collection container is a large container based at least partially on the collection container delivery request, segment, logically, the first collection container into at least one container segment, each container segment of the at least one container segment having an associated container segment offset information, wherein segmenting, logically, the first collection container, causes the system to determine a total number of the first container segments based on at least partially on the size of the first collection container and a maximum segment size parameter, determine the starting segment offset information for each container segment of the at least one container segment, and provide each container segment and associated segment offset information to a delivery processor component, the delivery processor component comprising at least two delivery processors, the at least two delivery processors comprising a first delivery processor and a second delivery processor, and transfer the at least one container segment to a payload server device, wherein each container segment of the at least one container segment is associated with transfer segment header information.

14. The at least one computer-readable storage medium of claim 13, wherein the at least one container segment comprises a first container segment, a second container segment, and a third container segment, and the instructions to deliver the at least one container segment, when executed, further cause the system to: determine the transfer segment header information associated with each container segment of the at least one container segment; and transmit the first container segment and the associated transfer segment header information to a payload server device by the first delivery processor; and transmit the second container segment and the associated transfer segment header information to the payload server device by the second delivery processor substantially in parallel with the first delivery processor.

15. The at least one computer-readable storage medium of claim 14, wherein the instructions to deliver the at least one container segment, when executed, further cause the system to:

determine, by the second delivery processor, the whether at least a portion of the third segment has already been received and stored by the payload server device; and resume the transfer of the third container segment, when at least a portion of the third container segment has been received and stored by the payload server device.

16. The at least one computer-readable storage medium of claim 13, wherein the instructions, when executed, further cause the system to:

enqueue the collection container delivery request in a large payload buffer of a delivery queue component for segmentation, when the first collection container is a large container;

dequeue the collection container delivery request from the large payload buffer; and provide the dequeued collection container delivery request to a container segmentation component for segmentation.

17. The at least one computer-readable storage medium of claim 13, wherein the instructions to deliver the at least one container segment to the payload server device, when executed, further cause the system to:

deliver the at least one container segment to the payload server device utilizing a secure cryptographic protocol.

* * * * *